US011810593B2

(12) United States Patent
Nandy et al.

(10) Patent No.: US 11,810,593 B2
(45) Date of Patent: Nov. 7, 2023

(54) LOW POWER MODE FOR SPEECH CAPTURE DEVICES

(71) Applicant: Amazon Technologies, Inc., Seattle, WA (US)

(72) Inventors: Dibyendu Nandy, San Ramon, CA (US); Om Prakash Gangwal, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/091,118

(22) Filed: Nov. 6, 2020

(65) Prior Publication Data

US 2021/0398550 A1 Dec. 23, 2021

Related U.S. Application Data

(60) Provisional application No. 63/042,776, filed on Jun. 23, 2020.

(51) Int. Cl.
*G10L 25/21* (2013.01)
*G10L 21/0232* (2013.01)
(Continued)

(52) U.S. Cl.
CPC .............. *G10L 25/21* (2013.01); *G10L 15/16* (2013.01); *G10L 15/22* (2013.01);
(Continued)

(58) Field of Classification Search
CPC ................. G10L 25/21; G10L 21/0232; G10L 2021/02166
See application file for complete search history.

(56) References Cited

U.S. PATENT DOCUMENTS 5,245,694 A * 9/1993 Zwern ..................... G10L 19/00
704/200
10,304,475 B1 * 5/2019 Wang ........................ G01S 3/80
(Continued)

OTHER PUBLICATIONS

Definition from Techopedia—What is an Integrated Circuit (IC)? (Last updated: Feb. 13, 2014; https://www.techopedia.com/definition/2366/integrated-circuit-ic) (Year: 2014).*
(Continued)

*Primary Examiner* — Pierre Louis Desir
*Assistant Examiner* — Keisha Y. Castillo-Torres
(74) *Attorney, Agent, or Firm* — PIERCE ATWOOD LLP

(57) ABSTRACT

A system configured to perform low power mode wakeword detection is provided. A device reduces power consumption without compromising functionality by placing a primary processor into a low power mode and using a secondary processor to monitor for sound detection. The secondary processor stores input audio data in a buffer component while performing sound detection on the input audio data. If the secondary processor detects a sound, the secondary processor sends an interrupt signal to the primary processor, causing the primary processor to enter an active mode. While in the active mode, the primary processor performs wakeword detection using the buffered audio data. To reduce a latency, the primary processor processes the buffered audio data at an accelerated rate. In some examples, the device may further reduce power consumption by including a second buffer component and only processing the input audio data after detecting a sound.

20 Claims, 25 Drawing Sheets

(51) Int. Cl.
*G10L 15/16* (2006.01)
*G10L 15/22* (2006.01)
*G10L 21/0216* (2013.01)
*G10L 13/02* (2013.01)

(52) U.S. Cl.
CPC .......... *G10L 21/0232* (2013.01); *G10L 13/02* (2013.01); *G10L 2021/02166* (2013.01)

(56) References Cited

U.S. PATENT DOCUMENTS

| | | | |
|---|---|---|---|
| 2002/0070784 A1* | 6/2002 | Falconer | H03H 11/30 327/281 |
| 2013/0339028 A1 | 12/2013 | Rosner et al. | |
| 2014/0163978 A1* | 6/2014 | Basye | G10L 15/28 704/233 |
| 2014/0257821 A1 | 9/2014 | Adams et al. | |
| 2014/0274203 A1* | 9/2014 | Ganong, III | G10L 15/30 455/563 |
| 2016/0227030 A1* | 8/2016 | Iltus | H04M 3/42221 |
| 2020/0160179 A1* | 5/2020 | Chien | G06N 3/084 |
| 2020/0342880 A1* | 10/2020 | Pascovici | G10L 25/78 |

OTHER PUBLICATIONS

International Search Report and Written Opinion issued in International Application No. PCT/US2021/029590 dated Oct. 12, 2021, 17 pages.

Invitation to Pay Additional Fees issued in International Patent Application No. PCT/US2021/029590 dated Aug. 18, 2021, 10 pages.

International Preliminary Report on Patentability dated Jan. 5, 2023 for International Patent Application No. PCT/US2021/029590, filed Apr. 28, 2021, 12 pages.

\* cited by examiner

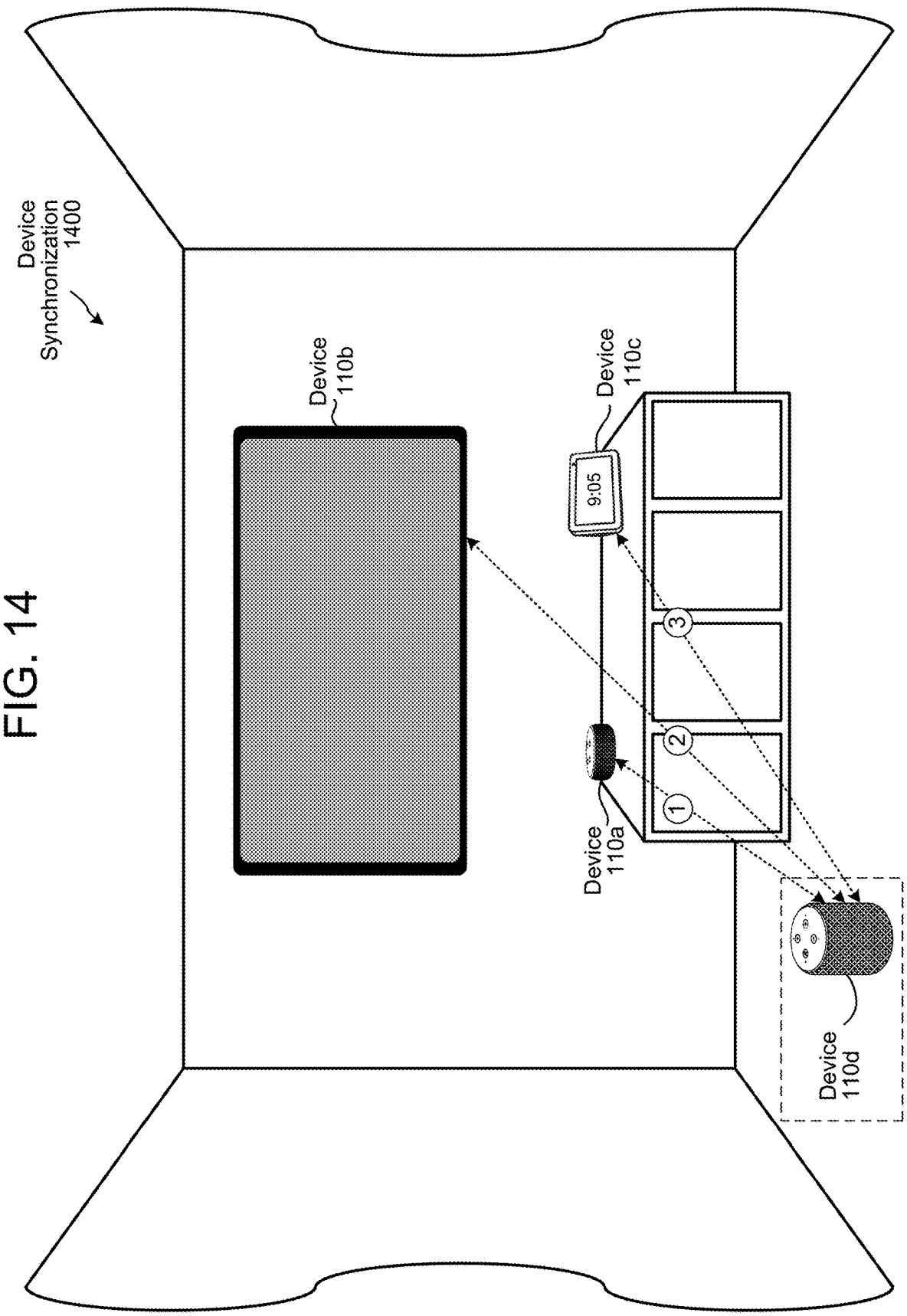

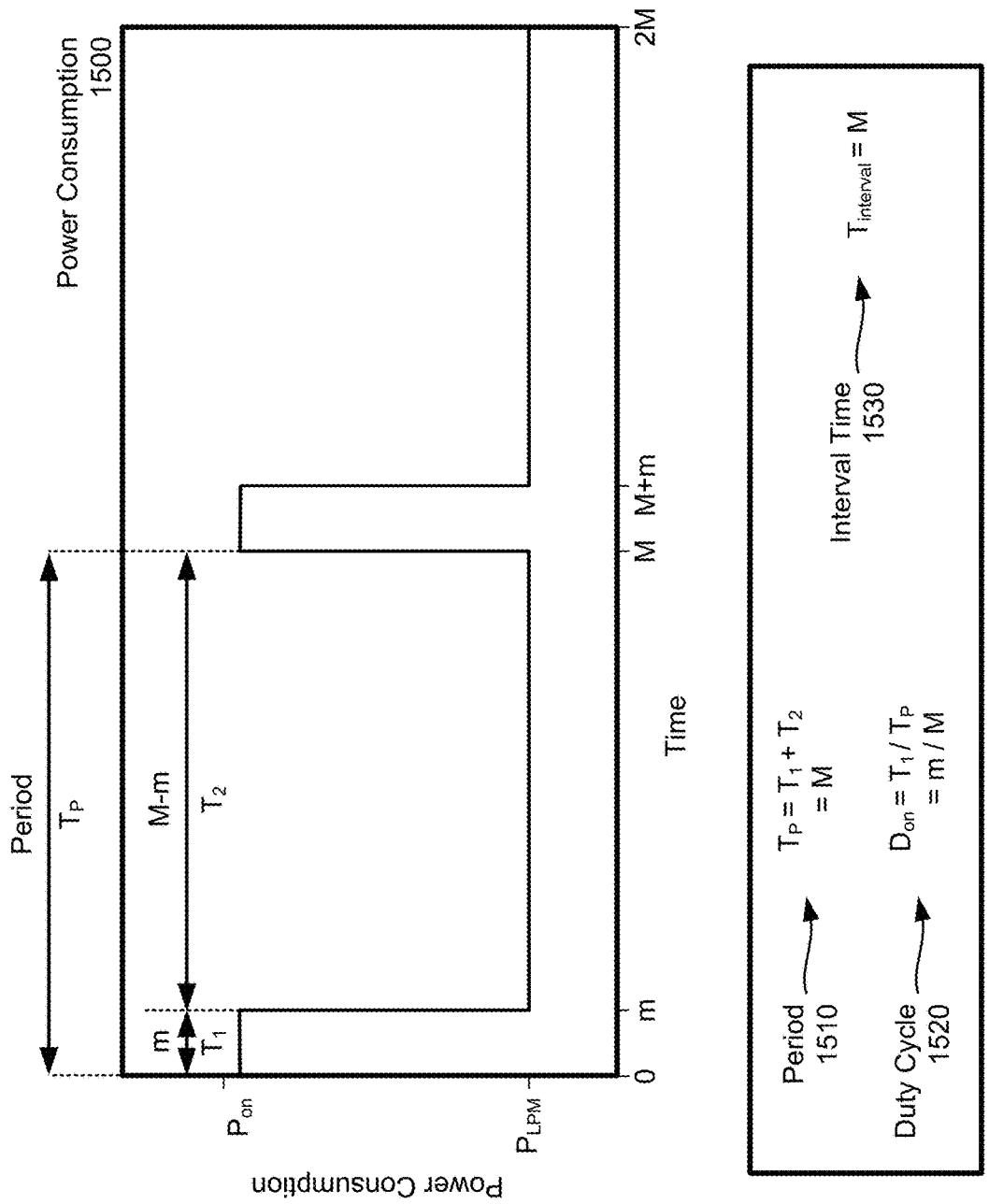

N devices with (N-1) seconds interval between Time Synch for each follower
[1 sec on, (N-1) sec off]

FIG. 18

| Event | Interval (sec) |
|---|---|
| Wakeup$_{Internal1}$ | $T_{I1}$ |
| Wakeup$_{Internal2}$ | $T_{I2}$ |
| ... | ... |
| Wakeup$_{Internalm}$ | $T_{Im}$ |
| Wakeup$_{External1}$ | $T_{E1}$ |
| Wakeup$_{External2}$ | $T_{E2}$ |
| ... | ... |
| Wakeup$_{Externaln}$ | $T_{En}$ |

Wakeup Table 1810

| Event | Interval (sec) |
|---|---|
| Wakeup$_{Internal1}$ | 15 |
| Wakeup$_{Internal2}$ | 10 |
| Wakeup$_{Internal3}$ | 30 |
| Wakeup$_{Internal4}$ | 5 |
| Wakeup$_{External1}$ | 30 |
| Wakeup$_{External2}$ | 10 |
| Wakeup$_{External3}$ | 10 |

Wakeup Table 1820

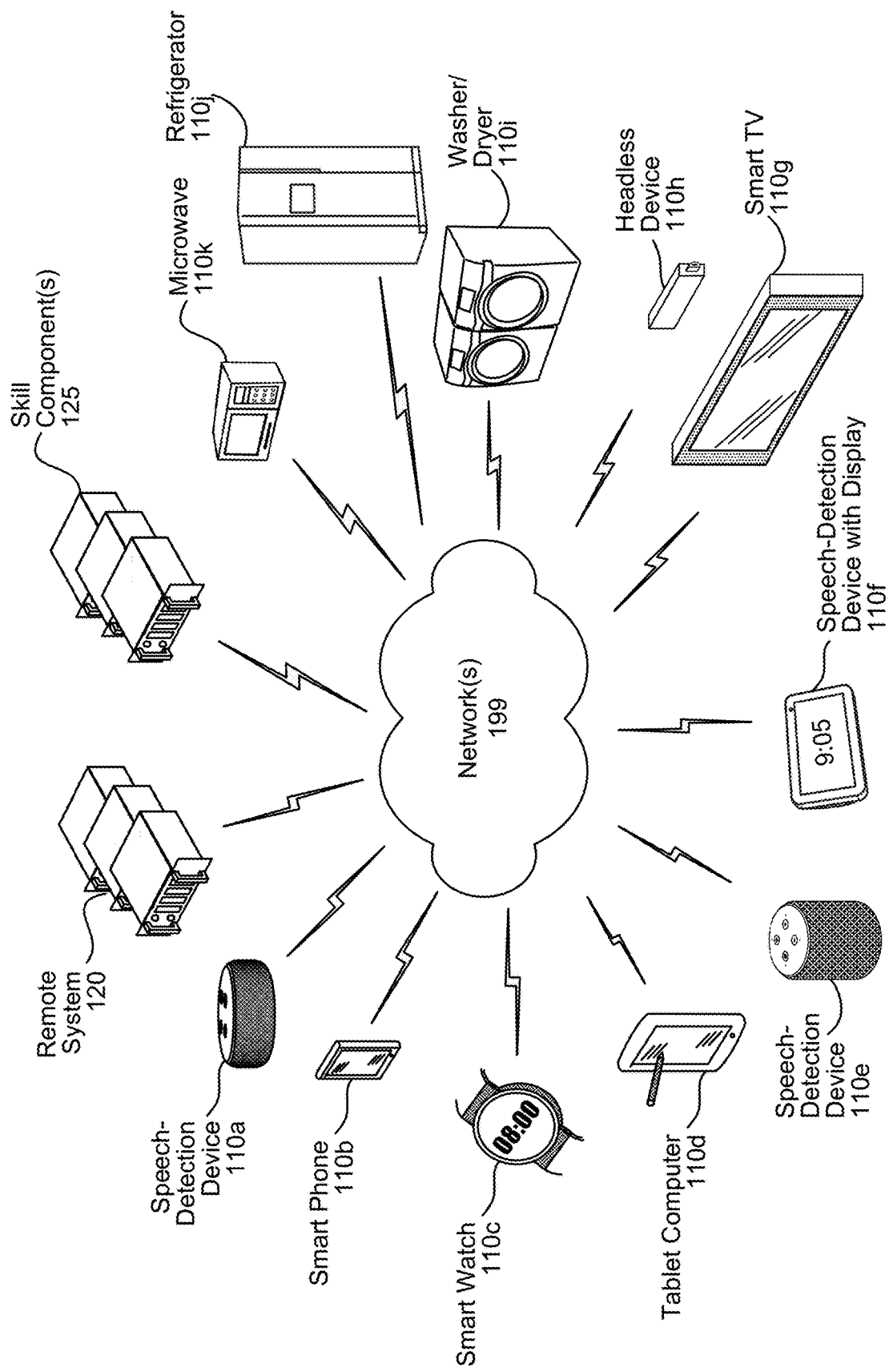

US 11,810,593 B2

LOW POWER MODE FOR SPEECH CAPTURE DEVICES

CROSS-REFERENCE TO RELATED APPLICATION DATA

This application claims priority to U.S. Provisional Patent Application Ser. No. 63/042,776, entitled "Low Power Mode for Speech Capture Devices," filed on Jun. 23, 2020, in the names of Dibyendu Nandy, et al. The above provisional application is herein incorporated by reference in its entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 14 illustrates an example of device synchronization during a reduced power mode according to embodiments of the present disclosure.

FIG. 15 illustrates an example timing diagram for performing device synchronization during a reduced power mode according to embodiments of the present disclosure.

FIG. 18 illustrates example wakeup tables associated with a low power mode according to embodiments of the present disclosure.

FIG. 22 illustrates an example of a computer network for use with the overall system, according to embodiments of the present disclosure.

DETAILED DESCRIPTION

Figure 1A:
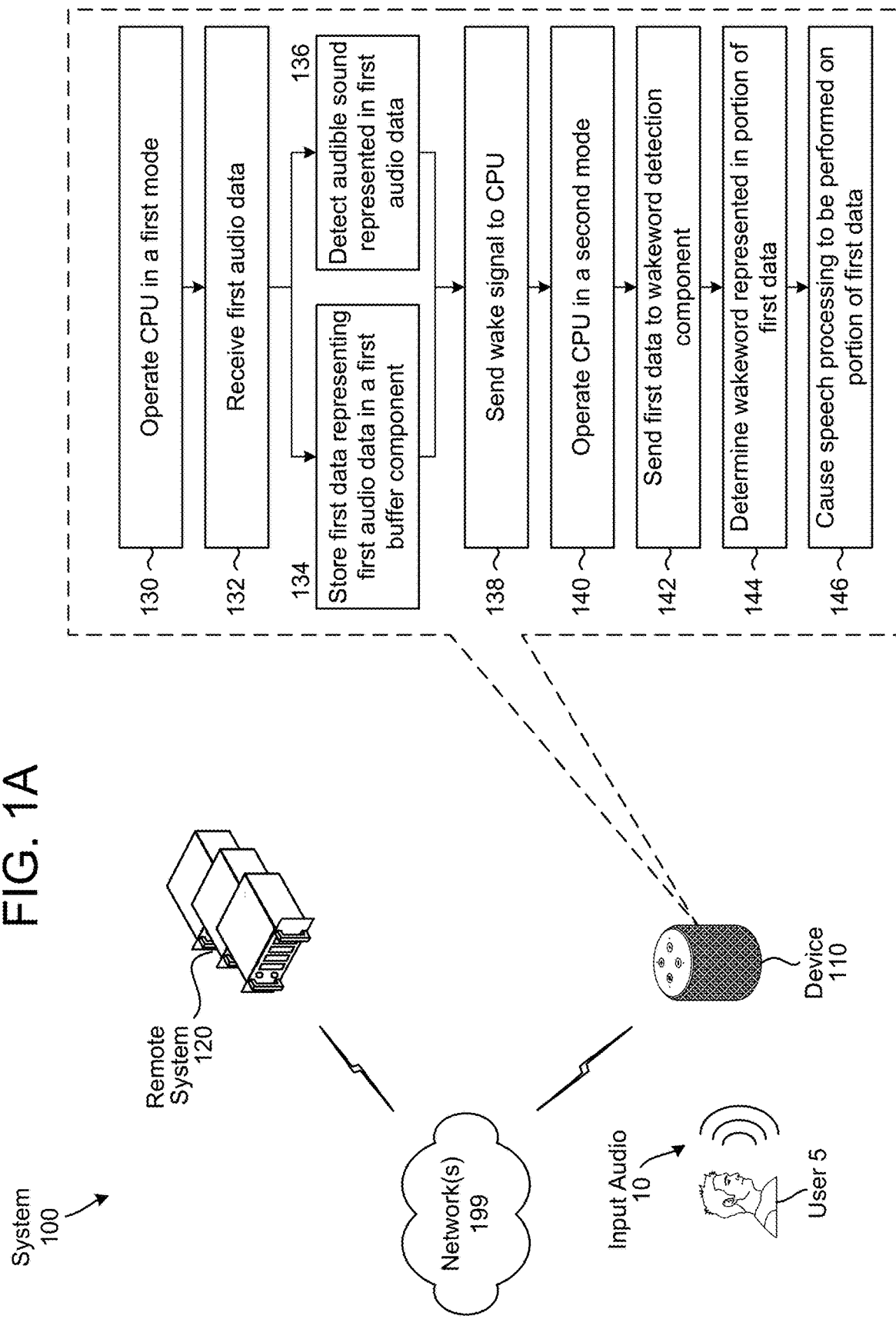
FIG. 1A is a conceptual diagram illustrating a system configured to perform wakeword detection during a low power mode according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a remote system. Text-to-speech (TTS) is a field of computer science concerning transforming textual and/or other data into audio data that is synthesized to resemble human speech.

A system may cause actions to be performed in response to natural language inputs (e.g., spoken inputs and text inputs, such as typed inputs). For example, for the natural language input "play Adele music," a system may output music sung by an artist named Adele. For further example, for the natural language input "turn on the lights," a system may turn on "smart" lights associated with a user's profile. In another example, for the natural language input "what is the weather," a system may output weather information for a geographic location corresponding to the user device that captured the natural language input. In the foregoing examples, actions correspond to the outputting of music, the turning on of "smart" lights, and the outputting of weather information. As such, as used herein, an "action" may refer to some result of a system's processing.

When a user provides a natural language input to a user device, the user device may generate a representation of the natural language input, and send the representation to a remote system (e.g., a cloud-based system) configured to perform language processing (as well as other processing described herein). For example, the remote system may perform ASR processing on audio data to generate ASR output data, and may perform NLU processing on ASR output data (or text corresponding to a typed natural language input) to generate NLU results data (e.g., representing a likely intent of the natural language input and corresponding slotted entities).

A remote system may implement (and/or be otherwise in communication with) one or more skill components. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like.

In at least some instances, a remote system may implement (and/or be otherwise in communication with) two or more skill components configured to process with respect to a same NLU intent (e.g., <OutputWeather>, <PlayMusic>, <PlayVideo>, <TurnOff> smart lights, <Lock> smart door lock, etc.), resulting in more than one skill component being capable of being invoked with respect to a single natural language input.

A system according to the present disclosure may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Embodiments of the present disclosure are directed to, among other things, improving the power consumption of a device without impacting or with minimal impact to operations or functionality of the device. For example, the device can support multiple power modes, where a first power mode consumes more power than a second power mode. In the first power mode, various computing components of the device (e.g., a central processing unit (CPU) or Wi-Fi component) are operational and support various processing functionalities of the device (e.g., the CPU providing playback functionalities, the Wi-Fi component providing networking functionalities, etc.). In the second power mode, some or all of the processing functionalities can be reduced. For example, the CPU and/or the Wi-Fi component may be decoupled from a power source or their processing functions may be implemented using a relatively longer clock cycle.

In some examples, the device may perform sound detection to reduce the power consumption of the device. For example, the device may listen for a wakeword when the device is operating in the second power mode (e.g., a standby mode). A standby mode may be characterized as a mode of operation where the device reduces and/or eliminates power to subsystems within the device that are not needed when the device is not being used. For example, the device could shut off power to the display screen when the device is not in use. The device could also reduce the level of activity of the on-device processors (such as reducing the clock speed or number of cores that are fully-operational) at times of inactivity to save power.

In order to conserve power by enabling the CPU to operate in standby mode, while still listening for the wakeword, the device may use a second processor to perform sound detection. For example, the device may include a digital signal processor (DSP) and the DSP may include a sound detector that is configured to perform sound detection (e.g., detect audible sounds).

The sound detector may be operational in different power modes. For example, while the device is in the first power mode, the sound detector may detect whether audio received at the device includes an audible sound and/or a sound event. If no sound event is detected, the device may transition some or all of the computing components (e.g., CPU) into the second power mode, thereby reducing power consumption. While the device is in the second power mode, the sound detector may continue to monitor and detect sound events. If an audible sound and/or a sound event is detected, the computing components (e.g., CPU) are transitioned back into the first power mode, thereby re-enabling various processing functionalities.

The sound detector may receive audio data and may detect whether the audio data represents ambient noise or includes a sound event. A sound event can be either the start of a sound or a continuity of an already started sound. Based on the detection, the sound detector may send a wake interrupt to the CPU to cause the CPU to operate in the first power mode.

FIG. 1A is a conceptual diagram illustrating a system configured to perform wakeword detection during a low power mode according to embodiments of the present disclosure. As illustrated in FIG. 1A, a system 100 may include a user device 110 (local to a user 5) and a remote system 120 connected across one or more networks 199. While the user 5 is illustrated as being a human, other types of users (e.g., computing systems) may exist.

As illustrated in FIG. 1A, the device 110 may operate (130) a central processing unit (CPU) component 114 in a first mode (e.g., low power mode) and may receive (132) first audio data corresponding to an utterance spoken by user 5 and captured by the device 110. For example, the first audio data may represent input audio 10 generated by the user 5. The device 110 may store (134) first data representing the first audio data in a first buffer component. In parallel with storing the first data in the first buffer component, the device 110 may monitor the first audio data for an audible sound. Eventually, the device 110 may detect (136) an audible sound represented in the first audio data. For example, the device 110 may detect sound with an energy above a threshold value, although the disclosure is not limited thereto.

In response to detecting the audible sound, the device 110 may send (138) a wake signal to the CPU component 114 and may operate (140) the CPU component 114 in a second mode (e.g., active mode). For example, the CPU component 114 may wake from the low power mode and enter the active mode, as described in greater detail below with regard to FIGS. 5-10.

While operating the CPU component 114 in the second mode, the device 110 may send (142) the first data to a wakeword detection component, may determine (144) that a wakeword is represented in a portion of the first data, and may cause (146) speech processing to be performed on the portion of the first data. For example, the device 110 may perform speech processing on the portion of the first data locally. However, the disclosure is not limited thereto, and in some examples the device 110 may send the portion of the first data to the remote system 120 for processing without departing from the disclosure. While not illustrated in FIG. 1A, after speech processing is performed the device 110 may generate and/or receive output data and may output according to the output data.

While FIG. 1A illustrates an example in which a wakeword is detected, the disclosure is not limited thereto. In some examples, the CPU component 114 may operate in the second mode and process the first data using the wakeword detection component and not detect a wakeword. If the wakeword detection component fails to detect a wakeword for a period of time, the CPU component 114 may remain in the second mode (e.g., active mode) during a hangover period and then operate in the first mode again. For example, if the wakeword detection component does not detect a wakeword and no other audible sound is detected during the hangover period, the device 110 may operate the CPU component 114 in the first mode. However, if the device 110 detects an audible sound during the hangover period, the CPU component 114 may continue to operate in the second mode and may reset the hangover period.

Figure 1B:
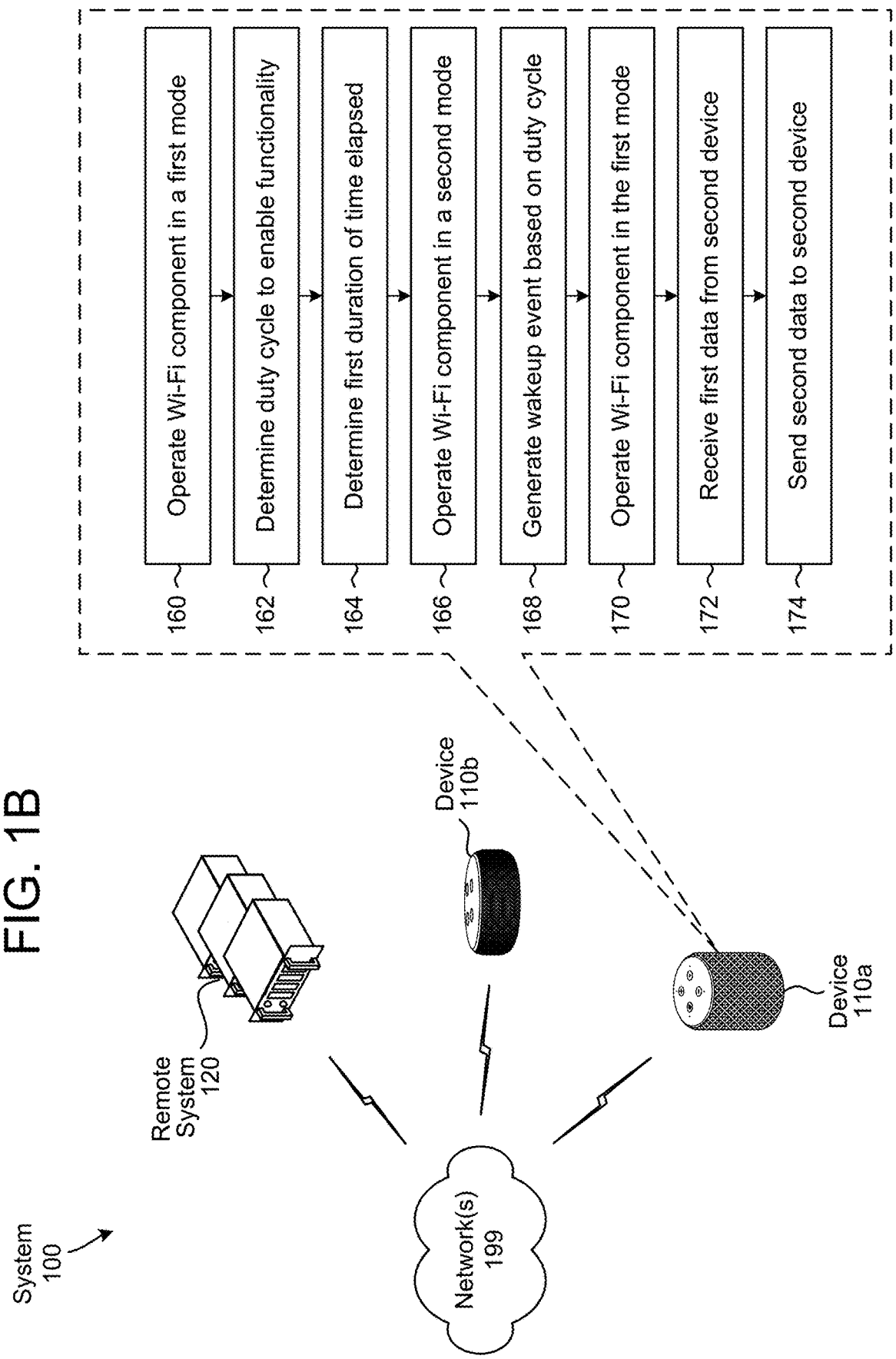
FIG. 1B is a conceptual diagram illustrating a system configured to control a duty cycle of a reduced power mode according to embodiments of the present disclosure.

FIG. 1B is a conceptual diagram illustrating a system configured to control a duty cycle of a reduced power mode according to embodiments of the present disclosure. As illustrated in FIG. 1B, a first device 110a may operate (160) a Wi-Fi component 116 in a first mode (e.g., active mode) and may determine (162) a duty cycle configured to enable functionality. For example, the functionality may improve a user experience and may require that the Wi-Fi component 116 perform an action periodically while operating in the first mode. Thus, instead of operating the Wi-Fi component 116 in a second mode (e.g., low power mode) and disabling the functionality, the first device 110a may perform duty cycling to alternate between the first mode and the second mode based on time intervals associated with the functionality. As described in greater detail below with regard to FIGS. 13A-13B and 15, the duty cycle may include a first duration of time in which the Wi-Fi component 116 operates in the first mode and a second duration of time in which the Wi-Fi component 116 operates in the second mode.

The first device 110a may determine (164) that the first duration of time has elapsed and may operate (166) the Wi-Fi component 116 in the second mode. The first device 110a may then generate (168) a wakeup event based on the duty cycle (e.g., after the second duration of time has elapsed) and may operate (170) the Wi-Fi component 116 in the first mode. While operating the Wi-Fi component 116 in the first mode, the first device 110a may receive (172) first data from a second device 110b and may send (174) second data to the second device 110b.

As illustrated in FIGS. 11-13B, in some examples the functionality may correspond to new device provisioning and the first device 110a may be configured to assist the second device 110b in connecting to the remote system 120 via the network(s) 199. For example, the first device 110a may monitor a wireless channel for incoming probe requests (e.g., first data) and may send a probe response (e.g., second data) to the second device 110b, although the disclosure is not limited thereto. As described with regard to FIGS. 11-13B, the first device 110a may configure the second device 110b to connect to a local wireless network. In this example, the Wi-Fi component 116 may schedule wakeup events based on a first duty cycle. For example, the Wi-Fi component 116 may have its own internal timer and may trigger a wakeup event (e.g., cause the Wi-Fi component 116 to enter an active mode) to enable new device provisioning, although the disclosure is not limited thereto.

As illustrated in FIGS. 14-17, in other examples the functionality may correspond to device synchronization and the first device 110a may be configured to synchronize with the second device 110b. For example, the first device 110a may be a time master device and may exchange data packets with one or more time follower devices, such as the second device 110b, to enable the time follower devices to synchronize a local clock associated with an individual time follower device with a global clock associated with the time master device. As described with regard to FIGS. 14-17, the first device 110a may be configured to exchange data packets with the one or more time follower devices during the first duration of time and operate in the second mode during the second duration of time. In this example, the CPU component 114 may schedule wakeup events based on a second duty cycle. For example, the CPU component 114 may have its own internal timer and may trigger a wakeup event (e.g., cause the Wi-Fi component 116 to enter an active mode) to enable device synchronization, although the disclosure is not limited thereto.

As used herein, Wi-Fi may refer to Institute of Electrical and Electronics Engineers (IEEE) 802.11 protocol, which is part of the IEEE 802 set of local area network (LAN) protocols and specifies the set of media access control (MAC) and physical layer (PHY) protocols for implementing wireless local area network (WLAN) Wi-Fi computer communication in various frequencies, including but not limited to 2.4 GHz, 5 GHz, 6 GHz, and 60 GHz frequency bands. However, the disclosure is not limited thereto and Wi-Fi may correspond to any wireless protocol that can be used to generate a wireless local area network (WLAN) without departing from the disclosure. The IEEE 802 set of protocols is a suite of complementary communications protocols that establish a system of rules that allow two or more entities of a communications system to transmit information via any kind of variation of a physical quantity. For example, the set of protocols define the rules, syntax, semantics and synchronization of communication and possible error recovery methods. These protocols may be implemented by hardware, software, and/or a combination of both without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., input audio data) or audio signals (e.g., input audio signal(s)) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data may correspond to a specific range of frequency bands. For example, the input audio data may correspond to a human hearing range (e.g., 20 Hz-20 kHz), although the disclosure is not limited thereto.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music," or "Alexa—Buy that." Further still, an utterance, which need not include the wakeword, may be, "Turn up the volume" or "Call mom."

Figure 2:
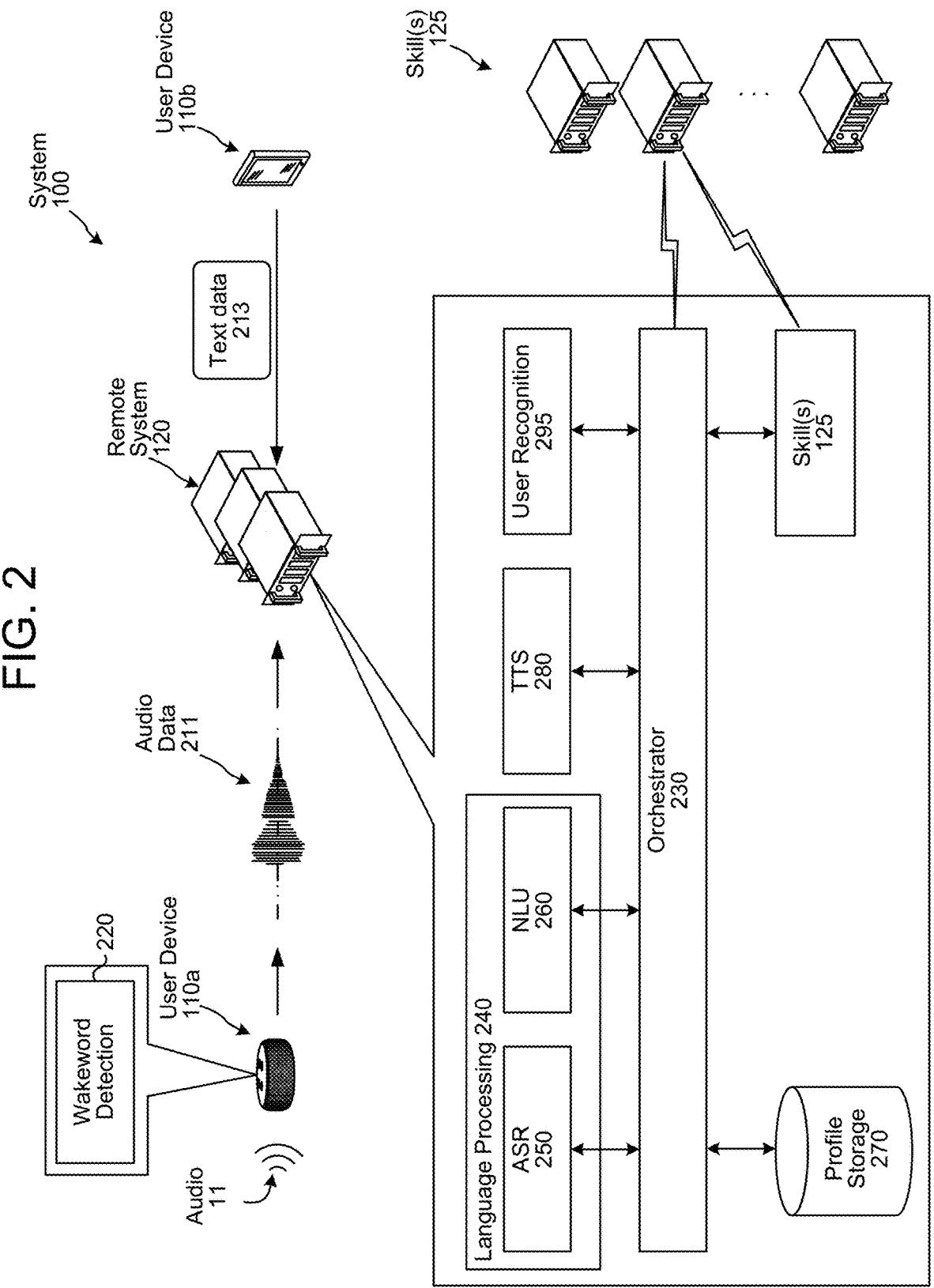
FIG. 2 is a conceptual diagram of components of a remote system, according to embodiments of the present disclosure.

The system 100 may operate using various components as illustrated in FIG. 2. The various components may be located on a same or different physical devices. Communication between various components may occur directly or across a network(s) 199.

An audio capture component(s), such as a microphone or array of microphones of a user device 110a, captures audio 11. The user device 110a processes audio data, representing the audio 11, to determine whether speech is detected. The user device 110a may use various techniques to determine whether audio data includes speech. In some examples, the user device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110a may implement a limited classifier configured to distinguish speech from background noise. The classifier may be implemented by techniques such as linear classifiers, support vector machines, and decision trees. In still other examples, the user device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the user device 110a may use a wakeword detection component 220 to perform wakeword detection to determine when the user 5 intends to speak an input to the remote system 120. An example wakeword is "Alexa." As used herein, a "wakeword" may refer to a single word or more than one consecutive words in speech. The system may also be configured to recognize different wakewords such as "Alexa" and "House" where a first wakeword may invoke different functionality/a different speech processing system from a second wakeword. In at least some examples, each wakeword may correspond to a different digital assistant. In at least some examples, a wakeword may correspond to a name of a digital assistant.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the user device 110a may "wake" and begin transmitting audio data 211, representing the audio 11, to the remote system 120. The audio data 211 may include data corresponding to the detected wakeword, or the user device 110a may remove the portion of the audio corresponding to the detected wakeword prior to sending the audio data 211 to the remote system 120.

The remote system 120 may include an orchestrator component 230 configured to receive the audio data 211 from the user device 110a. The remote system 120 may include a language processing component 240 configured to perform language processing. As used herein, language processing may refer to NLU processing, or a combination of ASR processing and NLU processing.

The orchestrator component 230 may send the audio data 211 to an ASR component 250 that transcribes the audio data 211 into ASR results data including one or more ASR hypotheses. ASR results data may include one or more textual interpretations (corresponding to one or more ASR hypotheses), or may be configured in another manner, such as a token. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In addition to a user device 110a receiving a spoken natural language input, a user device 110b may receive a typed natural language input. The user device 110b may generate text data 213 representing the typed natural language input, and may send the text data 213 to the remote system 120, wherein the text data 213 is received by the orchestrator component 230.

Figure 3:
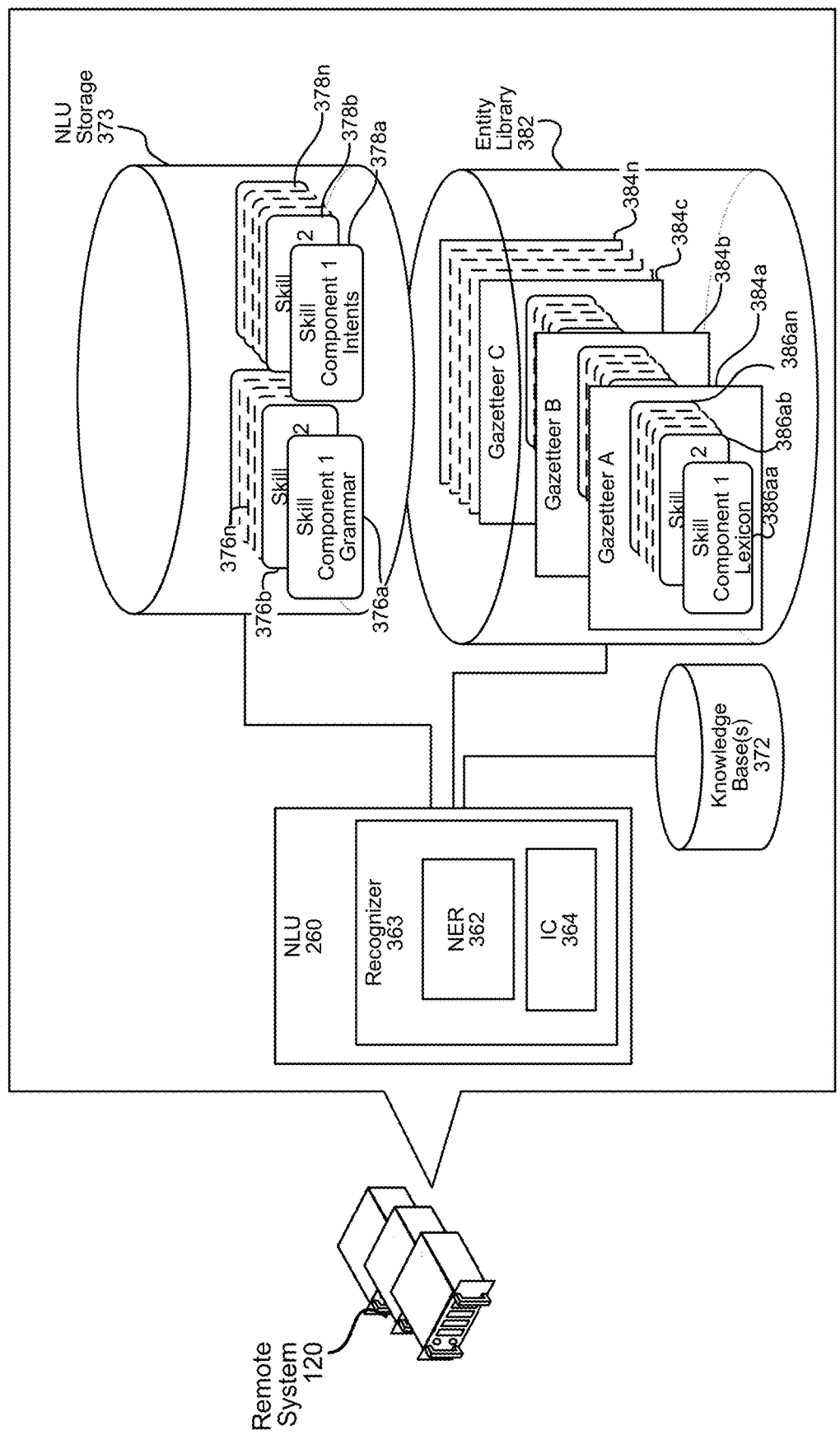
FIG. 3 is a conceptual diagram of how natural language processing may be, according to embodiments of the present disclosure.

The orchestrator component 230 may send the text data 213 or ASR results data output by the ASR component 250, depending on the type of natural language input, to a NLU component 260. FIG. 3 illustrates how the NLU component 260 may perform NLU processing.

The NLU component 260 may include one or more recognizers 363. In at least some embodiments, a recognizer 363 may be associated with a skill component 125 (e.g., the recognizer may be configured to interpret a natural language input to correspond to the skill component 125). In at least some other examples, a recognizer 363 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and/or a custom domain.

Recognizers 363 may process in parallel, in series, partially in parallel, etc. For example, a recognizer corresponding to a first domain may process at least partially in parallel to a recognizer corresponding to a second domain. For further example, a recognizer corresponding to a first skill component may process at least partially in parallel to a recognizer corresponding to a second skill component.

The NLU component 260 may communicate with various storages. The NLU component 260 may communicate with an NLU storage 373, which includes skill component grammars (376a-376n), representing how natural language inputs may be formulated to invoke skill components 125, and skill component intents (378a-378n) representing intents supported by respective skill components 125.

Each recognizer 363 may be associated with a particular grammar 376, one or more particular intents 378, and a particular personalized lexicon 386 (stored in an entity library 382). A gazetteer 384 may include skill component-indexed lexical information associated with a particular user. For example, Gazetteer A (384a) may include skill component-indexed lexical information 386aa to 386an. A user's music skill component lexical information might include album titles, artist names, and song names, for example, whereas a user's contact list skill component lexical information might include the names of contacts. Since every user's music collection and contact list is presumably different, this personalized information may improve entity resolution.

Each recognizer 363 may include a NER component 362 that attempts to identify grammars and lexical information that may be used to construe meaning with respect to text data input therein. A NER component 362 identifies portions of text data that correspond to a named entity that may be recognizable by the remote system 120. A NER component 362 may also determine whether a word refers to an entity that is not explicitly mentioned in the text, for example "him," "her," "it" or other anaphora, exophora or the like.

A NER component 362 applies grammar models 376 and lexical information 386 associated with one or more skill components 125 to determine a mention of one or more entities in text data input therein. In this manner, a NER component 362 identifies "slots" (i.e., particular words in text data) that may be needed for later processing. A NER component 362 may also label each slot with a type (e.g., noun, place, city, artist name, song name, etc.).

Each grammar model 376 may include the names of entities (i.e., nouns) commonly found in natural language about a particular skill component 125 to which the grammar model 376 relates, whereas lexical information 386 may be personalized to the user identifier output by a user recognition component 295 for the natural language input. For example, a grammar model 376 associated with a shopping skill component may include a database of words commonly used when people discuss shopping.

A downstream process called named entity resolution actually links a portion of text data (identified by a NER component 362) to a specific entity known to the remote system 120. To perform named entity resolution, the NLU component 260 may use gazetteer information (384a-384n) stored in the entity library storage 382. The gazetteer information 384 may be used to match text data (identified by a NER component 362) with different entities, such as song titles, contact names, etc. Gazetteers may be linked to users (e.g., a particular gazetteer may be associated with a specific user's music collection), may be linked to certain skill components 125 (e.g., a shopping skill component, a music skill component, a video skill component, a communications skill component, etc.), or may be organized in another manner.

Each recognizer 363 may also include an IC component 364 that processes text data input thereto to determine an intent(s) of a skill component(s) 125 that potentially corresponds to the natural language input represented in the text data. An intent corresponds to an action to be performed that is responsive to the natural language input represented by the text data. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 378 associated with the skill component(s) 125 that is associated with the recognizer 363 implementing the IC component 364.

The intents identifiable by a specific IC component 364 may be linked to one or more skill component-specific grammar frameworks 376 with "slots" to be filled. Each slot of a grammar framework 376 corresponds to a portion of text data that a NER component 362 believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, a NER component 362 may identify words in text data as subject, object, verb, preposition, etc. based on grammar rules and/or models prior to recognizing named entities in the text data. An IC component 364 (implemented by the same recognizer 363) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in the text data the NER component 362 previously tagged as a grammatical object or object modifier with those identified in the lexicon 386.

A NER component 362 may perform semantic tagging, which is the labeling of a word or combination of words according to their type/semantic meaning. A NER component 362 may parse text data using heuristic grammar rules, or a model may be constructed using techniques such as hidden Markov models, maximum entropy models, log linear models, conditional random fields (CRF), and the like. For example, a NER component 362, implemented by a music skill component or music domain recognizer 363, may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 may identify "Play" as a verb based on a word database associated with the music skill component or music domain, which an IC component 364 may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (in the knowledge base 372). For example, if the text data corresponds to "play songs by the rolling stones," after failing to determine an album name or song name called "songs" by "the rolling stones," the NER component 362 may search a music skill component vocabulary for the word "songs." In the alternative, generic words may be checked before the gazetteer information, or both may be tried, potentially producing two different results.

A recognizer 363 may tag text data to attribute meaning thereto. For example, a recognizer 363 may tag "play mother's little helper by the rolling stones" as: {skill component} Music, {intent} Play Music, {artist name} rolling stones, {media type} SONG, and {song title} mother's little helper. For further example, a recognizer 363 may tag "play songs by the rolling stones" as: {skill component} Music, {intent} Play Music, {artist name} rolling stones, and {media type} SONG.

As described above, more than one recognizer 363 may process with respect to text data representing a single natural language input. In such instances, each recognizer 363 may output at least one NLU hypothesis including an intent indicator (determined by an IC component 364 of the recognizer 363) and at least one tagged named entity (determined by a NER component 362 of the recognizer 363).

The NLU component 260 may include a shortlister component 410. The shortlister component 410 selects skill components that may execute in response to the natural language input. The shortlister component 410 thus limits downstream, more resource intensive NLU processes to being performed with respect to skill components 125 that are likely to execute in response to the natural language input.

Without a shortlister component 410, the NLU component 260 may process a given ASR hypothesis (or the text data 213 depending on the type of natural language input being processed) with respect to every skill component 125 of (or in communication with) the remote system 120, either in parallel, in series, or using some combination thereof. By implementing a shortlister component 410, the NLU component 260 may process a given ASR hypothesis (or the text data 213) with respect to only the skill components 125 that are likely to execute in response to the natural language input. This reduces total compute power and latency attributed to NLU processing.

The shortlister component 410 may include one or more trained models. The model(s) may be trained to recognize various forms of natural language inputs that may be received by the remote system 120. For example, during a training period a skill component 125 may provide the remote system 120 with training data representing sample natural language inputs that may be provided by a user to invoke the skill component 125. For example, for a ride sharing skill component may provide the remote system 120 with training data including text corresponding to "get me a cab to [location]," "get me a ride to [location]," "book me a cab to [location]," "book me a ride to [location]," etc. The one or more trained models, to be used by the shortlister component 410, may be trained using the training data to determine other potentially related natural language input structures that a user may try to use to invoke the particular skill component 125. During training, the remote system 120 may query the skill component 125 regarding whether the determined other natural language input structures are permissible, from the perspective of the skill component 125, to be used to invoke the skill component 125 at runtime. The alternate natural language input structures may be derived by one or more trained models during model training and/or may be based on natural language input structures provided by different skill components. The skill component 125 may also provide the remote system 120 with training data indicating grammar and annotations. The remote system 120 may use the training data representing the sample natural language inputs, the determined related natural language input(s), the grammar, and the annotations to train a model that indicates when a runtime natural language inputs is likely to be directed to/handled by a skill component. Each trained model of the shortlister component 410 may be trained with respect to a different skill component 125. Alternatively, the shortlister component 410 may use one trained model per skill component 125 type, such as one trained model for weather skill components, one trained model for ride sharing skill components, etc.

The remote system 120 may use the sample natural language inputs provided by a skill component 125, and related sample natural language inputs determined during training, as binary examples to train a model associated with the skill component 125. The model associated with the particular skill component 125 may then be operated at runtime by the shortlister component 410. For example, some sample natural language inputs may be positive examples (e.g., natural language inputs that may be used to invoke the skill component 125). Other sample natural language inputs may be negative examples (e.g., natural language inputs that may not be used to invoke the skill component 125).

As described above, the shortlister component 410 may include a different trained model for each skill component 125, a different trained model for each skill component 125 category, or some other combination of trained model(s). For example, the shortlister component 410 may alternatively include a single model. The single model may include a portion trained with respect to characteristics (e.g., semantic characteristics) shared by all skill components 125. The single model may also include skill component 125-specific portions, with each skill component 125-specific portion being trained with respect to a different skill component 125. Implementing a single model with skill component 125-specific portions may result in less latency than implementing a different trained model for each skill component 125 because the single model with skill component 125-specific portions limits the number of characteristics processed on a per skill system level.

The portion of the model, trained with respect to characteristics shared by more than one skill component 125, may be clustered based on skill component 125 type. For example, a first portion, of the portion trained with respect to multiple skill components 125, may be trained with respect to weather skill components 125; a second portion, of the portion trained with respect to multiple skill components 125, may be trained with respect to music skill components 125; a third portion, of the portion trained with respect to multiple skill components 125, may be trained with respect to travel skill components 125; etc.

Clustering may not be beneficial in every instance because clustering may cause the shortlister component 410 to output indications of only a portion of the skill components 125 that the natural language input may relate to. For example, a natural language input may correspond to "tell me about Tom Collins." If the model is clustered based on skill component 125 type, the shortlister component 410 may determine the natural language input corresponds to a recipe skill component 125 (e.g., a drink recipe) even though the natural language input may also correspond to an information skill component 125 (e.g., storing or otherwise having access to information about a person named Tom Collins).

Training the shortlister component 410 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The shortlister component 410 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 410 determines a natural language input is associated with multiple skill components 125, only the recognizers 363 associated with those skill components 125 may process with respect to the natural language input. The selected recognizers 363 may process in parallel, in series, partially in parallel, etc. For example, if the shortlister component 410 determines a natural language input may relate to both a communications skill component 125 and a music skill component 125, a recognizer 363 associated with the communications skill component 125 may process in parallel, or partially in parallel, with a recognizer 363 associated with the music skill component 125 processing.

The shortlister component 410 may make binary determinations (e.g., yes or no) regarding which skill component(s) 125 corresponds to a natural language input. The shortlister component 410 may make such determinations using the one or more trained models described herein above. If the shortlister component 410 implements a single trained model for each skill component 125, the shortlister component 410 may simply run the models that are associated with enabled skill components 125 as indicated in a profile (e.g., stored in a profile storage 270 described in further detail below) associated with the user device 110 and/or user 5 that originated the natural language input.

The shortlister component 410 may generate shortlisted skill component data 415 representing one or more skill components 125 that may execute in response to the natural language input. The number of skill components 125 represented in the shortlisted skill component data 415 is configurable. In an example, the shortlisted skill component data 415 may indicate every skill component 125 of (or otherwise in communication with) the remote system 120 as well as contain an indication, for each skill component 125, representing whether the associated skill component 125 is likely capable of processing in response to the natural language input. In another example, instead of indicating every skill component 125, the shortlisted skill component data 415 may only indicate the skill components 125 that are likely capable of processing in response to the natural language input. In yet another example, the shortlister component 410 may implement thresholding such that the shortlisted skill component data 415 may indicate no more than a maximum number of skill components 125 that may process in response to the natural language input.

In at least some embodiments, the shortlister component 410 may generate a score representing how likely a skill component 125 is likely to processing in response to a natural language input. In such embodiments, the shortlisted skill component data 415 may only include identifiers of skill components 125 associated with scores meeting or exceeding a threshold score.

In the situation where the ASR component 250 outputs ASR output data including more than one interpretation of a natural language input, the shortlister component 410 may output different shortlisted skill component data 415 for each interpretation. Alternatively, the shortlister component 410 may output a single shortlisted skill component data 415 representing the skill components 125 corresponding to the different interpretations.

As indicated above, the shortlister component 410 may implement thresholding such that the shortlisted skill component data 415 may indicate no more than a threshold number of skill components 125 (e.g., may include no more than a threshold number of skill component 125 identifiers). If the ASR component 250 outputs ASR output data including more than one interpretation of a natural language input, the shortlisted skill component data 415 may indicate no more than a threshold number of skill components 125 irrespective of the number of interpretations output by the ASR component 250. Alternatively or in addition, the shortlisted skill component data 415 may indicate no more than a threshold number of skill components 125 for each interpretation (e.g., indicating no more than five skill components 125 for a first interpretation, no more than five skill components 125 for a second interpretation, etc.).

In addition to making a binary determination regarding whether a skill component 125 may process in response to a natural language input, the shortlister component 410 may generate scores representing likelihoods that skill components 125 may process in response to the natural language inputs. If the shortlister component 410 implements a different trained model for each skill component 125, the shortlister component 410 may generate a different confidence score for each skill component 125-specific trained model that is run by the shortlister component 410. For example, if the shortlister component 410 runs the models of every skill component 125 of (or otherwise in communication with) the remote system 120, the shortlister component 410 may generate a respective confidence score for each skill component 125 of (or otherwise in communication with) the remote system 120. For further example, if the shortlister component 410 only runs models specific to skill components 125 that are indicated as enabled in a profile associated with the user device 110 and/or user 5 (as stored in the profile storage 270), the shortlister component 410 may only generate a respective confidence score for each enabled skill component 125. For further examine, if the shortlister component 410 implements a single trained model with skill component 125-specific portions, the shortlister component 410 generate a respective confidence score for each skill component 125 who's specifically trained portion is run. The shortlister component 410 may perform matrix vector modification to obtain confidence scores for skill components 125.

An example of shortlisted skill component data 415 including confidence scores may be represented as:
Search skill component, 0.67
Recipe skill component, 0.62
Information skill component, 0.57

As indicated, the confidence scores output by the shortlister component 410 may be numeric values. The confidence scores output by the shortlister component 410 may alternatively be binned values (e.g., high, medium, low).

The shortlister component 410 may consider other data 420 when determining which skill components 125 may process in response to a natural language input. The other data 420 may be character embedded prior to being input to the shortlister component 410. The other data 420 may alternatively be embedded using other techniques.

The other data 420 may include usage history data associated with the user device 110 and/or user 5. For example, a confidence score of a skill component 125 may be increased if natural language inputs captured by the user device 110 and/or originating from the user 5 routinely relate to the skill component 125. Conversely, a confidence score of a skill component 125 may be decreased if natural language inputs captured by the user device 110 and/or originated from the user 5 rarely relate to the skill component 125.

The other data 420 may indicate the skill components 125 that are enabled with respect to the user device 110 and/or user 5 (e.g., as represented in the profile storage 270). The shortlister component 410 may use such data to determine which skill component 125-specific trained models to run. That is, the shortlister component 410 may determine to only run the trained models associated with enabled skill components 125. The shortlister component 410 may alternatively use such data to alter skill component confidence scores represented in the shortlisted skill component data 415.

As an example, considering two skill components 125, one enabled and another unenabled, the shortlister component 410 may run a first model (or model portion) specific to the unenabled skill component as well as a second model (or model portion) specific to the enabled skill component. The shortlister component 410 may initially determine a confidence score of 0.60 for each of the unenabled skill component and the enabled skill component. The shortlister component 410 may then alter those confidence scores based on which skill component is enabled. For example, the shortlister component 410 may increase the confidence score associated with the enabled skill component and/or decrease the confidence score associated with the unenabled skill component.

A user 5 may provide the remote system 120 with indications of which skill components 125 are enabled (e.g., authorized to execute using data associated with the user 5). Such indications may be stored in the profile storage 270. The shortlister component 410 may determine whether profile data associated with the user 5 and/or user device 110 that originated the natural language input includes indications of enabled skill components 125.

The other data 420 may indicate a type of the user device 110. The type of the user device 110 may indicate the input/output capabilities of the user device 110. For example, a user device 110 may include a display, may be headless (e.g., displayless), may be mobile or stationary, may include audio playback capabilities, may include a camera, etc. The shortlister component 410 may use such other data 420 to determine which skill component 125-specific trained models (or portions of a model) to run. For example, if the user device 110 corresponds to a displayless type of user device, the shortlister component 410 may determine not to run trained models (or portions of a model) specific to skill components 125 that output video data. The shortlister component 410 may alternatively use such other data 420 to alter skill component confidence scores represented in the shortlisted skill component data 415.

As an example, considering two skill components 125, one that outputs audio data and another that outputs video data, the shortlister component 410 may run a first model (or first portion of a model) specific to the skill component 125 that generates audio data as well as a second model (or second portion of a model) specific to the skill component 125 that generates video data. The shortlister component 410 may initially determine a confidence score of 0.60 for each of the skill components 125. The shortlister component 410 may then alter the original confidence scores based on the type of the user device 110. For example, if the user device 110 is a displayless device, the shortlister component 410 may increase the confidence score associated with the skill component 125 that generates audio data and/or decrease the confidence score associated with the skill component 125 that generates video data.

The type of user device information represented in the other data 420 may represent output capabilities of the user device 110 to be used to output content to the user 5, which may not necessarily be the user device 110 that captured the natural language input. For example, a displayless user device 110 may receive a natural language input corresponding to "play Game of Thrones". The remote system 120 may determine a smart TV, or other user device including or otherwise associated with a display, is to be used to output multimedia content (e.g., audio and video) corresponding to the title "Game of Thrones".

The other data 420 may include data indicating the user device 110's speed, location, or other mobility information. For example, the user device 110 may correspond to a vehicle including a display. If the vehicle is moving, the shortlister component 410 may decrease the confidence score associated with a skill component 125 that generates video data as it may be undesirable to output video content to the user 5 while in a moving vehicle. The vehicle may output data to the remote system 120 indicating when the vehicle is in motion.

The other data 420 may include data indicating a currently invoked skill component 125 (e.g., a skill component 125 that is being used to output content to the user 5 when the user device 110 receives the natural language input). For example, the user 5 may speak a first (e.g., a previous) input causing the remote system 120 to invoke a music skill component 125 to output music to the user 5. As the music is being output to the user 5, the remote system 120 may receive a second (e.g., a current) natural languate input. The shortlister component 410 may use such other data 420 to alter skill component confidence scores represented in the shortlisted skill component data 415. For example, the shortlister component 410 may run a first model (or a first portion of model) specific to a first skill component 125 as well as a second model (or second portion of a model) specific to a second skill component 125. The shortlister component 410 may initially determine a confidence score of 0.60 for each of the skill components 125. The shortlister component 410 may then alter the original confidence scores based on the first skill component 125 being invoked to output content while the current natural language input was received. Based on the first skill component 125 being invoked, the shortlister component 410 may increase the confidence score associated with the first skill component 125 and/or decreas the confidence score associated with the second skill component 125.

The thresholding implemented with respect to the shortlisted skill component data 415 and the different types of other data 420 considered by the shortlister component 410 are configurable. For example, the shortlister component 410 may update confidence scores as more other data 420 is considered.

The shortlister component 410 may cause the NLU component 260 to invoke only a subset of the recognizers 363 associated with skill components 125 represented in the shortlisted skill component 415 as being likely to process in response to the natural language input. If the shortlister component 410 generates the shortlisted skill component data 415 to include confidence scores, the shortlister component 410 may cause the NLU component 260 to invoke only recognizers 363 associated with skill components 125 associated with confidence scores satisfying (e.g., meeting or exceeding) a condition (e.g., a threshold confidence score).

Figure 4:
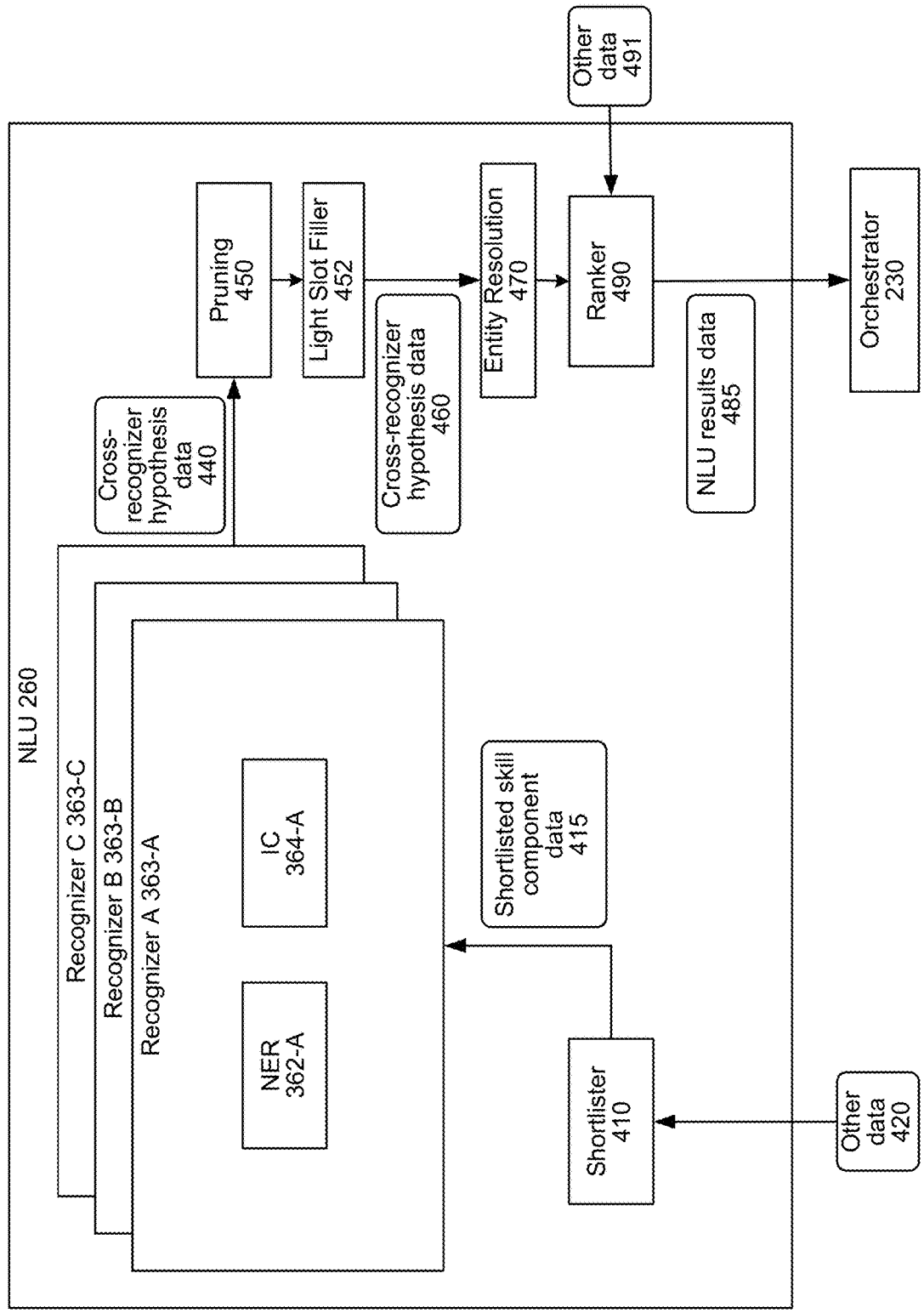
FIG. 4 is a conceptual diagram of how natural language processing may be performed, according to embodiments of the present disclosure.

The NLU component 260 may compile NLU hypotheses, output by multiple recognizers 363, into cross-recognizer hypothesis data 440 (illustrated in FIG. 4). Each NLU hypothesis may be associated with a respective score indicating a likelihood that the NLU hypothesis corresponds to the domain, one or more skill components 125, etc. associated with the recognizer 363 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones
[0.70] Intent: <PlayVideo> VideoTitle: GameOfThrones.

While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 260 may send the cross-recognizer hypothesis data 440 to a pruning component 450, which sorts the NLU hypotheses, represented in the cross-recognizer hypothesis data 440, according to their respective scores. The pruning component 450 may then perform score thresholding with respect to the cross-recognizer hypothesis data 440. For example, the pruning component 450 may select NLU hypotheses, represented in the cross-recognizer hypothesis data 440, associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component 450 is to create a reduced list of NLU hypotheses so that downstream, more resource intensive, processes may only operate on NLU hypotheses that most likely represent the natural language input.

The NLU component 260 may include a light slot filler component 452 that takes text from slots, represented in the NLU hypotheses output by the pruning component 450, and alters it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill component 125, domain, etc. to which a NLU hypothesis relates. For example, for a travel skill component 125-specific NLU hypothesis, the entity resolution component 470 may transform text corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text. Referring to the example natural language input "play songs by the stones," the entity resolution component 470 may reference a personal music catalog, Amazon Music account, a user profile, or the like (for example stored in the profile storage 270). The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill component 125 to perform an action responsive to the natural language input. The NLU component 260 may include multiple entity resolution components 470 that are each specific to one or more different skill components 125, domains, etc.

The NLU component 260 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also other data 491. The other data 491 may include a variety of information.

For example, the other data 491 indicate skill component 125 rating or popularity. For example, if a skill component 125 has a high rating, the ranker component 490 may increase the score of a NLU hypothesis associated with that skill component 125, and vice versa.

The other data 491 may indicate skill components 125 that have been enabled by the user 5. For example, the ranker component 490 may assign higher scores to NLU hypotheses associated with enabled skill components 125 than NLU hypotheses associated with skill components 125 that have not been enabled by the user 5.

The other data 491 indicate system usage history (e.g., specific to the user 5), such as if the user 5 regularly invokes a particular skill component 125 or does so at particular times of day. The other data 491 may indicate a present date, a present time, location of the user device 110, weather information, a type of the device 110, a user identifier of the user 5, context information, as well as other information. For example, the ranker component 490 may consider when any particular skill component 125 is currently active with respect to the present user 5 and/or user device 110 (e.g., music being output by the skill component 125 when the current natural language input is received).

The ranker component 490 may output NLU results data 485 including one or more NLU hypotheses. The NLU component 260 may send the NLU results data 285 to the orchestrator component 230.

As described above, the remote system 120 may perform speech processing using two different components (e.g., the ASR component 250 and the NLU component 260). One skilled in the art will appreciate that the remote system 120, in at least some embodiments, may implement a SLU component configured to process audio data 211 to generate NLU results data 485.

In some examples, the SLU component may be equivalent to a combination of the ASR component 250 and the NLU component 260. Yet, the SLU component may process audio data 211 and directly generate the NLU results data 485, without an intermediate step of generating ASR output data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. The SLU component may output a most likely NLU hypothesis, or multiple NLU hypotheses associated with respective confidence scores or other scores (such as probability scores, etc.).

Referring again to FIG. 2 and as described above, the remote system 120 may include or otherwise communicate with one or more skill components 125. A skill component 125 may be configured to execute with respect to NLU results data 485. For example, for NLU results data 485 including a <GetWeather> intent, the remote system 120 (and more particularly the orchestrator component 230) may invoke a weather skill component 125 to determine and output weather information for a geographic location represented in a user profile or corresponding to a location of the user device 110 that captured the corresponding natural language input. For further example, for NLU results data including a <BookRide> intent, the remote system 120 (and more particularly the orchestrator component 230) may invoke a taxi skill component 125 may book a requested ride. In another example, for NLU results data including a <BuyPizza> intent, the remote system 120 (and more particularly the orchestrator component 230) may invoke a restaurant skill component 125 may place an order for a pizza. A skill component 125 may operate in conjunction between the remote system 120 and other devices, such as the user device 110, restaurant electronic ordering systems, taxi electronic booking systems, etc. in order to complete certain functions. Inputs to a skill component 125 may come from speech processing interactions or through other interactions or input sources.

A skill component 125 may be associated with a domain, a non-limiting list of which includes a smart home domain, a music domain, a video domain, a weather domain, a communications domain, a flash briefing domain, a shopping domain, and a custom domain.

The remote system 120 may include a TTS component 280 that generates audio data (e.g., synthesized speech) from text data using one or more different methods. Text data input to the TTS component 280 may come from a skill component 125, the orchestrator component 230, or another component of the remote system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include a user recognition component 295. In at least some examples, the user recognition component 295 may be implemented as a skill component 125.

The user recognition component 295 may recognize one or more users using various data. The user recognition component 295 may take as input the audio data 211 and/or the text data 213. The user recognition component 295 may perform user recognition processing by comparing speech characteristics, in the audio data 211, to stored speech characteristics of users. The user recognition component 295 may additionally or alternatively perform user recognition processing by comparing biometric data (e.g., fingerprint data, iris data, retina data, etc.), received by the remote system 120 in correlation with a current natural language input, to stored biometric data of users. The user recognition component 295 may additionally or alternatively perform user recognition processing by comparing image data (e.g., including a representation of at least a feature of the user 5), received by the remote system 120 in correlation with a current natural language input, with stored image data including representations of features of different users of the user device 110. The user recognition component 295 may perform other or additional user recognition processes, including those known in the art. For a particular natural language input, the user recognition component 295 may perform processing with respect to stored data of users associated with the user device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers with respective values representing likelihoods of respective users originating the natural language input. The output of the user recognition component 295 may be used to inform NLU processing, processing performed by a skill component(s) 125, as well as processing performed by other components of the remote system 120 and/or other systems.

The remote system 120 may include profile storage 270. The profile storage 270 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill components 125 that the user has enabled. When a user enables a skill component 125, the user is providing the remote system 120 with permission to allow the skill component 125 to execute with respect to the user's natural language inputs. If a user does not enable a skill component 125, the remote system 120 may not invoke the skill component 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Various machine learning techniques may be used to train and operate a machine learned model for various disclosed components. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
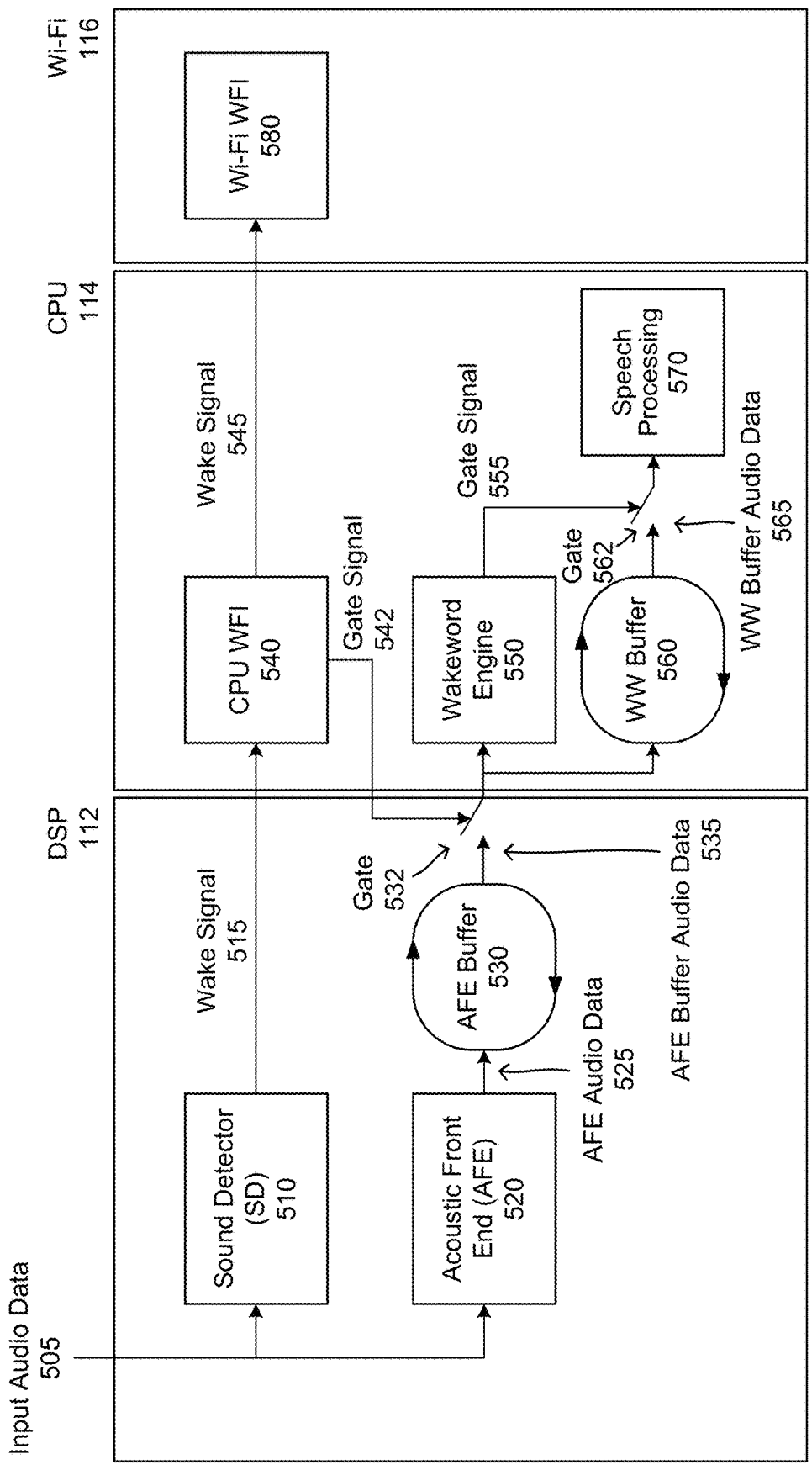
FIG. 5 illustrates an example component diagram for performing low power mode wakeword detection according to embodiments of the present disclosure.

FIG. 5 illustrates an example component diagram for performing low power mode wakeword detection according to embodiments of the present disclosure. As illustrated in FIG. 5, the device 110 may include three separate components; a digital signal processor (DSP) component 112, a central processing unit (CPU) component 114, and a Wi-Fi component 116. In some examples, the DSP component 112 may correspond to a first processor associated with a first integrated circuit (e.g., first microchip) and the CPU component 114 may correspond to a second processor associated with a second integrated circuit (e.g., second microchip). Thus, the DSP component 112 and the CPU component 114 may correspond to separate components within the device 110. However, the disclosure is not limited thereto, and in other examples the DSP component 112 may correspond to a first processor associated with a first integrated circuit and the CPU component 114 may correspond to a second processor associated with the first integrated circuit (e.g., system on a chip (SoC)) without departing from the disclosure.

During normal operation of the device 110, each of the DSP component 112, the CPU component 114, and the Wi-Fi component 116 may operate in a first mode (e.g., active mode) associated with first power consumption. For example, the device 110 may operate in the first mode when active usage is observed and/or background activities are running, enabling the device 110 to promptly process input commands or perform other actions for the user 5.

When active usage is not observed and/or background activities are not running, however, the device 110 may be configured to operate in a reduced power mode to reduce a power consumption of the device 110. For example, during the reduced power mode the device 110 may operate the CPU component 114 and/or the Wi-Fi component 116 in a second mode (e.g., low power mode (LPM)) associated with second power consumption that is less than the first power consumption. While in the reduced power mode, however, the device 110 may continue to operate the DSP component 112 in the first mode.

As used herein, a low power mode (LPM) may refer to a specific mode in which a component may operate in order to reduce a power consumption of the component. For example, the component may either operate in the first mode (e.g., active mode) or the second mode (e.g., LPM). To illustrate an example, during the second mode one or more CPU core(s) associated with the CPU component 114 may be suspended. Additionally or alternatively, during the second mode the Wi-Fi component 116 may operate in a Delivery Time Indication Message (DTIM) power save mode, although the disclosure is not limited thereto. In contrast, a reduced power mode may refer to a period of time in which the LPM is duty cycled to periodically wake up the component to perform one or more actions. For example, during the reduced power mode, the device 110 may operate the component in the first mode for a first portion of an on-off duty cycle and may operate the component in the second mode for a second portion of the duty cycle. Thus, the duty cycle may indicate a pulse width corresponding to when the component is operating in the first mode.

As described in greater detail above with regard to FIG. 1B and below with regard to FIGS. 11-17, in some examples the device 110 may operate the Wi-Fi component 116 in the reduced power mode, periodically waking the Wi-Fi component 116 in order to perform action(s) to enable certain functionality (e.g., new device provisioning, device synchronization, etc.).

As described in greater detail above with regard to FIG. 1A, however, in other examples the device 110 may operate the CPU component 114 in the low power mode. While the CPU component 114 is in the low power mode, the device 110 may monitor an acoustic environment for an input trigger using the DSP component 112. For example, the device 110 may perform wakeword detection 500 during the low power mode using the DSP component 112.

As illustrated in FIG. 5, the DSP component 112 may receive input audio data 505 and may process the input audio data 505 in parallel using a sound detector (SD) component 510 and an acoustic front end (AFE) component 520. For example, the AFE component 520 may perform beamforming or other processing to the input audio data 505 to generate AFE audio data 525 and may store the AFE audio data in an AFE buffer component 530, which may include a circular buffer.

To illustrate an example, the AFE component 520 may perform beamforming to generate a plurality of audio signals that includes a first audio signal corresponding to a first direction, a second audio signal corresponding to a second direction, and so on. The AFE component 520 may determine a signal quality metric for each of the plurality of audio signals and may select one or more audio signals to output. For example, the AFE component 520 may determine that a first signal quality metric value associated with the first audio signal indicates a higher signal quality than a second signal quality metric value associated with the second audio signal. As a result, the AFE component 520 may generate the AFE audio data 525 using the first audio signal. The signal quality metric may correspond to a signal-to-noise ratio (SNR), a signal-to-interference-plus-noise ratio, and/or the like without departing from the disclosure.

The SD component 510 may process the input audio data 505 to detect an audible sound and/or sound event. For example, a key trigger is the sensing and detection of ambient sounds that meet a designed detection criteria. If the SD component 510 detects a sound represented in the input audio data 505, the SD component 510 may send a wake signal 515 to the CPU Wake from Interrupt (WFI) component 540 associated with the CPU component 114. For example, the wake signal 515 can be sent as a binary bit set to "1" to indicate that no sound event was detected and that the low power mode is applicable. Otherwise, the wake signal 515 can be sent as a binary bit set to "0" to indicate that a sound event was detected and that the active mode is applicable. However, the disclosure is not limited thereto and the wake signal 515 may vary without departing from the disclosure. For example, a voltage on a line that couples the SD component 510 with the CPU WFI component 540 can be set to and maintained at a high voltage to indicate that no sound event was detected and that the low power mode is applicable and, otherwise, to a low voltage. In another example, an application programming interface (API) may be used to send, to the CPU WFI component 540, a flag set to "1" to indicate that no sound event was detected and that the low power mode is applicable and, otherwise, set to "0." However, the disclosure is not limited thereto and the SD component 510 may send other wake interrupt signals to the CPU WFI component 540 without departing from the disclosure.

The CPU WFI component 540 may be configured to wake the CPU component 114 (e.g., operate the CPU component 114 in the first mode) when certain wake triggers are detected. For example, in response to receiving the wake signal 515, the CPU WFI component 540 may wake the CPU component 114, may send a gate signal 542 to a gate 532 associated with the AFE buffer 530, and/or may send a wake signal 545 to a Wi-Fi Wake from Interrupt (WFI) component 580 associated with the Wi-Fi component 116. Similarly, the Wi-Fi WFI component 580 may be configured to wake the Wi-Fi component 116 (e.g., operate the Wi-Fi component 116 in the first mode) in response to receiving the wake signal 545.

As used herein, the wake signal 515 and/or the wake signal 545 may correspond to a wake interrupt, which is a hardware signal that triggers a wakeup event. For example, the CPU WFI component 540 may detect a first interrupt (e.g., the wake signal 515) and wake the CPU component 114 (e.g., cause the CPU component 114 to operate in the first mode). Similarly, the Wi-Fi WFI component 580 may detect a second interrupt (e.g., wake signal 545) and may wake the Wi-Fi component 116 (e.g., cause the Wi-Fi component 116 to operate in the first mode). In some examples, the WFI component 540/580 may correspond to a wakeup interrupt controller (WIC) without departing from the disclosure, although the disclosure is not limited thereto.

The gate 532 may be associated with the AFE buffer component 530 and may prevent the AFE buffer component 530 from sending AFE buffer audio data 535 stored in the AFE buffer component 530 to a wakeword engine component 550 of the CPU component 114. Thus, when the gate 532 receives the gate signal 542, the gate 532 may enable the AFE buffer component 530 to send the AFE buffer audio data 535 (e.g., current contents of the AFE buffer component 530) to the wakeword engine component 550. In addition, the AFE buffer component 530 may send the AFE buffer audio data 535 to a wakeword (WW) buffer component 560 associated with the CPU component 114, which may include a circular buffer.

As used herein, "gate signal" can be as simple as applying a signal to close a switch or a current to the base or gate of a transistor that is acting as a switch. A switch signal may also be an interrupt signal that more complex circuitry would receive and act accordingly without departing from the disclosure.

Once the CPU component 114 is operating in the first mode (e.g., active mode) and the wakeword engine component 550 receives the AFE buffer audio data 535, the wakeword engine component 550 may process the AFE buffer audio data 535 to determine whether a wakeword is represented in a portion of the AFE buffer audio data 535. If the wakeword engine component 550 determines that a wakeword is represented (e.g., detects the wakeword) in a portion of the AFE buffer audio data 535, the wakeword engine component 550 may send a gate signal 555 to a gate 562 associated with the WW buffer component 560.

The gate 562 may be associated with the WW buffer component 560 and may prevent the WW buffer component 560 from sending WW buffer audio data 565 stored in the WW buffer component 560 to a speech processing component 570 associated with the CPU component 114. Thus, when the gate 562 receives the gate signal 555, the gate 562 may enable the WW buffer component 560 to send the WW buffer audio data 565 (e.g., current contents of the WW buffer component 560) to the speech processing component 570.

In some examples, the speech processing component 570 may be configured to perform local speech processing on the device 110. For example, the speech processing component 570 may be configured to process the WW buffer audio data 565 to generate natural language understanding (NLU) data (e.g., intent data and/or the like) corresponding to a voice command represented in the WW buffer audio data 565. Using the NLU data, the device 110 may perform one or more actions responsive to the voice command.

In other examples, however, the speech processing component 570 may be configured to perform remote speech processing using the remote system 120. For example, the speech processing component 570 may be configured to send the WW buffer audio data 565 to the remote system 120 (e.g., via the Wi-Fi component 116, although the disclosure is not limited thereto) and the remote system 120 may perform speech processing on the WW buffer audio data 565. Thus, the remote system 120 may generate natural language understanding (NLU) data (e.g., intent data and/or the like) corresponding to the voice command represented in the WW buffer audio data 565, may determine one or more actions to perform that are responsive to the voice command, and may send instruction(s) to the device 110 and/or other devices to perform the one or more actions. Depending on the one or more actions to perform, the device 110 may receive instruction(s) and perform at least some of the one or more actions, although the disclosure is not limited thereto. While FIG. 5 illustrates the CPU component 114 including the speech processing component 570, the disclosure is not limited thereto and the device 110 may omit the speech processing component 570 without departing from the disclosure. For example, the wakeword engine component 550 itself may be configured to send the WW buffer audio data 565 to the remote system 120 (e.g., via the Wi-Fi component 116, although the disclosure is not limited thereto) without departing from the disclosure.

Additionally or alternatively, the speech processing component 570 may be configured to perform hybrid speech processing using the remote system 120 without departing from the disclosure. In some examples, the speech processing component 570 may be configured to perform limited speech processing on the WW buffer audio data 565 while also sending the WW buffer audio data 565 to the remote system 120 for full speech processing. In other examples, the speech processing component 570 may be configured to perform full speech processing on the WW buffer audio data 565 while also sending the WW buffer audio data 565 to the remote system 120 for full speech processing. For example, the speech processing component 570 may generate local NLU data and may receive remote NLU data from the remote system 120. If the device 110 does not receive the remote NLU data within a period of time, the device 110 may perform one or more actions based on the local NLU data. However, the disclosure is not limited thereto and the speech processing component 570 may be configured to perform hybrid speech processing using any technique without departing from the disclosure.

In order to reduce a latency associated with performing low power mode wakeword detection, the wakeword engine component 550 may process the AFE buffer audio data 535 at an accelerated rate (e.g., faster processing speed than real-time processing). For example, if the CPU component 114 was operating in the first mode when the input audio data 505 was captured, the wakeword engine component 550 may process the AFE buffer audio data 535 at a first speed (e.g., 1×) and/or first rate (e.g., processing a first number of samples per second). However, if the CPU component 114 was operating in the second mode when the input audio data 505 was captured, the wakeword engine component 550 may process the AFE buffer audio data 535 at a second speed (e.g., 5×) and/or second rate (e.g., processing a second number of samples per second) without departing from the disclosure.

The AFE buffer audio data 535 may be associated with a sampling rate (e.g., sampling frequency), which indicates an average number of audio samples required to represent one second of audio. Thus, the AFE buffer audio data 535 may have a sampling frequency (e.g., 4 kHz, 8 kHz, 16 kHz, 44.1 kHz, etc.) corresponding to a third number of samples per second. In some examples, the first rate may be equal to the sampling rate, such that the wakeword engine component 550 processes the AFE buffer audio data 535 in real-time. For example, the wakeword engine component 550 may be configured to process the third number of samples every second, meaning that it takes the wakeword engine component 550 one second of processing time to process a portion of the AFE buffer audio data 535 representing one second of audio. However, the disclosure is not limited thereto and the first rate may be different than the sampling rate without departing from the disclosure.

Figure 6:
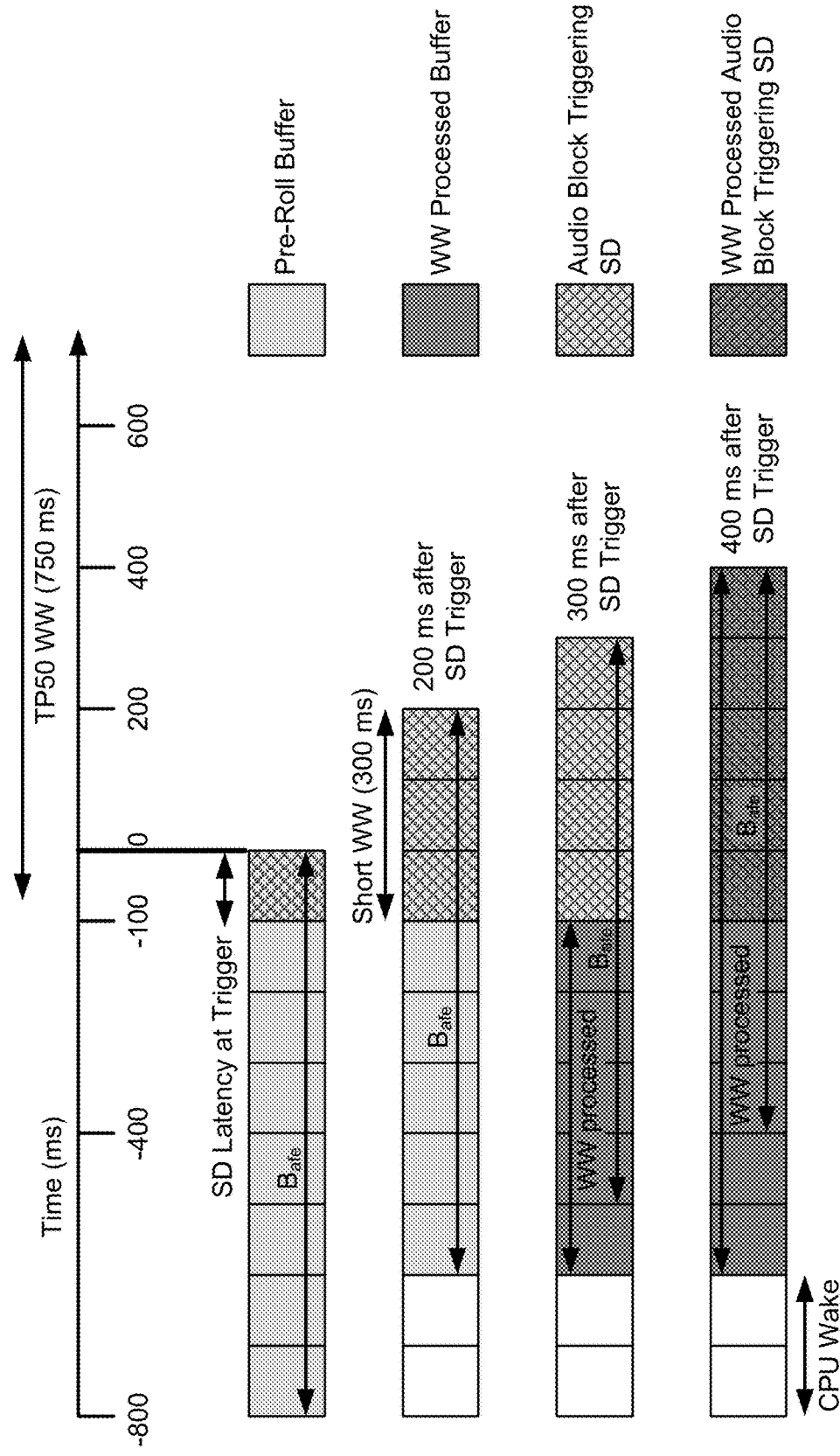
FIG. 6 illustrates an example of low power mode wakeword detection latency according to embodiments of the present disclosure.

In order to reduce the latency associated with performing low power mode wakeword detection, the second rate may be higher than the first rate and the sampling rate, such that the wakeword engine component 550 processes the AFE buffer audio data 535 in a fraction of the time required during real-time processing. For example, the wakeword engine component 550 may be configured to process a multiple of the third number of samples every second, meaning that it takes the wakeword engine component 550 one second of processing time to process a portion of the AFE buffer audio data 535 representing several seconds of audio. As illustrated in FIG. 6, the second rate may be five times faster than the sampling rate (e.g., 5×). Thus, the wakeword engine component 550 may spend one second of processing time to process a portion of the AFE buffer audio data 535 representing five seconds of audio (e.g., second number of samples is five times the third number of samples). However, the disclosure is not limited thereto and the second rate may vary without departing from the disclosure.

FIG. 6 illustrates an example of low power mode wakeword detection latency according to embodiments of the present disclosure. As illustrated in FIG. 6, wakeword detection latency 600 illustrates that low power mode wakeword (LPM WW) detection latency catches up to normal wakeword detection latency within a short period of time (e.g., about 400 ms) after the SD component 510 detects an audible sound. Thus, in a worst case scenario (e.g., when a short wakeword is represented in the input audio data 505), the LPM WW detection latency may be larger than normal WW detection latency and may result in a delay. However, when a medium to long wakeword (e.g., 500 ms or longer) is represented in the input audio data 505, the LPM WW detection latency may be equal to the normal WW detection latency, as the LPM WW detection may catch up and finish processing the buffered audio data prior to when the wakeword would be detected during normal WW detection processing.

During conventional wakeword processing, which occurs when the CPU 114 is operating in the first mode (e.g., active mode) when the input audio data 505 was captured, the wakeword engine component 550 may process the input audio data 505 in real-time at a first speed (e.g., 1×). For example, the wakeword engine component 550 processes the input audio data 505 as it is received by the device 110. Thus, the wakeword engine component 550 may detect that a wakeword is represented in the input audio data 505 after detecting an endpoint of the wakeword, which varies depending on a length of the wakeword. For example, if a beginning of the wakeword corresponds to a first time (e.g., −100 ms), the wakeword engine component 550 may finish processing a portion of the input audio data 505 representing the wakeword at a second time (e.g., 200 ms) for a short wakeword (e.g., length of 300 ms), at a third time (e.g., 400 ms) for a medium wakeword (e.g., length of 500 ms), or at a fourth time (e.g., 650 ms) for a long wakeword (e.g., length of 750 ms), although the disclosure is not limited thereto.

In contrast, if the CPU component 114 was operating in the second mode when the input audio data 505 was captured, the wakeword engine component 550 may process the input audio data 505 at a second speed (e.g., 5×). For example, the device 110 may store the input audio data 505 (e.g., AFE buffer audio data 535) in the AFE buffer component 530 prior to the SD component 510 detecting an audible sound. FIG. 6 distinguishes between a first portion of the AFE buffer audio data 535 (e.g., pre-roll buffer, which is not associated with the wakeword), which is represented using a solid light gray color, and a second portion of the AFE buffer audio data 535 (e.g., audio block triggering SD, which includes a representation of the wakeword), which is represented using a patterned light gray color.

As illustrated in FIG. 6, detecting the audible sound by the SD component 510 may be associated with a first latency (e.g., 100 ms). For example, if a beginning of the wakeword corresponds to a first time (e.g., −100 ms), the SD component 510 may not detect an audible sound until a second time (e.g., 0 ms). This is illustrated in FIG. 6 using a first row comprising seven solid light gray blocks (e.g., pre-roll buffer) and one patterned light gray block (e.g., audio block triggering SD), with the 100 ms delay labeled "SD latency at Trigger."

In addition, transitioning the CPU component 114 from the second mode to the first mode may be associated with a second latency (e.g., 200 ms). For example, the wakeword engine component 550 may not begin processing the AFE buffer audio data 535 until a third time (e.g., 200 ms), 300 ms after the beginning of the wakeword. This is illustrated in FIG. 6 using a second row comprising two solid white blocks (e.g., CPU Wake), five solid light gray blocks, and three patterned light gray blocks.

Once the wakeword engine component 550 begins processing the AFE buffer audio data 535 at the second speed (e.g., 5×), however, the wakeword engine component 550 is able to quickly process the AFE buffer audio data 535. For example, the wakeword engine component 550 may process five blocks of the AFE buffer audio data 535 (e.g., first 500 ms of audio data) at a fourth time (e.g., 300 ms). This is illustrated in FIG. 6 using a third row comprising two solid white blocks (e.g., CPU Wake), five solid dark gray blocks (e.g., WW processed buffer), and four patterned light gray blocks (e.g., AFE buffer audio data 535 not yet processed by the WW engine component 550). Similarly, the wakeword engine component 550 may process another five blocks of the AFE buffer audio data 535 (e.g., second 500 ms of audio data) at a fifth time (e.g., 400 ms), which is illustrated in FIG. 6 using a fourth row comprising two solid white blocks (e.g., CPU Wake), five solid dark gray blocks (e.g., WW processed buffer), and five patterned dark gray blocks (e.g., WW processed audio block triggering SD).

As a result of processing the AFE buffer audio data 535 at the second speed, the wakeword engine component 550 may process all of the AFE buffer audio data 535 stored in the AFE buffer component 530 by the fifth time (e.g., 400 ms, or 500 ms after the beginning of the wakeword). At this point, the AFE buffer component 530 is empty and the wakeword engine component 550 may process incoming input audio data 505 in real-time at the first speed again (e.g., 1×). Thus, performing low power mode wakeword detection only results in a delay when detecting a short wakeword (e.g., length of 300 ms), as the low power mode wakeword detection catches up to conventional wakeword processing after roughly 500 ms. For example, the low power mode wakeword detection may detect a short wakeword (e.g., length of 300 ms) roughly 200 ms after conventional wakeword processing would have detected the wakeword (e.g., 200 ms delay). In contrast, low power mode wakeword detection may detect a medium wakeword (e.g., length of 500 ms) or a long wakeword (e.g., length of 750 ms) at roughly the same time as conventional wakeword processing (e.g., 0 ms delay).

Figure 7:
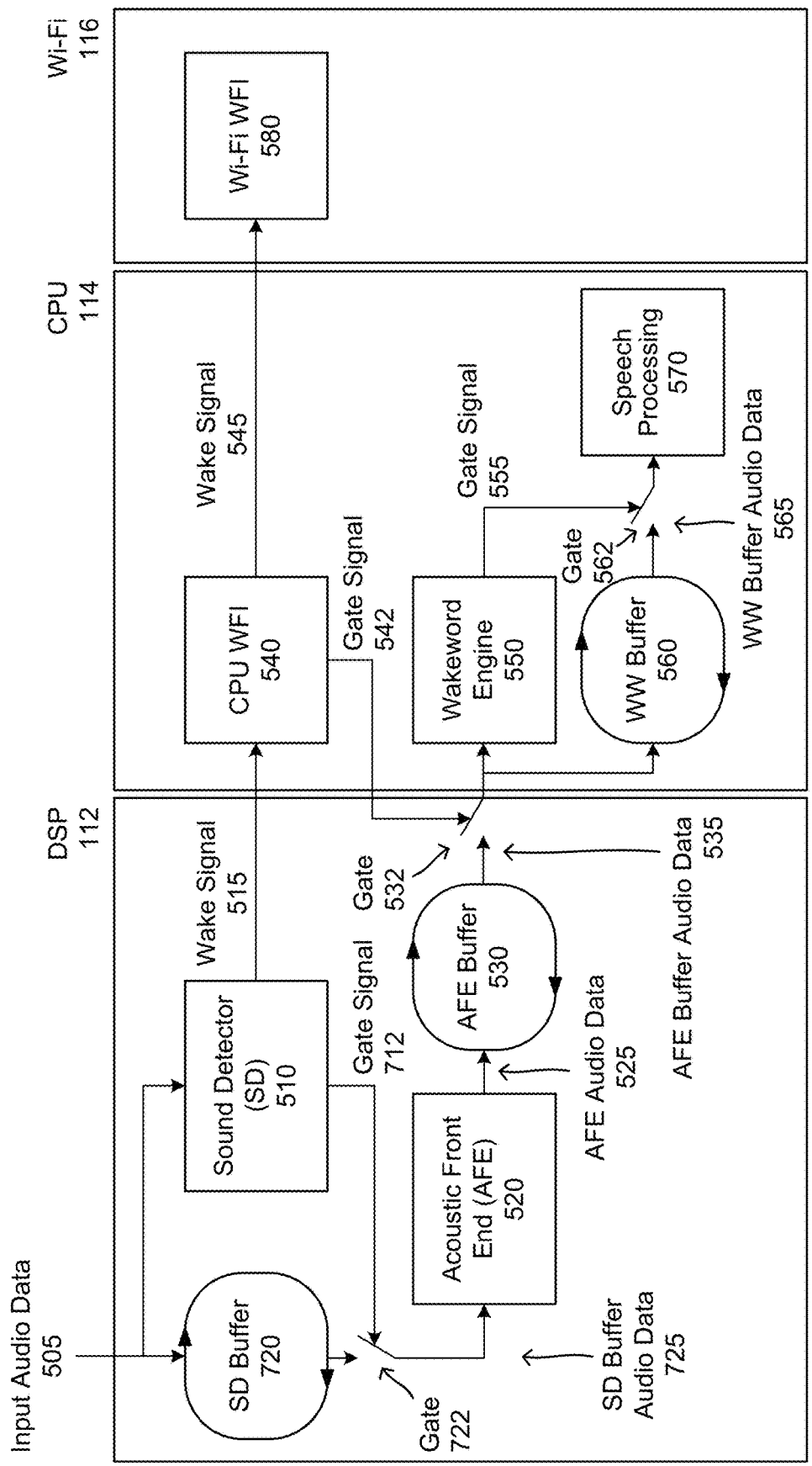
FIG. 7 illustrates an example component diagram for performing low power mode wakeword detection according to embodiments of the present disclosure.

FIG. 7 illustrates an example component diagram for performing low power mode wakeword detection according to embodiments of the present disclosure. While the CPU component 114 is in the low power mode, the device 110 may monitor an acoustic environment for an input trigger using the DSP component 112. For example, the device 110 may perform wakeword detection 700 during the low power mode using the DSP component 112. In contrast to the wakeword detection 500 illustrated in FIG. 5, the wakeword detection 700 may further reduce power consumption by not processing the input audio data 505 using the AFE component 520 until an audible sound is detected in the input audio data 505.

As illustrated in FIG. 7, the DSP component 112 may receive input audio data 505, may store the input audio data 505 in a sound detector (SD) buffer component 720, and may process the input audio data 505 using the sound detector (SD) component 510. As discussed above, the SD component 510 may process the input audio data 505 to detect an audible sound. For example, a key trigger is the sensing and detection of ambient sounds that meet a designed detection criteria. If the SD component 510 detects a sound represented in the input audio data 505, the SD component 510 may send a wake signal 515 to the CPU Wake from Interrupt (WFI) component 540 associated with the CPU component 114 and may send a gate signal 712 to a gate 722 associated with the SD buffer component 720.

The gate 722 may be associated with the SD buffer component 720 and may prevent the SD buffer component 720 from sending SD buffer audio data 725 stored in the SD buffer component 720 to the AFE component 520. Thus, when the gate 722 receives the gate signal 712, the gate 722 may enable the SD buffer component 720 to send the SD buffer audio data 725 (e.g., current contents of the SD buffer component 720) to the AFE component 520.

The AFE component 520 may perform beamforming or other processing to the SD buffer audio data 725 to generate AFE audio data 525 and may store the AFE audio data in the AFE buffer component 530, which may include a circular buffer. Thus, the device 110 may reduce power consumption by only processing the input audio data 505 with the AFE component 520 after the audible sound is detected.

In order to reduce a latency, the AFE component 520 may process the SD buffer audio data 725 at an accelerated rate (e.g., faster than real-time processing), as described in greater detail below with regard to FIG. 8. For example, if the CPU component 114 was operating in the first mode when the input audio data 505 was captured, the AFE component 520 may process the SD buffer audio data 725 at a first speed (e.g., 1×) and/or first rate (e.g., processing a first number of samples per second). In some examples, the SD buffer component 720 may be configured to only store the SD buffer audio data 725 when the CPU component 114 is operating in the second mode, such that the AFE component 520 may process the input audio data 505 directly without departing from the disclosure. However, if the CPU component 114 was operating in the second mode when the input audio data 505 was captured, the AFE component 520 may process the SD buffer audio data 725 at a second speed (e.g., 5×) and/or second rate (e.g., processing a second number of samples per second) without departing from the disclosure.

The SD buffer audio data 725 may be associated with a sampling rate (e.g., sampling frequency), which indicates an average number of audio samples required to represent one second of audio. Thus, the SD buffer audio data 725 may have a sampling frequency (e.g., 4 kHz, 8 kHz, 16 kHz, 44.1 kHz, etc.) corresponding to a third number of samples per second. In some examples, the first rate may be equal to the sampling rate, such that the AFE component 520 processes the SD buffer audio data 725 in real-time. For example, the AFE component 520 may be configured to process the third number of samples every second, meaning that it takes the AFE component 520 one second of processing time to process a portion of the SD buffer audio data 725 representing one second of audio. However, the disclosure is not limited thereto and the first rate may be different than the sampling rate without departing from the disclosure.

In order to reduce the latency associated with performing low power mode wakeword detection, the second rate may be higher than the first rate and the sampling rate, such that the AFE component 520 processes the SD buffer audio data 725 in a fraction of the time required during real-time processing. For example, the AFE component 520 may be configured to process a multiple of the third number of samples every second, meaning that it takes the AFE component 520 one second of processing time to process a portion of the SD buffer audio data 725 representing several seconds of audio. As illustrated in FIG. 8, the second rate may be twice as fast as the sampling rate (e.g., 2×). Thus, the AFE component 520 may spend one second of processing time to process a portion of the SD buffer audio data 725 representing two seconds of audio (e.g., second number of samples is twice the third number of samples). However, the disclosure is not limited thereto and the second rate may vary without departing from the disclosure. For example, the second rate may be three times faster than the sampling rate (e.g., 3×) without departing from the disclosure. Thus, the AFE component 520 may spend one second of processing time to process a portion of the SD buffer audio data 725 representing three seconds of audio (e.g., second number of samples is three times the third number of samples), although the disclosure is not limited thereto.

The CPU WFI component 540 may be configured to wake the CPU component 114 (e.g., operate the CPU component 114 in the first mode) when certain wake triggers are detected. For example, in response to receiving the wake signal 515, the CPU WFI component 540 may wake the CPU component 114, may send a gate signal 542 to a gate 532 associated with the AFE buffer 530, and/or may send a wake signal 545 to a Wi-Fi Wake from Interrupt (WFI) component 580 associated with the Wi-Fi component 116. Similarly, the Wi-Fi WFI component 580 may be configured to wake the Wi-Fi component 116 (e.g., operate the Wi-Fi component 116 in the first mode) in response to receiving the wake signal 545.

The gate 532 may be associated with the AFE buffer component 530 and may prevent the AFE buffer component 530 from sending AFE buffer audio data 535 stored in the AFE buffer component 530 to a wakeword engine component 550 of the CPU component 114. Thus, when the gate 532 receives the gate signal 542, the gate 532 may enable the AFE buffer component 530 to send the AFE buffer audio data 535 (e.g., current contents of the AFE buffer component 530) to the wakeword engine component 550. In addition, the AFE buffer component 530 may send the AFE buffer audio data 535 to a wakeword (WW) buffer component 560 associated with the CPU component 114, which may include a circular buffer.

Once the CPU component 114 is operating in the first mode (e.g., active mode) and the wakeword engine component 550 receives the AFE buffer audio data 535, the wakeword engine component 550 may process the AFE buffer audio data 535 to determine whether a wakeword is represented in a portion of the AFE buffer audio data 535. If the wakeword engine component 550 determines that a wakeword is represented (e.g., detects the wakeword) in a portion of the AFE buffer audio data 535, the wakeword engine component 550 may send a gate signal 555 to a gate 562 associated with the WW buffer component 560.

The gate 562 may be associated with the WW buffer component 560 and may prevent the WW buffer component 560 from sending WW buffer audio data 565 stored in the WW buffer component 560 to a speech processing component 570 associated with the CPU component 114. Thus, when the gate 562 receives the gate signal 555, the gate 562 may enable the WW buffer component 560 to send the WW buffer audio data 565 (e.g., current contents of the WW buffer component 560) to the speech processing component 570.

In some examples, the speech processing component 570 may be configured to perform local speech processing on the device 110. For example, the speech processing component 570 may be configured to process the WW buffer audio data 565 to generate natural language understanding (NLU) data (e.g., intent data and/or the like) corresponding to a voice command represented in the WW buffer audio data 565. Using the NLU data, the device 110 may perform one or more actions responsive to the voice command.

In other examples, however, the speech processing component 570 may be configured to perform remote speech processing using the remote system 120. For example, the speech processing component 570 may be configured to send the WW buffer audio data 565 to the remote system 120 (e.g., via the Wi-Fi component 116, although the disclosure is not limited thereto) and the remote system 120 may perform speech processing on the WW buffer audio data 565. Thus, the remote system 120 may generate natural language understanding (NLU) data (e.g., intent data and/or the like) corresponding to the voice command represented in the WW buffer audio data 565, may determine one or more actions to perform that are responsive to the voice command, and may send instruction(s) to the device 110 and/or other devices to perform the one or more actions. Depending on the one or more actions to perform, the device 110 may receive instruction(s) and perform at least some of the one or more actions, although the disclosure is not limited thereto.

Additionally or alternatively, the speech processing component 570 may be configured to perform hybrid speech processing using the remote system 120 without departing from the disclosure. In some examples, the speech processing component 570 may be configured to perform limited speech processing on the WW buffer audio data 565 while also sending the WW buffer audio data 565 to the remote system 120 for full speech processing. In other examples, the speech processing component 570 may be configured to perform full speech processing on the WW buffer audio data 565 while also sending the WW buffer audio data 565 to the remote system 120 for full speech processing. For example, the speech processing component 570 may generate local NLU data and may receive remote NLU data from the remote system 120. If the device 110 does not receive the remote NLU data within a period of time, the device 110 may perform one or more actions based on the local NLU data. However, the disclosure is not limited thereto and the speech processing component 570 may be configured to perform hybrid speech processing using any technique without departing from the disclosure.

In order to reduce a latency associated with performing low power mode wakeword detection, the wakeword engine component 550 may process the AFE buffer audio data 535 at an accelerated rate (e.g., faster than realtime processing), as described in greater detail above with regard to FIG. 6. For example, if the CPU component 114 was operating in the first mode when the input audio data 505 was captured, the wakeword engine component 550 may process the AFE buffer audio data 535 at a first speed (e.g., 1×). However, if the CPU component 114 was operating in the second mode when the input audio data 505 was captured, the wakeword engine component 550 may process the AFE buffer audio data 535 at a second speed (e.g., 5×) without departing from the disclosure.

During the wakeword detection 500 illustrated in FIG. 5, the AFE component 520 may process the input audio data 505 in real-time as it is received by the device 110. For example, the AFE component 520 may process the input audio data 505 at a first speed (e.g., 1×) to generate the AFE audio data 525. As described above, however, the wakeword detection 700 illustrated in FIG. 7 may further reduce power consumption by not processing the input audio data 505 using the AFE component 520 until an audible sound is detected in the input audio data 505. In order to reduce a latency associated with generating the AFE audio data 525 after detecting the audible sound, the AFE component 520 may process the input audio data 505 at an accelerated rate.

For example, the SD buffer component 720 may store the input audio data 505 as SD buffer audio data 725 and the AFE component 520 may process the SD buffer audio data 725 at a second speed (e.g., 2×), although the disclosure is not limited thereto.

Figure 8:
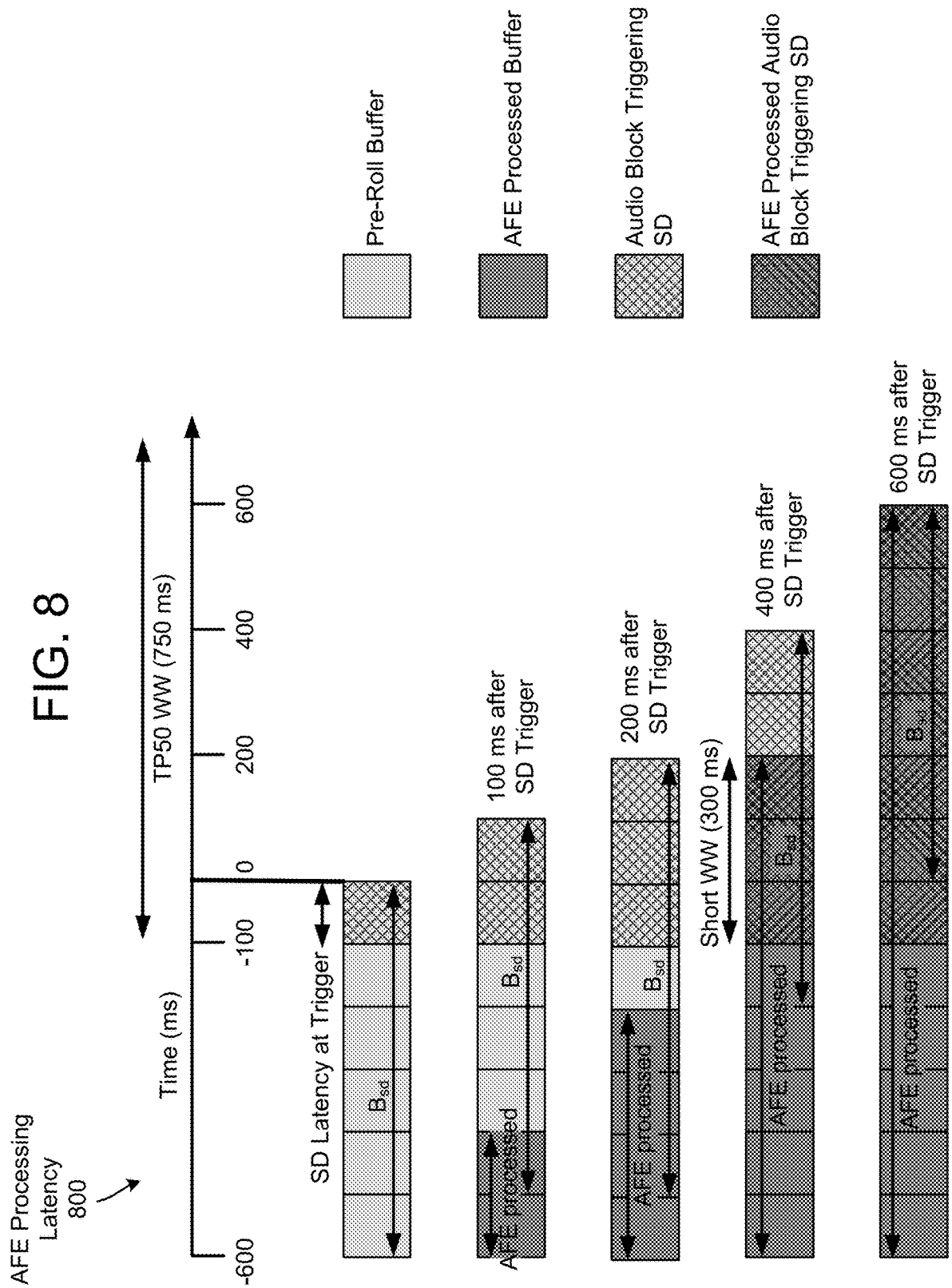
FIG. 8 illustrates an example of low power mode AFE processing latency according to embodiments of the present disclosure.

FIG. 8 illustrates an example of low power mode AFE processing latency according to embodiments of the present disclosure. Whereas FIG. 6 illustrates wakeword detection latency 600 associated with the wakeword engine component 550 processing the AFE buffer audio data 535 at an accelerated rate, FIG. 8 illustrates AFE processing latency 800 associated with the AFE component 520 processing the SD buffer audio data 725 at an accelerated rate.

As illustrated in FIG. 8, AFE processing latency 800 illustrates that the AFE component 520 processes the SD buffer audio data 725 at an accelerated rate in order to catch up to normal processing within a short period of time (e.g., about 600 ms) after the SD component 510 detects an audible sound. Thus, in a worst case scenario, such as when a short wakeword (e.g., length of 300 ms) is represented in the input audio data 505, the AFE processing latency 800 may introduce a noticeable delay resulting in an overall LPM WW detection latency being larger than normal WW detection latency by a first amount (e.g., 200 ms). However, when a medium wakeword (e.g., length of 500 ms) is represented in the input audio data 505, the AFE processing latency 800 may introduce a short delay resulting in an overall LPM WW detection latency being larger than normal WW detection latency by a second amount (e.g., 100 ms). Finally, when a long wakeword (e.g., 700 ms or longer) is represented in the input audio data 505, the overall LPM WW detection latency may be equal to the normal WW detection latency, as the AFE component 520 may catch up and finish processing the SD buffer audio data 725 prior to when the wakeword would be detected during normal WW detection processing.

For ease of illustration, FIG. 8 only illustrates the AFE processing latency 800 associated with the AFE component 520 generating the AFE buffer audio data 535 after the SD component 510 detects the audible sound. Thus, FIG. 8 does not illustrate the wakeword detection latency associated with the wakeword engine component 550 processing the AFE buffer audio data 535. However, as the wakeword engine component 550 processes the AFE buffer audio data 535 at a faster speed (e.g., 5×) than the AFE component 520 processes the SD buffer audio data 725 (e.g., 2×), the overall LPM WW detection latency may correspond to the AFE processing latency 800 illustrated in FIG. 8. For example, by processing the AFE buffer audio data 535 at the accelerated rate (e.g., 5×), the wakeword engine component 550 may catch up to the AFE component 520 (e.g., process all available audio data) roughly 400 ms after the SD trigger. After 400 ms, the wakeword engine component 550 may process the AFE buffer audio data 535 in real-time at the first speed (e.g., 1×) as it is generated by the AFE component 520.

During conventional wakeword processing, which occurs when the CPU 114 is operating in the first mode (e.g., active mode) when the input audio data 505 was captured, the AFE component 520 and the wakeword engine component 550 may process the input audio data 505 in real-time at a first speed (e.g., 1×). For example, the AFE component 520 and the wakeword engine component 550 may process the input audio data 505 as it is received by the device 110. Thus, the wakeword engine component 550 may detect that a wakeword is represented in the input audio data 505 after detecting an endpoint of the wakeword, which varies depending on a length of the wakeword. For example, if a beginning of the wakeword corresponds to a first time (e.g., −100 ms), the wakeword engine component 550 may finish processing a portion of the input audio data 505 representing the wakeword at a second time (e.g., 200 ms) for a short wakeword (e.g., length of 300 ms), at a third time (e.g., 400 ms) for a medium wakeword (e.g., length of 500 ms), or at a fourth time (e.g., 650 ms) for a long wakeword (e.g., length of 750 ms), although the disclosure is not limited thereto.

In contrast, if the CPU component 114 was operating in the second mode when the input audio data 505 was captured, the AFE component 520 may process the input audio data 505 at a second speed (e.g., 2×). For example, the device 110 may store the input audio data 505 (e.g., SD buffer audio data 725) in the SD buffer component 720 prior to the SD component 510 detecting an audible sound. FIG. 8 distinguishes between a first portion of the SD buffer audio data 725 (e.g., pre-roll buffer, which is not associated with the wakeword), which is represented using a solid light gray color, and a second portion of the SD buffer audio data 725 (e.g., audio block triggering SD, which includes a representation of the wakeword), which is represented using a patterned light gray color.

As illustrated in FIG. 8, detecting the audible sound by the SD component 510 may be associated with a first latency (e.g., 100 ms). For example, if a beginning of the wakeword corresponds to a first time (e.g., −100 ms), the SD component 510 may not detect an audible sound until a second time (e.g., 0 ms). This is illustrated in FIG. 8 using a first row comprising five solid light gray blocks (e.g., pre-roll buffer) and one patterned light gray block (e.g., audio block triggering SD), with the 100 ms delay labeled "SD latency at Trigger."

As the AFE component 520 is part of the DSP component 112, which is already operating in the first mode (e.g., active mode), FIG. 8 does not illustrate a wake delay like the one illustrated in FIG. 6 (e.g., 200 ms delay associated with transitioning the CPU component 114 from the second mode to the first mode). Instead, the AFE component 520 may immediately process the SD buffer audio data 725 at the second speed (e.g., 2×). For example, the AFE component 520 may process two blocks of the SD buffer audio data 725 (e.g., first 200 ms of audio data) at a third time (e.g., 100 ms). This is illustrated in FIG. 8 using a second row comprising two solid dark gray blocks (e.g., AFE processed buffer), three solid light gray blocks, and two patterned light gray blocks. Similarly, the AFE component 520 may process four blocks of the SD buffer audio data 725 (e.g., first 400 ms of audio data) at a fourth time (e.g., 200 ms). This is illustrated in FIG. 8 using a third row comprising four solid dark gray blocks, one solid light gray block, and three patterned light gray blocks.

Eventually, the AFE component 520 may process a portion of the SD buffer audio data 725 representing the wakeword. For example, the AFE component 520 may process eight blocks of the SD buffer audio data 725 (e.g., first 800 ms of audio data), which includes a representation of the short wakeword, at a fifth time (e.g., 400 ms). This is illustrated in FIG. 8 using a fourth row comprising five solid dark gray blocks, three patterned dark gray blocks, and two patterned light gray blocks. When the AFE component 520 processes the SD buffer audio data 725 using the second speed (e.g., 2×), the short wakeword may be detected after a first delay (e.g., 200 ms) relative to normal wakeword detection processing.

As a result of processing the SD buffer audio data 725 at the second speed, the AFE component 520 may process all of the SD buffer audio data 725 stored in the SD buffer component 720 by a sixth time (e.g., 600 ms, or 700 ms after the beginning of the wakeword). At this point, the SD buffer component 720 is empty and the AFE component 520 may process incoming input audio data 505 in real-time at the first speed again (e.g., 1×). For example, the AFE component 520 may process twelve blocks of the SD buffer audio data 725 (e.g., first 1200 ms of audio data) at the sixth time (e.g., 600 ms). This is illustrated in FIG. 8 using a fifth row comprising five solid dark gray blocks and seven patterned dark gray blocks.

As illustrated by the AFE processing latency 800, processing the SD buffer audio data 725 at the second speed (e.g., 2×) results in a delay when detecting a short wakeword (e.g., length of 300 ms) and a medium wakeword (e.g., length of 500 ms), as the low power mode AFE processing takes roughly 700 ms to catch up to conventional AFE processing. For example, the low power mode AFE processing may detect the short wakeword roughly 200 ms after conventional AFE processing would have detected the short wakeword (e.g., 200 ms delay), and may detect the medium wakeword roughly 100 ms after conventional AFE processing would have detected the medium wakeword (e.g., 100 ms delay). In contrast, low power mode AFE processing may detect a long wakeword (e.g., length of 750 ms) at roughly the same time as conventional AFE processing (e.g., 0 ms delay).

While the AFE processing latency 800 illustrates an example in which the AFE component 520 processes the SD buffer audio data 725 at the second speed (e.g., 2×), the disclosure is not limited thereto. Instead, the AFE component 520 may process the SD buffer audio data 725 at different speeds without departing from the disclosure. In some examples, the AFE component 520 may process the SD buffer audio data 725 at a third speed (e.g., 3×) without departing from the disclosure.

By processing the SD buffer audio data 725 at the third speed, even in the worst case scenario when a short wakeword (e.g., length of 300 ms) is represented in the input audio data 505, the AFE component 520 may introduce only a short delay resulting in an overall LPM WW detection latency being larger than normal WW detection latency by a third amount (e.g., 66 ms). For example, if a beginning of the wakeword corresponds to a first time (e.g., −100 ms), the AFE component 520 may process eight blocks of the SD buffer audio data 725 (e.g., first 800 ms of audio data), including the short wakeword, at a second time (e.g., 266 ms). As performing normal wakeword detection would detect the short wakeword at a third time (e.g., 200 ms), the AFE processing latency only results in a delay of roughly 66 ms. However, when a medium wakeword (e.g., length of 500 ms) or a long wakeword (e.g., 700 ms or longer) is represented in the input audio data 505, the overall LPM WW detection latency may be equal to the normal WW detection latency, as the AFE component 520 may catch up and finish processing the SD buffer audio data 725 prior to when the wakeword would be detected during normal wakeword detection processing.

Figure 9:
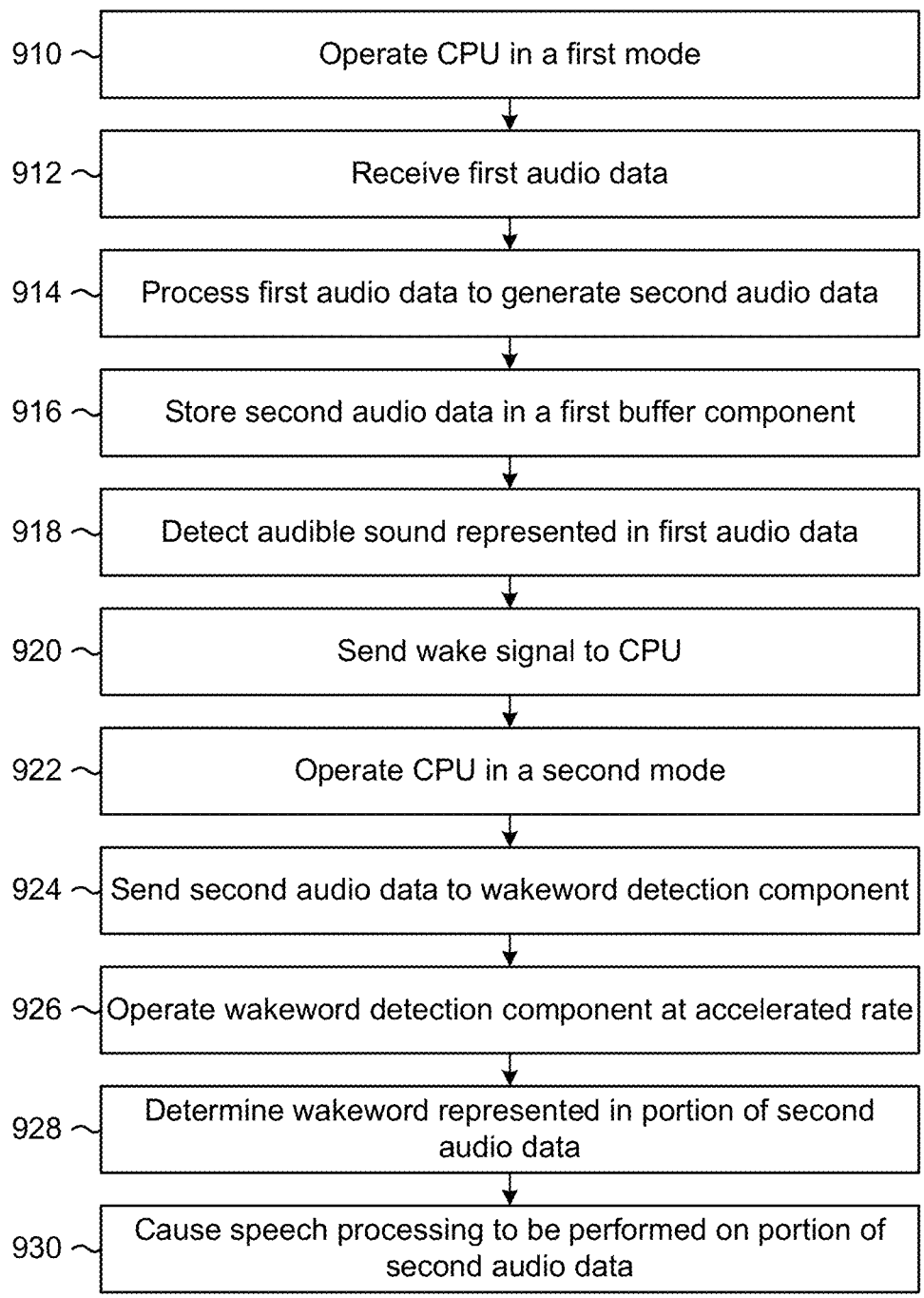
FIG. 9 is a flowchart conceptually illustrating an example method for performing wakeword detection during a low power mode according to embodiments of the present disclosure.

FIG. 9 is a flowchart conceptually illustrating an example method for performing wakeword detection during a low power mode according to embodiments of the present disclosure. As illustrated in FIG. 9, the device 110 may operate (910) the CPU component 114 in a first mode, may receive (912) first audio data, may process (914) the first audio data to generate second audio data, and may store (916) the second audio data in a first buffer component, as described above with regard to FIG. 5. For example, the AFE component 520 may perform beamforming and/or additional processing to the first audio data to generate the second audio data and the AFE buffer component 530 may store the second audio data.

While storing the second audio data in the first buffer component, the device 110 may monitor the first audio data using the sound detector component 510. For example, the device 110 may detect (918) an audible sound represented in the first audio data and may send (920) a wake signal to the CPU component 114. In response to the wake signal, the CPU component 114 may operate (922) the CPU component 114 in a second mode, may send (924) the second audio data to a wakeword detection component, and may operate (926) the wakeword detection component at an accelerated rate to reduce a latency, as described above with regard to FIGS. 5-6. The device 110 may then determine (928) that a wakeword is represented in a portion of the second audio data and may cause (930) speech processing to be performed on the portion of the second audio data, as described above with regard to FIG. 5.

Figure 10:
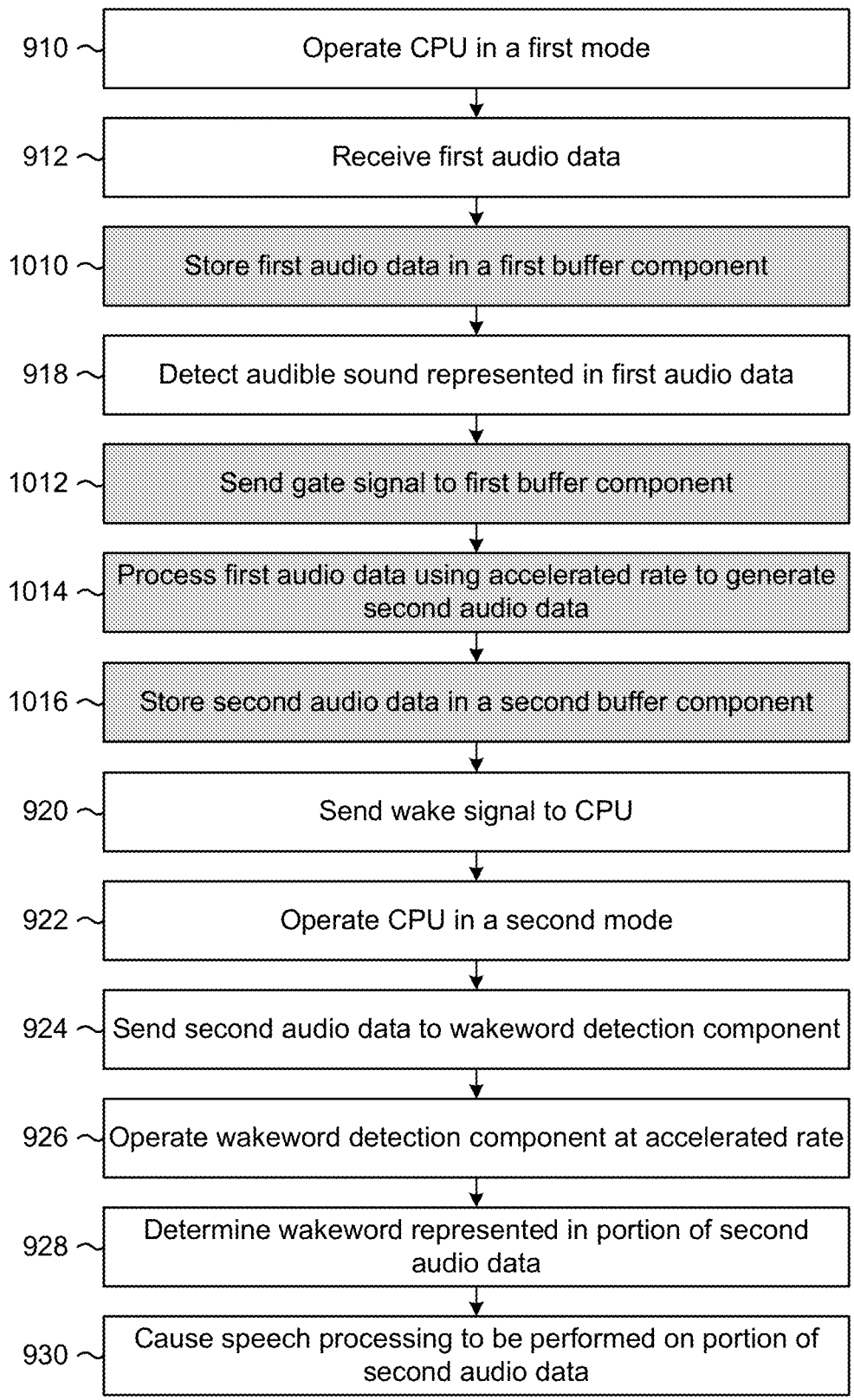
FIG. 10 is a flowchart conceptually illustrating an example method for performing wakeword detection during a low power mode according to embodiments of the present disclosure.

FIG. 10 is a flowchart conceptually illustrating an example method for performing wakeword detection during a low power mode according to embodiments of the present disclosure. As illustrated in FIG. 10, the device 110 may operate (910) the CPU component 114 in a first mode, may receive (912) first audio data, and may store (1010) the first audio data in a first buffer component.

While storing the first audio data in the first buffer component, the device 110 may monitor the first audio data using the sound detector component 510. For example, the device 110 may detect (918) an audible sound represented in the first audio data, may send (1012) a gate signal to the first buffer component (e.g., to a gate associated with the first buffer component), may process (1014) the first audio data at an accelerated rate to generate the second audio data, and may store (1016) the second audio data in a second buffer component, as described above with regard to FIGS. 7-8. For example, the AFE component 520 may perform beamforming and/or additional processing to the first audio data at the accelerated rate to generate the second audio data and the AFE buffer component 530 may store the second audio data.

In response to detecting the audible sound, the device 110 may send (920) a wake signal to the CPU component 114. For example, the SD component 510 may send the wake signal 515 to the CPU WFI component 540. In response to the wake signal, the CPU component 114 may operate (922) the CPU component 114 in a second mode, may send (924) the second audio data to a wakeword detection component, and may operate (926) the wakeword detection component at an accelerated rate to reduce a latency, as described above with regard to FIGS. 5-6. The device 110 may then determine (928) that a wakeword is represented in a portion of the second audio data and may cause (930) speech processing to be performed on the portion of the second audio data.

Figure 11:
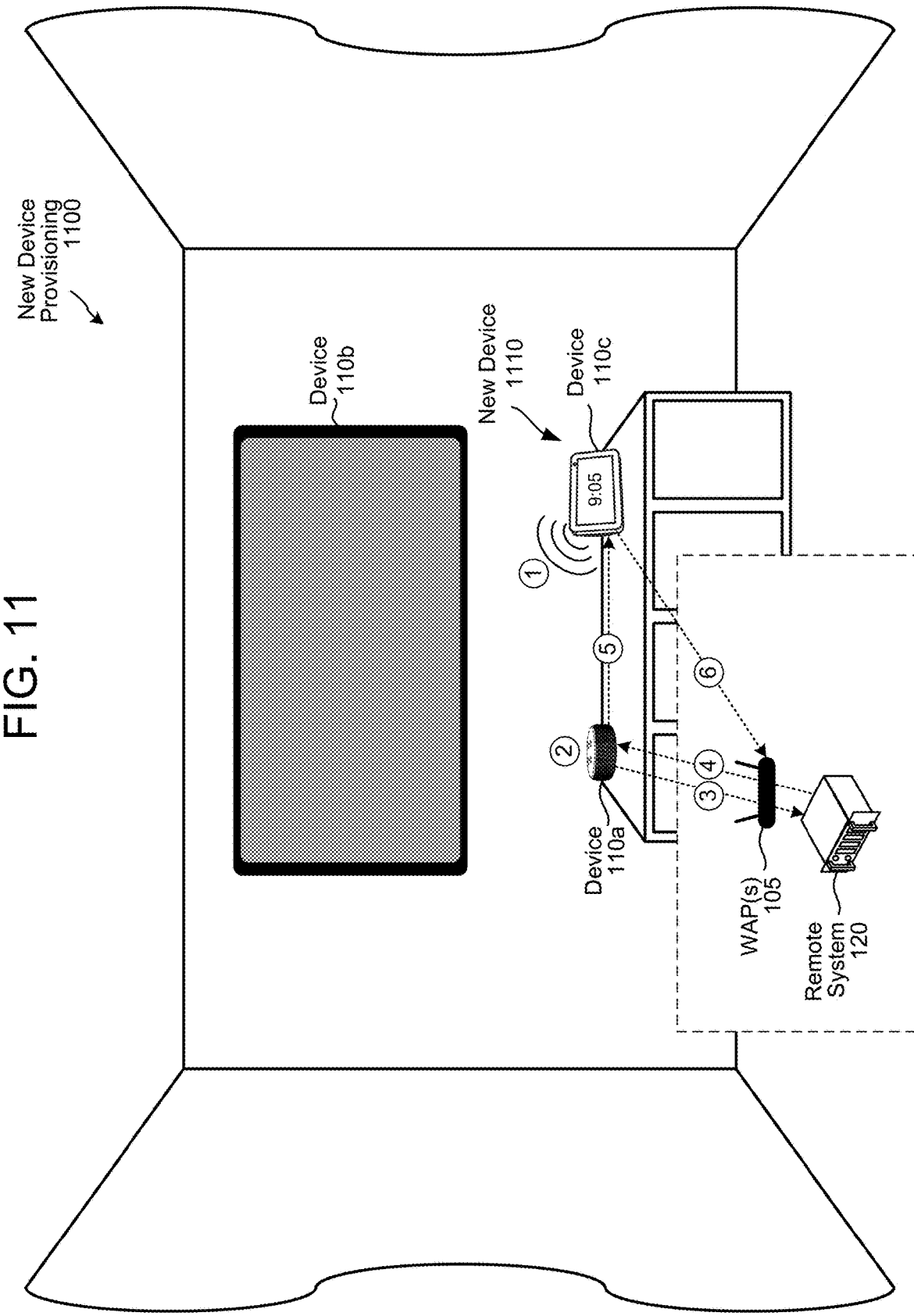
FIG. 11 illustrates an example of new device provisioning during a reduced power mode according to embodiments of the present disclosure.

FIG. 11 illustrates an example of new device provisioning during a reduced power mode according to embodiments of the present disclosure. As illustrated in FIG. 11, new device provisioning 1100 illustrates an example of a new device 1110 (e.g., device 110*c*) being added to an existing network. For example, multiple devices 110 (e.g., device 110*a*-110*b*) may be connected to a local wireless network that is associated with wireless access point(s) (WAP(s)) 105. The new device 1110, however, is not configured to connect to the local wireless network (e.g., device 110*c* lacks the credentials or authorization to connect to the local wireless network). Thus, in a typical system, the new device 1110 has to be manually added to the local wireless network, which negatively impacts a user experience.

During new device provisioning 1100, however, the new device 1110 may communicate with existing devices 110a-110b that are currently connected to the local wireless network in order to obtain network data (e.g., credentials, authorization, and/or the like) that enables the new device 1110 to connect to the local wireless network. In some examples, the existing devices 110a-110b may be configured to monitor a wireless channel(s) for incoming probe requests from potential new devices 110. For example, the new device 1110 may send a probe request using a wireless channel and the existing devices 110a-110b may detect the probe request, verify the new device 1110 (e.g., determine that the new device 1110 is associated with the same account as the existing devices 110a-110b), and send the network data associated with the WAP(s) 105 to the new device 1110.

As illustrated in FIG. 11, the new device 1110 may send a probe request (step "1") over one or more wireless channels. For example, during new device provisioning 1100, the devices 110 may be configured to monitor one or more wireless channels for an incoming probe request. In some examples, the device 110a may only be configured to monitor a wireless channel, such as the wireless channel with which the device 110a is connected to the WAP(s) 105. Thus, the new device 1110 may iteratively send the probe request on every potential wireless channel, cycling through a plurality of wireless channels until the new device 1110 receives a probe response from an existing device 110 or a duration of time elapses.

As illustrated in FIG. 11, the device 110a may be monitoring the wireless channel and may detect the probe request (step "2"). In response to detecting the probe request, the device 110a may send a verification request to the remote system 120 via the WAP(s) 105 (step "3") and may receive a verification result from the remote system 120 (step "4"), which may include a network identification (e.g., service set identification (SSID)) and/or password (e.g., passphrase). The device 110a may then send a probe response to the new device 1110 and/or establish a wireless connection with the new device 1110 (step "5") in order for the new device 1110 to be configured to join the local wireless network associated with the WAP(s) 105 (step "6").

In some examples, the device 110a may send first network data (e.g., first $SSID_1$ and/or first password) associated with the local wireless network to the new device 1110 in step 5, enabling the new device 1110 to directly connect to the local wireless network. For example, the remote system 120 may verify the new device 1110, determine the first network data associated with the WAP(s) 105, and send the first network data to the new device 1110 via the device 110a. In other examples, however, the device 110a may send second network data (e.g., second $SSID_2$ and/or second password) to the new device 1110 in step 5, enabling the new device 1110 to connect to a temporary wireless network generated by the device 110a. While connected to the temporary wireless network, the new device 1110 may communicate with the remote system 120 via the device 110a and may receive the first network data associated with the local wireless network. However, while FIG. 11 illustrates an illustrative example of new device provisioning 1100, the disclosure is not limited thereto.

Figure 12:
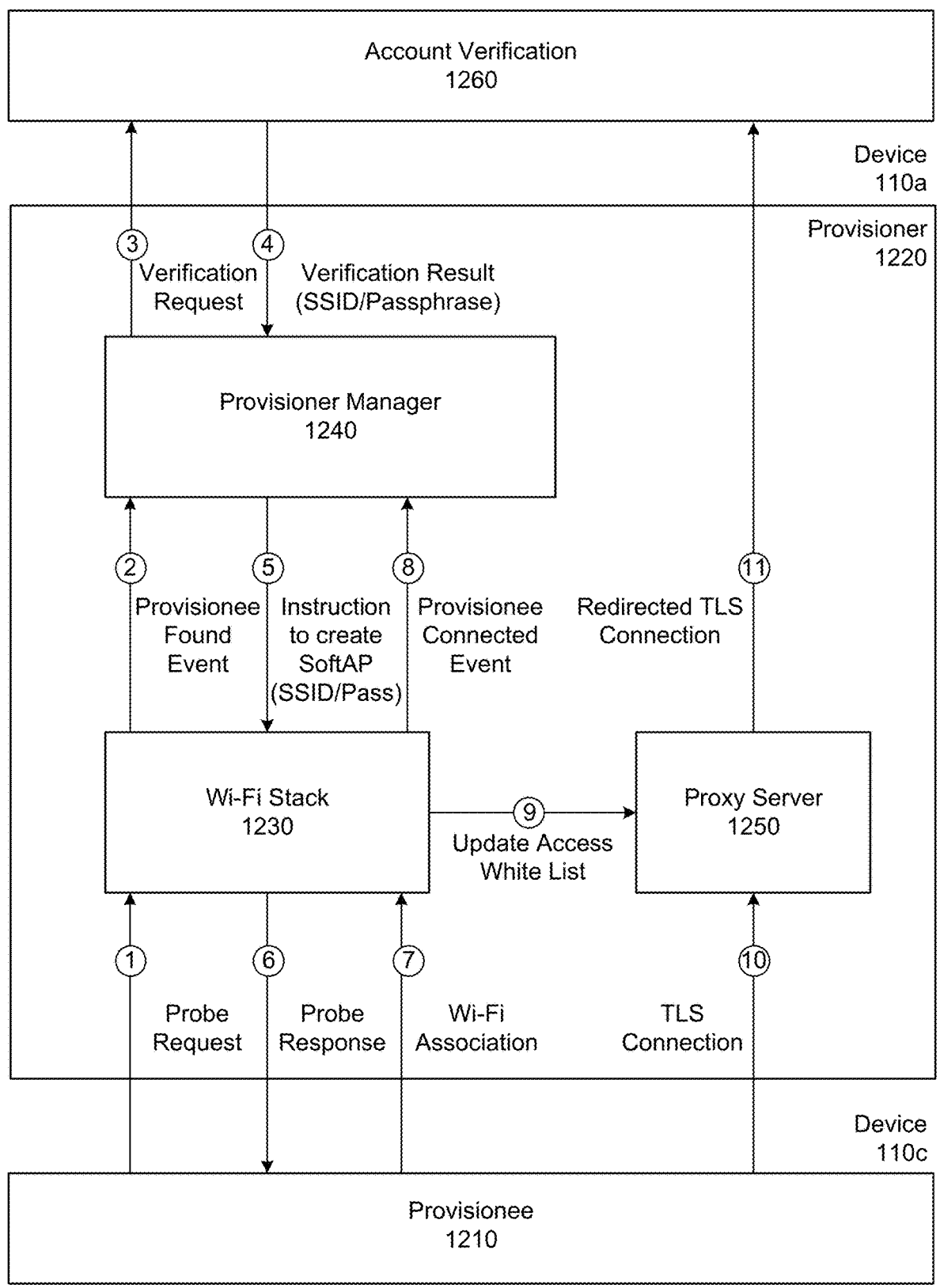
FIG. 12 is a communication diagram illustrating an example of performing new device provisioning according to embodiments of the present disclosure.

FIG. 12 is a communication diagram illustrating an example of performing new device provisioning according to embodiments of the present disclosure. As illustrated in FIG. 12, the device 110c (e.g., provisionee 1210) may send a probe request using a wireless protocol, which may be detected by the device 110a (e.g., provisioner 1220) (step "1"). For example, a Wi-Fi stack component 1230 of the provisioner 1220 may monitor one or more wireless channels and detect the probe request. As used herein, the Wi-Fi stack component 1230 is configured to enable the provisioner 1220 to communicate wirelessly using IEEE 802.11 protocol(s). For example, the Wi-Fi stack component 1230 may be configured to generate a wireless local area network (WLAN) and/or connect to an external WLAN without departing from the disclosure.

The Wi-Fi stack component 1230 may send a notification of a provisionee found event to a provisioner manager 1240 of the provisioner 1220 (step "2"), and the provisioner manager 1240 may send a verification request to an account verification component 1260 that is external to the provisioner 1220 (step "3"). For example, the verification request may request a network identification (e.g., service set identification (SSID)) and/or a media access control (MAC) address, although the disclosure is not limited thereto. In some examples, the account verification component 1260 may be associated with the remote system 120, although the disclosure is not limited thereto.

The account verification component 1260 may receive the verification request, may verify that the device 110c (e.g., provisionee 1210) is associated with the account, and may send a verification result to the provisioner manager 1240 (step "4"). For example, the verification result may include the network identification (e.g., SSID) and/or password (e.g., passphrase), although the disclosure is not limited thereto.

The provisioner manager 1240 may send an instruction to create a software enabled access point (SoftAP) to the Wi-Fi stack component 1230 (step "5"). For example, the Wi-Fi stack component 1230 may generate a WLAN using the SSID and/or passphrase indicated by the verification result. The Wi-Fi stack component 1230 may then send a probe response to the provisioner 1210 (step "6"), and the provisioner 1210 may form a Wi-Fi association with the Wi-Fi stack 1230 (step "7"). For example, the probe response may include first network data corresponding to the SoftAP (e.g., SSID and/or passphrase for the WLAN generated by the Wi-Fi stack component 1230) to enable the provisionee 1210 to connect to the SoftAP.

Once the Wi-Fi association is made in step 7, the Wi-Fi stack component 1230 may send a notification of a provisionee connected event to the provisioner manager 1240 (step "8") and may send an instruction to a proxy server 1250 instructing the proxy server 1250 to update an access white list (step "9"). Using the proxy server 1250, the provisionee 1210 may establish a Transport Layer Security (TSL) connection to the proxy server 1250 (step "10") and the proxy server 1250 may establish a redirected TLS connection to the account verification component 1260 (step "11").

While not illustrated in FIG. 12, the account verification component 1260 may use the redirected TLS connection to configure the provisionee 1210 to connect to the WAP(s) 105 directly. For example, the account verification component 1260 may send second network data corresponding to the WAP(s) 105 to the provisionee 1210, enabling the provisionee 1210 to connect to the remote system 120 via the WAP(s) 105. Once the provisionee 1210 is configured with the appropriate settings, the provisionee 1210 may disassociate with the provisioner 1220 (e.g., disconnect from the SoftAP) and connect to the WLAN associated with the WAP(s) 105.

For ease of explanation, FIG. 12 and the corresponding description only illustrates the provisionee 1210 and the provisioner 1220 sending a probe request and a probe response. However, the disclosure is not limited thereto, and the provisionee 1210 and the provisioner 1220 may send additional information associated with authentication and/or association without departing from the disclosure.

In order to enable new device provisioning 1100 and improve a user experience, the provisioner 1220 must continually monitor for incoming probe requests. For example, if the provisionee 1210 sends out a probe request that is not detected by the provisioner 1220, the provisionee 1210 is unable to connect to the WAP(s) 105 and the user 5 is forced to manually provide network information.

As described above with regard to FIG. 5, operating the Wi-Fi component 116 in a low-power mode (LPM) when the device 110 is not in use may reduce a power consumption associated with the device 110. However, the Wi-Fi component 116 is unable to monitor for incoming probe requests while operating in LPM. Thus, conventional techniques that place the Wi-Fi component 116 in LPM disable functionality such as new device provisioning 1100 for the duration of time that the Wi-Fi component 116 is operating in LPM.

To reduce an overall power consumption associated with the Wi-Fi component 116 while also improving a user experience by enabling new device provisioning 1100, the device 110 may be configured to operate in a reduced power mode in which the Wi-Fi component 116 intermittently enters LPM. For example, the Wi-Fi component 116 may alternate between operating in a first mode (e.g., active mode associated with first power consumption), which enables the Wi-Fi component 116 to monitor for incoming probe requests, and operating in a second mode (e.g., LPM associated with second power consumption that is lower than the first power consumption), which reduces a power consumption of the device 110.

Figure 13A:
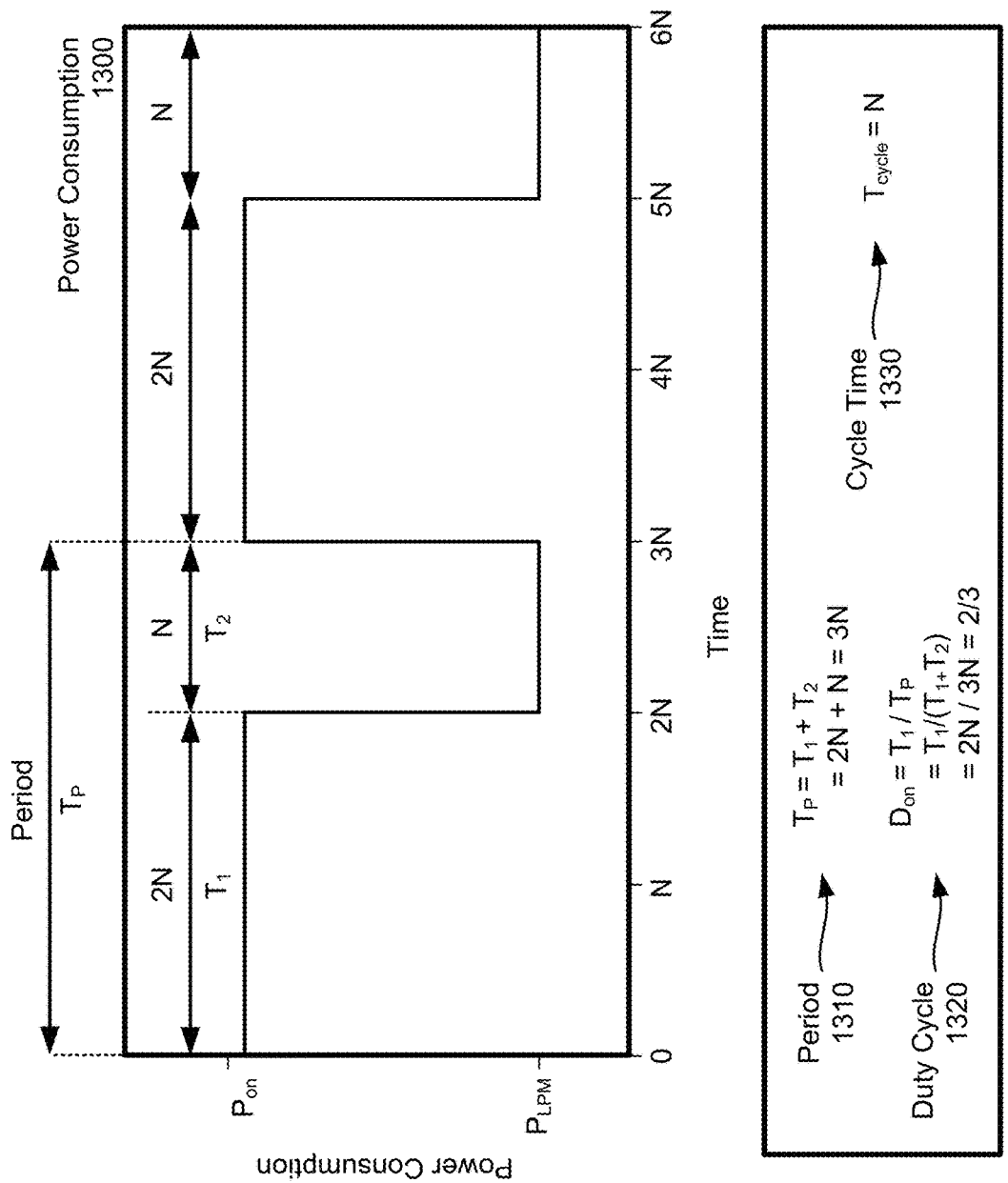
FIGS. 13A-13B illustrate example timing diagrams for performing new device provisioning during a reduced power mode according to embodiments of the present disclosure.
Figure 13B:
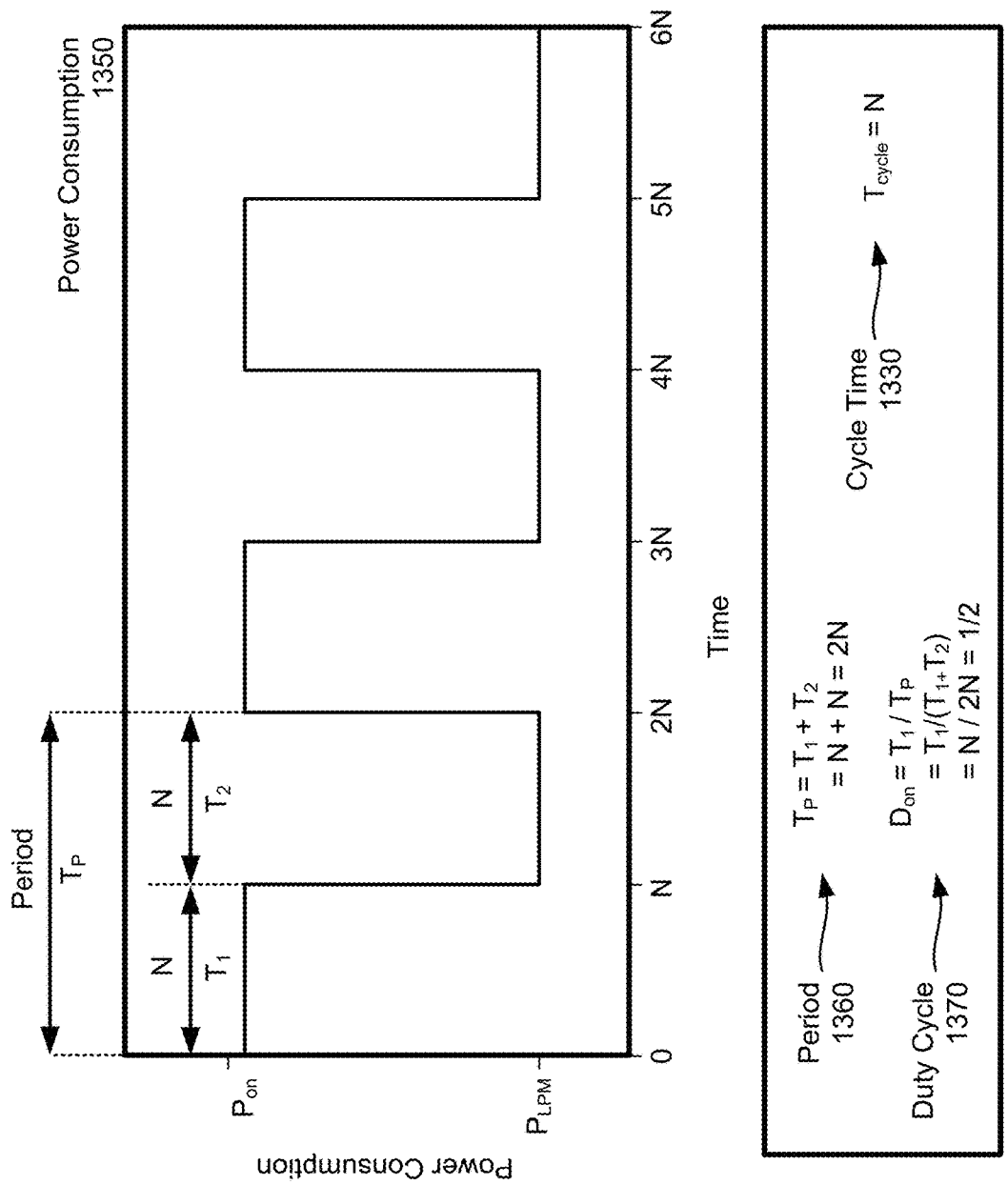

FIGS. 13A-13B illustrate example timing diagrams for performing new device provisioning during a reduced power mode according to embodiments of the present disclosure. To ensure that the device 110 is configured to detect incoming probe requests, the device 110 may control a duty cycle associated with the reduced power mode. For example, the device 110 may operate the Wi-Fi component 116 in the first mode for a first duration of time (e.g., $T_1$) and may operate the Wi-Fi component 116 in the second mode for a second duration of time (e.g., $T_2$). As used herein, the duty cycle (e.g., $D_{on}$) indicates a fraction of a period (e.g., $T_P$) in which the Wi-Fi component 116 is active, which can be expressed as a percentage or ratio. For example, the period may correspond to the total duration of time required to complete an on-and-off cycle (e.g., $T_P=T_1+T_2$), and the duty cycle may be calculated by dividing the first duration of time by the period (e.g., $D_{on}=T_1/T_P=T_1/(T_1+T_2)$). The first duration of time may be referred to as a pulse width PW (e.g., pulse active time) without departing from the disclosure.

To ensure that the device 110 detects an incoming probe request, the device 110 may select the duty cycle based on third duration of time (e.g., $T_{cycle}$) required for the new device 1110 to cycle through all potential wireless channels. As described above with regard to FIG. 11, the device 110 may only be configured to monitor a single wireless channel, such as the wireless channel with which the device 110a is connected to the WAP(s) 105. Thus, the new device 1110 may iteratively send the probe request on every potential wireless channel, cycling through a plurality of wireless channels until the new device 1110 receives a probe response from an existing device 110 or a duration of time elapses.

FIG. 13A illustrates a first power consumption chart 1300 conceptually illustrating a first example of how the Wi-Fi component 116 operates during the reduced power mode. As illustrated in FIG. 13A, the Wi-Fi component 116 may operate in the first mode (e.g., active mode) associated with first power consumption (e.g., $P_{on}$) for the first duration of time (e.g., $T_1=2N$), which is approximately twice the cycle time 1330 (e.g., $T_{cycle}=N$) required for the new device 1110 to cycle through all potential wireless channels (e.g., individual wireless channels associated with 2.4 GHz and 5 GHz, although the disclosure is not limited thereto). To reduce a power consumption of the device 110, the Wi-Fi component 116 may then operate in the second mode (e.g., LPM) associated with second power consumption (e.g., $P_{LPM}$) for the second duration of time (e.g., $T_2=N$).

As illustrated in FIG. 13A, the period 1310 associated with the entire cycle (e.g., $T_P$) corresponds to a sum of the first duration of time and the second duration of time (e.g., $T_P=T_1+T_2=3N$) and the duty cycle 1320 corresponds to a ratio of the first duration of time and the period 1310 (e.g., $D_{on}=T_1/(T_1+T_2)=2N/3N=2/3$). Thus, knowing the cycle time 1330, the device 110 may set the duty cycle 1320 to ensure that the device 110 detects an incoming probe request before a timeout event occurs. However, these values are intended to conceptually illustrate a simple example and the disclosure is not limited thereto. Instead, the device 110 may vary the duty cycle without departing from the disclosure.

FIG. 13B illustrates a second power consumption chart 1350 conceptually illustrating a second example of how the Wi-Fi component 116 operates during the reduced power mode. As illustrated in FIG. 13B, the Wi-Fi component 116 may operate in the first mode (e.g., active mode) associated with first power consumption (e.g., $P_{on}$) for a first duration of time (e.g., $T_1=N$), which is approximately equal to the cycle time 1330 (e.g., $T_{cycle}=N$) required for the new device 1110 to cycle through all potential wireless channels (e.g., individual wireless channels associated with 2.4 GHz and 5 GHz, although the disclosure is not limited thereto). To reduce a power consumption of the device 110, the Wi-Fi component 116 may then operate in the second mode (e.g., LPM) associated with second power consumption (e.g., $P_{LPM}$) for the second duration of time (e.g., $T_2=N$).

As illustrated in FIG. 13B, the period 1360 associated with the entire cycle (e.g., $T_P$) corresponds to a sum of the first duration of time and the second duration of time (e.g., $T_P=T_1+T_2=2N$) and the duty cycle 1370 corresponds to a ratio of the first duration of time and the period 1360 (e.g., $D_{on}=T_1/(T_1+T_2)=1N/2N=1/2$). Thus, knowing the cycle time 1330, the device 110 may set the duty cycle 1370 to ensure that the device 110 detects an incoming probe request before a timeout event occurs. However, these values are intended to conceptually illustrate a simple example and the disclosure is not limited thereto. Instead, the device 110 may vary the duty cycle without departing from the disclosure.

While FIGS. 11-13B illustrate examples of controlling a duty cycle of a reduced power mode of the Wi-Fi component 116 to enable new device provisioning 1100, the disclosure is not limited thereto. In some examples, the device 110 may control a duty cycle of the reduced power mode of the Wi-Fi component 116 in order to enable device synchronization between multiple devices. For example, a group of devices 110 may be synchronized using a single clock, enabling the group of devices 110 to generate output audio substantially simultaneously. To illustrate an example, the user 5 may request that music be played by two or more of the group of devices 110, which may be located in the same room or in different rooms without departing from the disclosure. Provided that individual clocks for each of the two or more devices 110 are synchronized with each other, the two or more devices 110 may generate output audio representing the music without audible distortion or latency between the devices 110.

To synchronize the individual clocks with each other, the group of devices 110 may designate a single device of the group of devices 110 as a time master device 110m and designate the remaining devices as time follower devices 110f. Thus, a first clock associated with the time master device 110m may act as a global clock for the time follower devices 110f, such that each of the time follower devices 110f may synchronize a local clock to the global clock. In some examples, a time follower device 110f may synchronize a local clock to the global clock by exchanging data packets with the time master device 110m for a period of time (e.g., 1 second). During this period of time, the time follower device 110f may determine a plurality of latency values corresponding to multiple pairs of data packets and may estimate an overall latency based on the plurality of latency values.

FIG. 14 illustrates an example of device synchronization during a reduced power mode according to embodiments of the present disclosure. As illustrated in FIG. 14, a group of devices 110, which may include a first device 110a, a second device 110b, a third device 110c, and a fourth device 110d, may be synchronized. This enables the system 100 to generate output audio using any combination of the devices 110a-110d. In the device synchronization example 1400 illustrated in FIG. 14, the fourth device 110d is designated as a time master device 110m and the other devices 110a-110c are designated as time follower devices 110f.

As illustrated in FIG. 14, to maintain time synchronization with the fourth device 110d, the first device 110a and the fourth device 110d may exchange first data packets during a first time slot (step "1"), the second device 110b and the fourth device 110d may exchange second data packets during a second time slot (step "2"), and the third device 110c and the fourth device 110d may exchange third data packets during a third time slot (step "3"). These steps are repeated periodically, using a fixed interval, to maintain time synchronization between the group of devices 110.

To illustrate an example, the time follower device 110f may send a first data packet to the time master device 110m and the time master device 110m may send a second data packet back to the time follower device 110f in response to receiving the first data packet. Based on a first timestamp (e.g., $T_{1a}$) associated with transmission of the first data packet by the time follower device 110f and a second timestamp (e.g., $T_{1b}$) associated with receipt of the first data packet by the time master device 110m, the system 100 may calculate an outgoing transit time (e.g., $T_{out}=T_{1b}-T_{1a}$). Similarly, based on a third timestamp (e.g., $T_{2a}$) associated with transmission of the second data packet by the time master device 110m and a fourth timestamp (e.g., $T_{2b}$) associated with receipt of the second data packet by the time follower device 110f, the system 100 may calculate an incoming transit time (e.g., $T_{in}=T_{2b}-T_{2a}$).

In some examples, the first data packet and the second data packet may refer to a single data packet, and/or the second timestamp (e.g., $T_{1b}$) and the third timestamp (e.g., $T_{2a}$) may refer to a single timestamp. For example, the time follower device 110f may send the first data packet, which includes the first timestamp (e.g., $T_{1a}$), to the time master device 110m. Upon receiving the first packet, the time master device 110m may add the second timestamp (e.g., $T_{1b}$) to the first data packet and send it back to the time follower device 110f. The time follower device 110f may then add the fourth timestamp (e.g., $T_{2b}$) to the first data packet on receipt of the first data packet. Thus, the first data packet may indicate three separate timestamps, from which the time follower device 110f may determine the incoming/outgoing transit time and/or derive a relative offset (e.g., skew) and change in offset (e.g., drift) between the local clock and the global clock.

Due to variable delays associated with sending and receiving data packets using the local wireless network, the transit times may exhibit large variations and be inconsistent over time. Thus, an individual transit time may not accurately represent an actual transit time associated with sending a data packet between the time follower device 110f and the time master device 110m. However, by exchanging data packets for the period of time (e.g., 1 second) to generate a plurality of data points, the system 100 may estimate a minimum transit time (e.g., using a convex hull algorithm, although the disclosure is not limited thereto) and synchronize the local clock to the global clock based on the minimum transit time. For example, the time follower device 110f may identify a pair of data packets associated with the minimum transit time, may determine a value of the global clock indicated by the pair of data packets, and may synchronize the local clock to the global clock based on the minimum transit time and the value of the global clock.

In order to maintain time synchronization between the time follower device 110f and the time master device 110m, the time follower device 110f and the time master device 110m may exchange data packets at a fixed periodic interval. For example, the time follower device 110f and the time master device 110m may exchange data packets during one time slot out of every M time slots, with the number of M time slots selected based on a maximum time interval, a total number of time follower devices 110f, and/or the like. To illustrate an example, the time follower device 110f and the time master device 110m may exchange data packets during a first time slot (e.g., for one second) assigned to the time follower device 110f out of the M time slots (e.g., 2-15 time slots, corresponding to 2-15 seconds), although the disclosure is not limited thereto.

To reduce a power consumption of the time follower device 110f when the time follower device 110f is not in use, while still maintaining time synchronization with the time master device 110m, the time follower device 110f may operate the Wi-Fi component 116 in low power mode when the time follower device 110f is not exchanging data packets with the time master device 110m (e.g., outside the first time slot assigned to the time follower device 110f). Thus, the time follower device 110f may wake the Wi-Fi component 116 periodically (e.g., every M−1 seconds) in order to exchange data packets with the time master device 110m and maintain time synchronization.

FIG. 15 illustrates an example timing diagram for performing device synchronization during a reduced power mode according to embodiments of the present disclosure. As illustrated in a power consumption chart 1500 illustrated in FIG. 15, the time follower device 110f may control a duty cycle of the reduced power mode of the Wi-Fi component 116 based on the fixed periodic interval. For example, the time follower device 110f may operate the Wi-Fi component 116 in the first mode (e.g., active mode) associated with first power consumption (e.g., $P_{on}$) for a first duration of time (e.g., $T_1$=m) and then operate the Wi-Fi component 116 in the second mode (e.g., LPM) associated with second power consumption (e.g., $P_{LPM}$) for a second duration of time (e.g., $T_2$=M−m). Thus, the total time period 1510 (e.g., $T_P$) is equal to the total number of M time slots and the interval time 1530 (e.g., $T_P$=$T_{interval}$=M), while the duty cycle 1520 is equal to a ratio of the first duration of time to the total time period 1510 (e.g., $D_{on}$=$T_1$/$T_P$=m/M).

In some examples, the number of time slots may be selected based on a total number of time follower devices 110f to synchronize with the time master device 110m. To illustrate a first example, if the group of devices 110 includes nine total devices (e.g., one time master device 110m and eight time follower devices 110f), the number of time slots may be equal to eight (e.g., M=8) and the duty cycle may be equal to ⅛. To illustrate a second example, if the group of devices 110 includes four total devices (e.g., one time master device 110m and three time follower devices 110f), the number of time slots may be equal to three (e.g., M=3) and the duty cycle may be equal to ⅓. However, the disclosure is not limited thereto and the number of time slots and/or the duty cycle may vary without departing from the disclosure.

In other examples, the number of time slots may be selected based on a maximum time interval that still enables the time follower devices 110f to remain synchronized with the time master device 110m. For example, the maximum time interval may correspond to fifteen time slots (e.g., 15 seconds), such that regardless of the exact number of devices (e.g., one time master device 110m and up to fifteen time follower devices 110f), the number of time slots may be equal to fifteen (e.g., M=15) and the duty cycle may be equal to 1/15. However, this is intended to conceptually illustrate an example and the disclosure is not limited thereto.

Figure 16A:
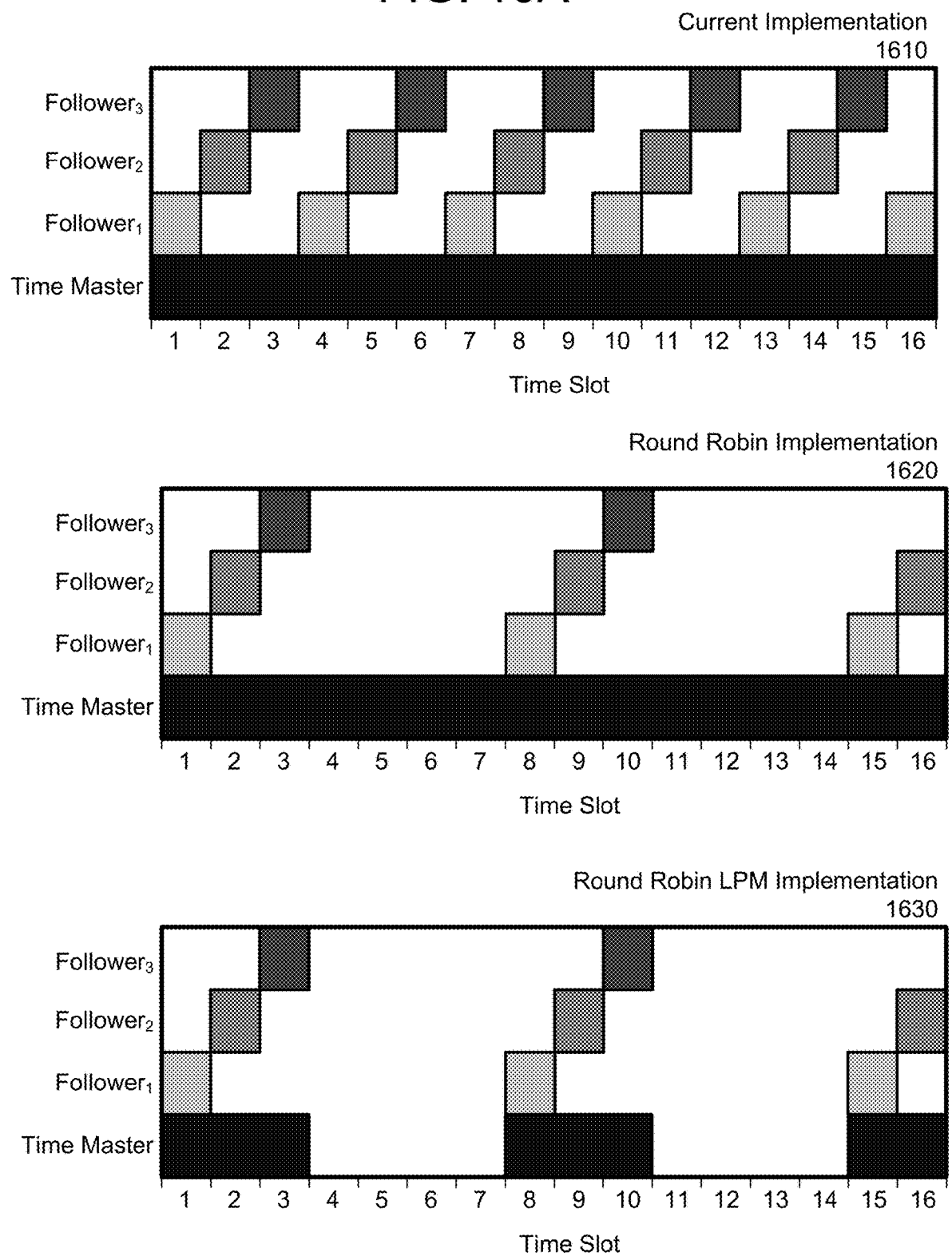
FIGS. 16A-16B illustrate example timing diagrams for performing device synchronization during a reduced power mode according to embodiments of the present disclosure.
Figure 16B:
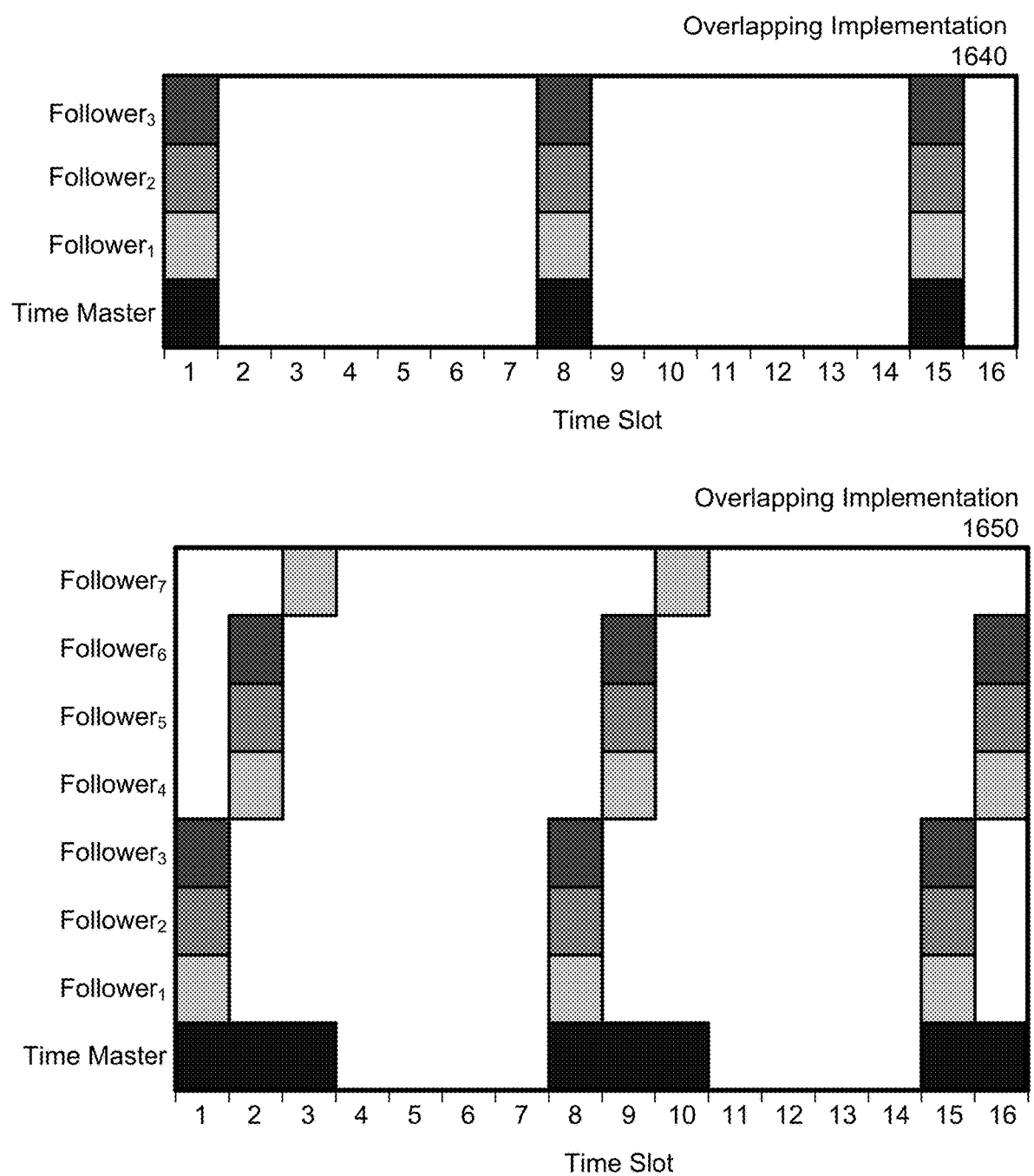

FIGS. 16A-16B illustrate example timing diagrams for performing device synchronization during a reduced power mode according to embodiments of the present disclosure. As illustrated in FIG. 16A, a current implementation 1610 corresponds to three follower time devices 110f that continuously cycle through three time slots. For example, a first time follower device (e.g., Follower$_1$) exchanges first data packets with the time master device 110m during a first time slot, a second time follower device (e.g., Follower$_2$) exchanges second data packets with the time master device 110m during a second time slot, and a third time follower device (e.g., Follower$_3$) exchanges third data packets with the time master device 110m during a third time slot. In the current implementation 1610, the first time follower device (e.g., Follower$_1$) exchanges fourth data packets with the time master device 110m during a fourth time slot immediately after the third time slot, such that the time master device 110m is constantly exchanging data packets with one of the time follower devices 110f.

As illustrated in FIG. 16A, the time follower devices 110f may operate in the reduced power mode with a first duty cycle based on the total number of time follower devices 110f (e.g., $D_{on}$=⅓). While the first duty cycle reduces a power consumption of the time follower device 110f, the constant cycling between a limited number of time follower devices limits the overall reduction in power consumption.

To further improve the reduction in power consumption associated with the reduced power mode, the system 100 may select the total number of time slots to be greater than the number of time follower devices 110f For example, FIG. 16A illustrates an example of a round robin implementation 1620 in which the number of time follower devices 110f remains the same (e.g., three time follower devices 110f) but the total number of time slots in a cycle is increased to seven. As a result of adding four additional time slots, the duty cycle is decreased to a second duty cycle (e.g., $D_{on}$=1/7), increasing the overall reduction in power consumption.

As illustrated in the round robin implementation 1620, the time master device 110m remains active the entire time and does not enter a reduced power mode or operate the Wi-Fi component 116 in the LPM. In some examples, the system 100 may reduce a power consumption associated with the time master device 110m by operating the time master device 110m in a reduced power mode as well. For example, FIG. 16A illustrates an example of a round robin LPM implementation 1630 in which the number of time follower devices 110f remains the same (e.g., three time follower devices 110f), the total number of time slots in a cycle remains the same (e.g., seven time slots per cycle), but the time master device 110m operates the Wi-Fi component 116 in the LPM when the time master device 110m is not exchanging data packets with the time follower devices 110f. As illustrated in FIG. 16A, the time master device 110m operates in the active mode for a first time period (e.g., exchanging data packets with the three time follower devices 110f during the first three time slots) and then operates in the low power mode for a second time period (e.g., four remaining time slots per cycle). Thus, while the duty cycle (e.g., $D_{on}$=3/7) of the time master device 110m is larger than the duty cycle for an individual time follower device 110f, the time master device 110m may reduce a power consumption relative to not operating in the low power mode.

While FIG. 16A illustrates examples of the number of time follower devices 110f, a total number of time slots in a cycle, and/or a round robin implementation, the disclosure is not limited thereto and these values and/or implementations may vary without departing from the disclosure. For example, FIG. 16B illustrates an example of an overlapping implementation 1640 in which multiple time follower devices may exchange data packets with the time master device 110m during a single time slot. As illustrated in FIG. 16B, three time follower devices 110f may exchange data packets with the time master device 110m during the first time slot, resulting in the duty cycle (e.g., $D_{on}$=1/7) of the time master device 110m and a corresponding power consumption being reduced.

FIG. 16B also illustrates an example of an overlapping implementation 1650 in which there are more time follower devices 110f than can exchange data packets with the time master device 110m during a single time slot. For example, the overlapping implementation 1650 illustrates an example in which the time master device 110m may exchange data packets with three time follower devices 110f during a single time slot, yet the time master device 110m exchanges data packets with seven time follower devices 110f. As a result, the time master device 110m may communicate with three time follower devices (e.g., Follower$_1$-Follower$_3$) during the first time slot, three time follower devices (e.g., Follower$_4$—Follower$_6$) during the second time slot, and one time follower device (e.g., Follower$_7$) during the third time slot. Thus, while a first duty cycle (e.g., $D_{on}$=3/7) of the time master device 110m is larger than a second duty cycle (e.g., $D_{on}$=1/7) for an individual time follower device 110f, the time master device 110m may reduce a power consumption relative to not operating in the low power mode.

Figure 17:
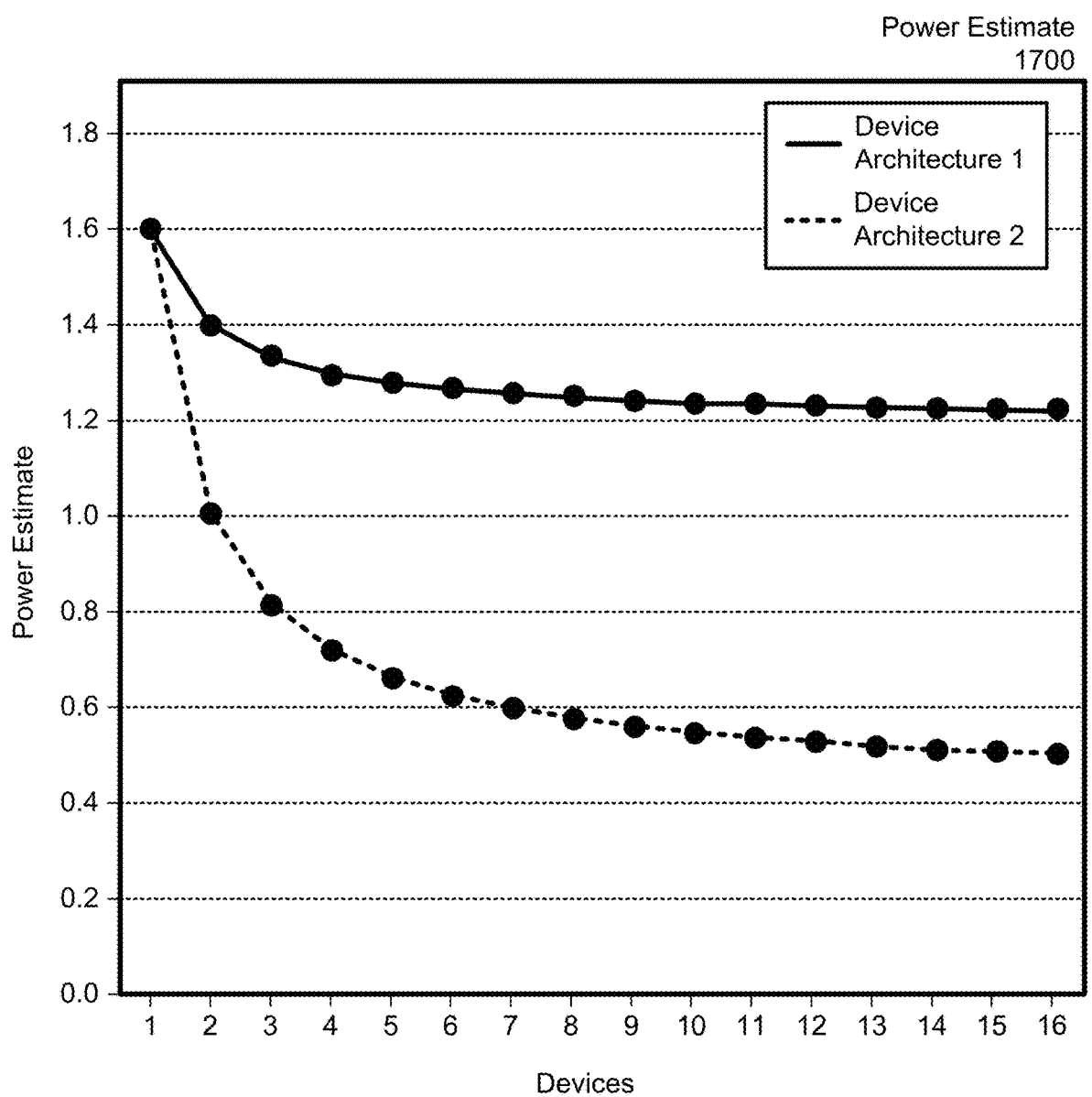
FIG. 17 illustrates an example of estimated power savings resulting from performing device synchronization during a reduced power mode according to embodiments of the present disclosure.

FIG. 17 illustrates an example of estimated power savings resulting from performing device synchronization during a reduced power mode according to embodiments of the present disclosure. As illustrated in FIG. 17, power estimate chart 1700 illustrates estimated power consumption for a time follower device 110f depending on the time interval (e.g., total number of time slots) selected. While FIG. 17 illustrates an example in which the time interval is based on a number of time follower devices 110f, the disclosure is not limited thereto and the time interval may be fixed regardless of the number of time follower devices 110f.

As illustrated in FIG. 17, the power estimate chart 1700 represents power estimate values for time follower devices 110f having two different device architectures. As represented by the power estimate chart 1700, the power estimate values may vary based on the device architecture, such that a first device architecture (e.g., Device Architecture 1) may only realize moderate reductions in power consumption while a second device architecture (e.g., Device Architecture 2) may realize substantial reductions in power consumption.

While both device architectures realize reductions in power consumption as the number of time slots in a cycle increase (e.g., number of devices N increases), a marginal reduction in power consumption becomes smaller as the number of time slots increases. For example, a time follower device 110f having the second device architecture may realize a first marginal benefit (e.g., 0.6=1.61−1.01) when the number of time slots increases from 1 to 2, a second marginal benefit (e.g., 0.2=1.01−0.81) when the number of time slots increases from 2 to 3, a third marginal benefit (e.g., 0.1=0.81−0.71) when the number of time slots increases from 3 to 4, and so on.

When the device 110 is operating in a reduced power mode and/or low power mode, the device 110 may generate and/or receive wakeup events that trigger the device 110 to operate in an active mode to perform one or more actions. For example, a communication path between the device 110 and an external device may depend on the device 110 sending a keepalive message or other notification at a fixed interval (e.g., every 30 seconds), which may require the device 110 to operate in the active mode to send. In some examples, the device 110 may generate an internal wakeup event using an internal wakeup source, such as scheduling an internal wakeup event at the fixed interval so that the device 110 operates in the active mode and sends the keepalive message. In other examples, the device 110 may receive an external wakeup event generated by an external wakeup source, such that the external wakeup event is received at the fixed interval and causes the device 110 to operate in the active mode.

FIG. 18 illustrates example wakeup tables associated with a low power mode according to embodiments of the present disclosure. As illustrated in FIG. 18, a first wakeup table 1810 conceptually illustrates that wakeup events may be associated with an internal wakeup source or an external wakeup source. For example, the wakeup table 1810 lists a first plurality of m internal events (e.g., $Wakeup_{Interval1}$, $Wakeup_{Interval2}$, . . . $Wakeup_{Intervalm}$) and corresponding intervals at which the internal events are generated (e.g., $T_{I1}$, $T_{I2}$, . . . $T_{Im}$). Separately, the wakeup table 1810 lists a second plurality of n external events (e.g., $Wakeup_{External1}$, $Wakeup_{External2}$, . . . $Wakeup_{Externaln}$) and corresponding intervals at which the external events are generated (e.g., $T_{E1}$, $T_{E2}$, . . . $T_{Em}$). Thus, the wakeup table may include any number of internal events or external events and the corresponding intervals may vary without departing from the disclosure.

To illustrate a specific example, FIG. 18 includes a wakeup table 1820 that indicates actual interval values associated with some of the wakeup events. For example, the wakeup table 1820 includes a first internal wakeup event (e.g., $Wakeup_{Internal1}$) that is associated with a first interval (e.g., 15 seconds). The first internal wakeup event may correspond to a time synchronization wakeup event, although the disclosure is not limited thereto. Similarly, the wakeup table 1820 includes a second internal wakeup event (e.g., $Wakeup_{Internal2}$) that is associated with a second interval (e.g., 10 seconds). The second internal wakeup event may correspond to a temperature sensing wakeup event that enables temperature sensing functionality for the device 110. The wakeup table 1820 includes a third internal wakeup event (e.g., $Wakeup_{Internal3}$) that is associated with a third interval (e.g., 30 seconds). The third internal wakeup event may correspond to a keepalive wakeup event, although the disclosure is not limited thereto and this may be an external wakeup event without departing from the disclosure. Finally, the wakeup table 1820 includes a fourth internal wakeup event (e.g., $Wakeup_{Internal4}$) that is associated with a fourth interval (e.g., 5 seconds). The fourth internal wakeup event may correspond to an LED wakeup event, although the disclosure is not limited thereto.

In addition, the wakeup table 1820 includes a first external wakeup event (e.g., $Wakeup_{External1}$) that is associated with a fifth interval (e.g., 30 seconds). The first external wakeup event may correspond to a keepalive wakeup event associated with a music service, although the disclosure is not limited thereto. Similarly, the wakeup table 1820 includes a second external wakeup event (e.g., $Wakeup_{External2}$) that is associated with a sixth interval (e.g., 10 seconds). The second external wakeup event may correspond to a time synchronization wakeup event associated with a second music service, although the disclosure is not limited thereto. Finally, the wakeup table 1820 includes a third external wakeup event (e.g., $Wakeup_{External3}$) that is associated with a seventh interval (e.g., 10 seconds), although the disclosure is not limited thereto.

While the device 110 has no control over the external wakeup events generated by external wakeup sources, the device 110 may reduce a power consumption of the device by optimizing the internal wakeup events. For example, the device 110 may synchronize multiple internal wakeup events with each other, enabling the device 110 to perform multiple actions while operating in the active mode and reducing a total number of wakeup events.

Figure 19:
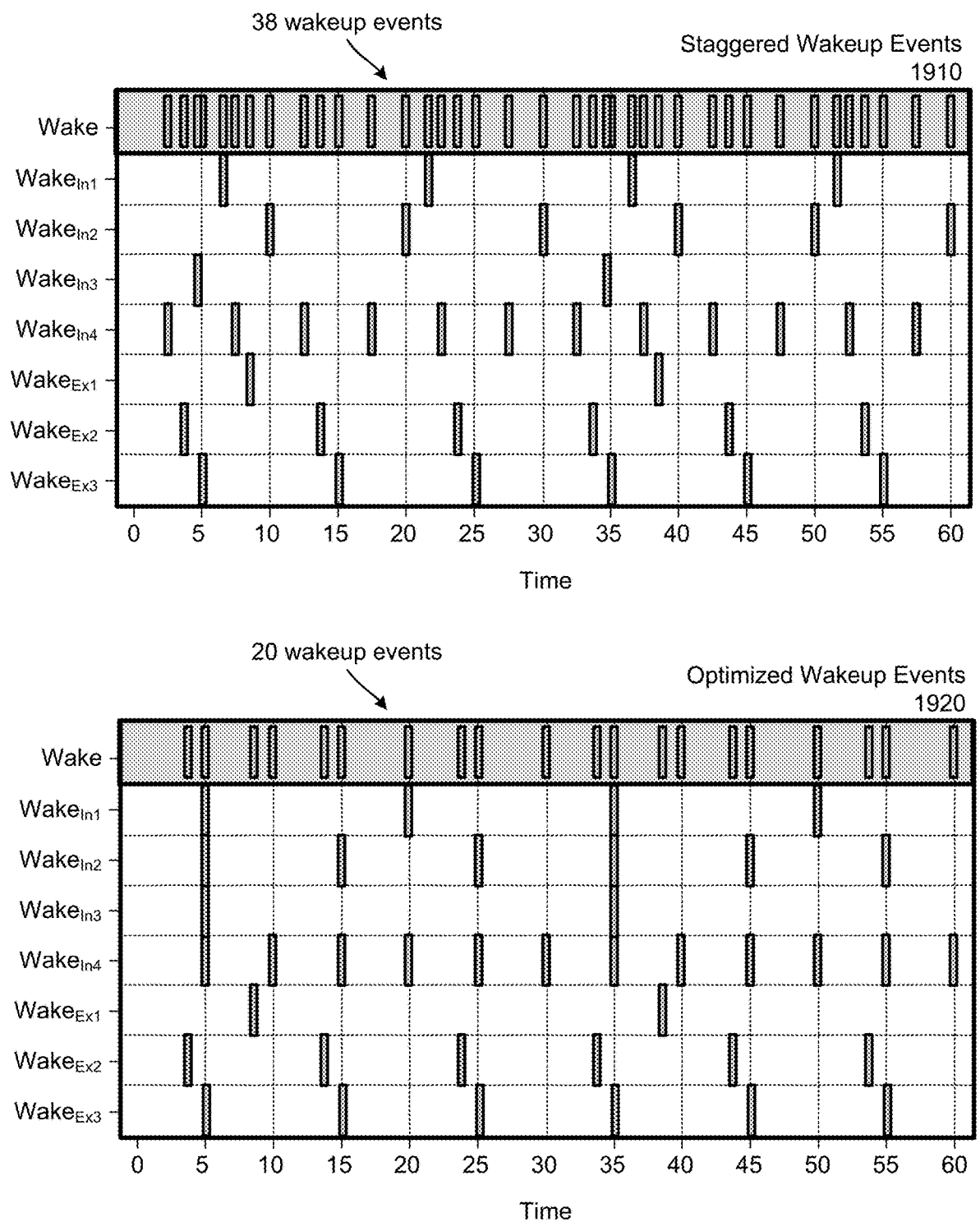
FIG. 19 illustrates an example of optimizing wakeup events during a low power mode according to embodiments of the present disclosure.

FIG. 19 illustrates an example of optimizing wakeup events during a low power mode according to embodiments of the present disclosure. As illustrated in FIG. 19, staggered wakeup events chart 1910 illustrates an example of a plurality of wakeup events corresponding to the wakeup table 1820 described above. For example, the first internal wakeup events occur based on the first interval (e.g., every 15 seconds), the second internal wakeup events occur based on the second interval (e.g., every 10 seconds), and so on.

As shown in the staggered wakeup events chart 1910, these intervals are not synchronized (e.g., aligned, coordinated, and/or the like), with minor offsets even between wakeup events having the same interval. Thus, a first row of the staggered wakeup events chart 1910 illustrates that the device 110 may receive 38 unique wakeup events during a fixed period of time (e.g., 60 seconds).

In contrast, optimized wakeup events chart 1920 illustrates an example of the plurality of wakeup events corresponding to the wakeup table 1820 after optimization is performed to synchronize (e.g., align, coordinate, and/or the like) the internal wakeup events with each other and/or the external wakeup events. For example, the device 110 may align all four of the internal wakeup events with each other, such that a single wakeup event occurs at a first time (e.g., 5 seconds), which replaces four separate wakeup events with a single wakeup event that causes the device 110 to perform four separate actions. Due to differences in the time intervals, however, this reduction varies over time, but aligning the internal wakeup events reduces the total number of unique wakeup events experienced by the device 110.

Additionally or alternatively, the device 110 may align one or more internal wakeup events to an external wakeup event that the device 110 cannot control. For example, the optimized wakeup events chart 1920 illustrates an example in which the four internal wakeup events are aligned with the third external wakeup event. Thus, the device 110 may use one or more of the external wakeup events as anchors with which to align the internal wakeup events.

While FIG. 19 illustrates an example in which all of the internal wakeup events are aligned with each other, the disclosure is not limited thereto. In some examples, due to differences in the time intervals between the internal wakeup events, the device 110 may align a first portion of the internal wakeup events and separately align a second portion of the internal wakeup events without departing from the disclosure. Additionally or alternatively, while FIG. 19 illustrates an example in which multiple internal wakeup events are aligned with a single external wakeup event, the disclosure is not limited thereto. In some examples, the device 110 may align one or more first internal wakeup events with a first external wakeup event and align one or more second internal wakeup events with a second external wakeup event. For example, the first internal wakeup events and the first external wakeup event may share a first time interval, while the second internal wakeup events and the second external wakeup event may share a second time interval, although the disclosure is not limited thereto.

As shown in the optimized wakeup events chart 1920, synchronizing the internal wakeup events with each other and/or the external wakeup event(s) may reduce a total number of unique wakeup events received by the device 110. For example, a first row of the optimized wakeup events chart 1920 illustrates that the device 110 may receive only 20 unique wakeup events during the fixed period of time (e.g., 60 seconds), resulting in a reduction of 18 redundant wakeup events, although the disclosure is not limited thereto.

Figure 20:
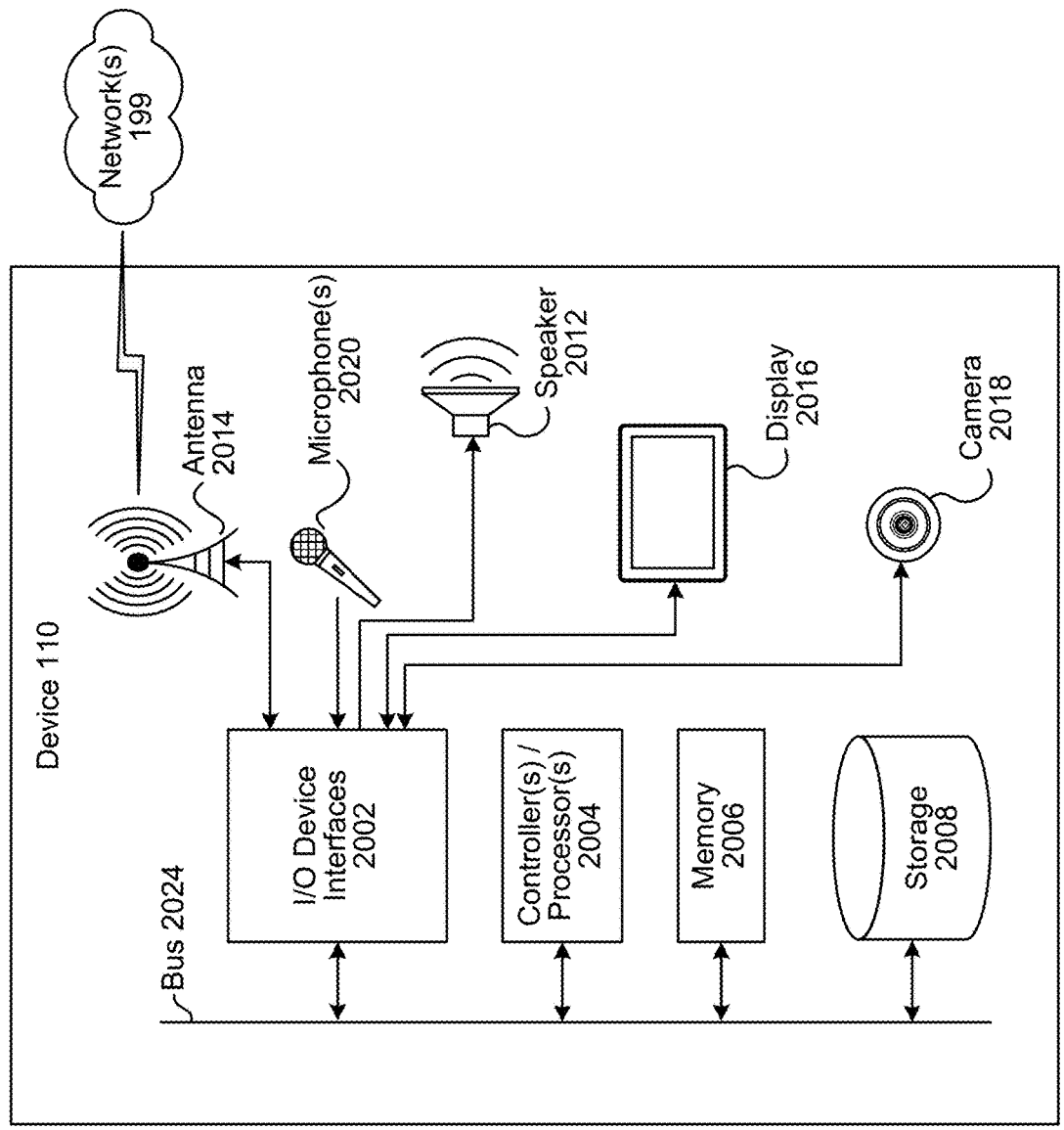
FIG. 20 is a block diagram conceptually illustrating example components of a device, according to embodiments of the present disclosure.
Figure 21:
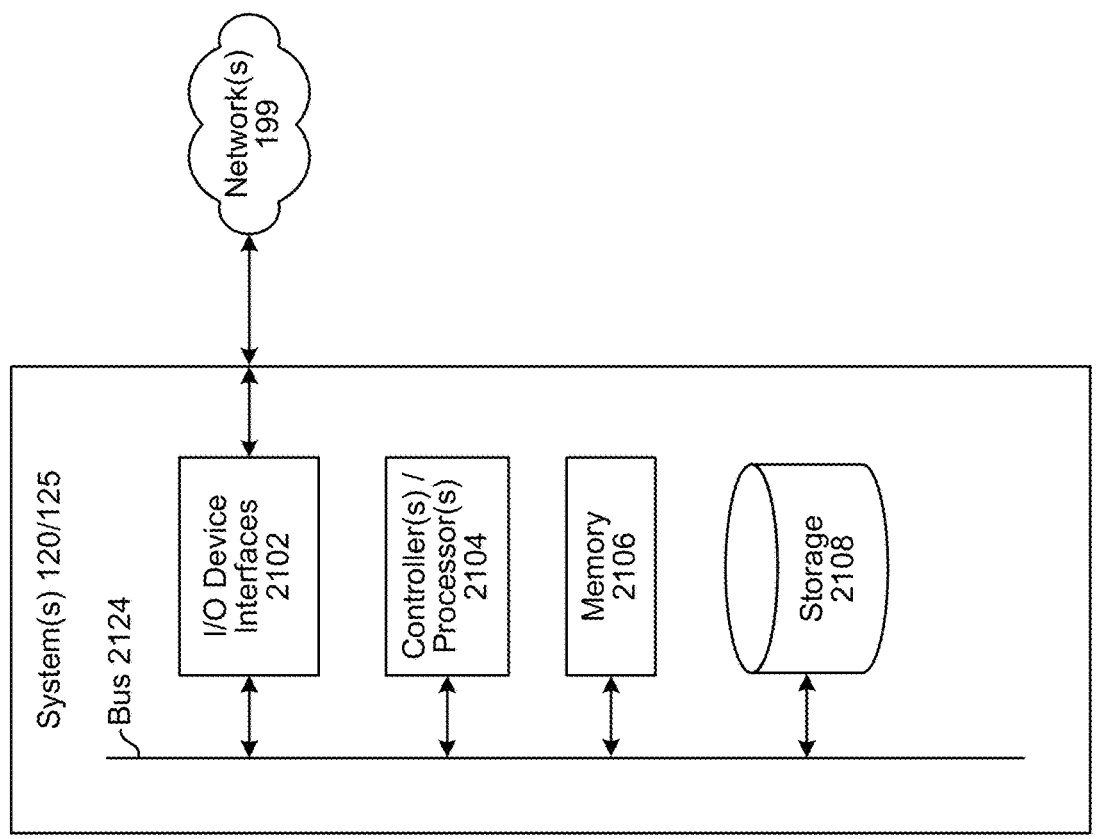
FIG. 21 is a block diagram conceptually illustrating example components of a system, according to embodiments of the present disclosure.

FIG. 20 is a block diagram conceptually illustrating a device 110 that may be used with the remote system 120. FIG. 21 is a block diagram conceptually illustrating example components of a remote device, such as the remote system 120, which may assist with ASR processing, NLU processing, etc.; and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more remote systems 120 for performing ASR processing, one or more remote systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (2004/2104), which may each include a central processing unit (CPU) for processing data and computer-readable instructions, and a memory (2006/2106) for storing data and instructions of the respective device. The memories (2006/2106) may individually include volatile random access memory (RAM), non-volatile read only memory (ROM), non-volatile magnetoresistive memory (MRAM), and/or other types of memory. Each device (110/120/125) may also include a data storage component (2008/2108) for storing data and controller/processor-executable instructions. Each data storage component (2008/2108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (2002/2102).

Computer instructions for operating each device (110/120/125) and its various components may be executed by the respective device's controller(s)/processor(s) (2004/2104), using the memory (2006/2106) as temporary "working" storage at runtime. A device's computer instructions may be stored in a non-transitory manner in non-volatile memory (2006/2106), storage (2008/2108), or an external device(s). Alternatively, some or all of the executable instructions may be embedded in hardware or firmware on the respective device in addition to or instead of software.

Each device (110/120/125) includes input/output device interfaces (2002/2102). A variety of components may be connected through the input/output device interfaces (2002/2102), as will be discussed further below. Additionally, each device (110/120/125) may include an address/data bus (2024/2124) for conveying data among components of the respective device. Each component within a device (110/120/125) may also be directly connected to other components in addition to (or instead of) being connected to other components across the bus (2024/2124).

Referring to FIG. 20, the device 110 may include input/output device interfaces 2002 that connect to a variety of components such as an audio output component such as a speaker 2012, a wired headset or a wireless headset (not illustrated), or other component capable of outputting audio. The device 110 may also include an audio capture component. The audio capture component may be, for example, a microphone 2020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 2016 for displaying content. The device 110 may further include a camera 2018.

Via antenna(s) 2014, the input/output device interfaces 2002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2002/2102) may also include communication components that allow data to be exchanged between devices such as different physical servers in a collection of servers or other components.

The components of the device 110, the remote system 120, and/or a skill component 125 may include their own dedicated processors, memory, and/or storage. Alternatively, one or more of the components of the device 110, the remote system 120, and/or a skill component 125 may utilize the I/O interfaces (2002/2102), processor(s) (2004/2104), memory (2006/2106), and/or storage (2008/2108) of the device(s) 110, system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill component 125, as described herein, are illustrative, and may be located as a stand-alone device or may be included, in whole or in part, as a component of a larger device or system.

As illustrated in FIG. 22, multiple devices (110a-110k, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a speech-detection device 110e, a display device 110f, a smart television 110g, a headless device 110h, a washer/dryer 110i, a refrigerator 110j, and/or a microwave 110k may be connected to the network(s) 199 through a wireless service provider, over a Wi-Fi or cellular network connection, or the like. Other devices are included as network-connected support devices, such as the remote system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
operating a first processor in a first mode associated with first power consumption, the first processor included within a first integrated circuit of a central processing unit of a first device;
receiving first audio data representing first audio;
storing first data representing the first audio in a first buffer component of a second processor, the second processor included within a second integrated circuit of a digital signal processing component of the first device, the second integrated circuit being separate from the first integrated circuit and the central processing unit being separate from the digital signal processing component;

determining, using a first component of the digital signal processing component, that an audible sound is represented in the first audio data;

in response to determining that the audible sound is represented in the first audio data, sending a signal to a gate associated with the first buffer component, wherein the signal causes the first buffer component to send the first data to a second buffer component of the first processor;

after sending the signal to the gate associated with the first buffer component, operating the first processor in a second mode, the second mode associated with second power consumption that is higher than the first power consumption;

determining, using a second component of the first processor operating in the second mode, that a wakeword is represented in a first portion of the first data stored in the second buffer component; and causing speech processing to be performed, using a third component of the first processor, on the first portion of the first data.

2. The computer-implemented method of claim 1, wherein the first component is an audio activity detector, the method further comprising:
sending, by the first component to a fourth component of the first processor, second data representing an interrupt that causes the first processor to operate in the second mode.

3. The computer-implemented method of claim 1, wherein the first buffer component is a circular buffer, the method further comprising:
receiving, by the first buffer component, second data; and
sending, by the first buffer component to the second component and based on receiving the second data, the first data.

4. The computer-implemented method of claim 1, further comprising:
receiving, by a fourth component of the second processor, the first audio data including a first portion that is associated with a first microphone and a second portion that is associated with a second microphone;
determining, by the fourth component based on at least the first portion and the second portion, a plurality of audio signals comprising:
the first data corresponding to a first direction, and
second data corresponding to a second direction;
determining a first signal quality metric value corresponding to the first data;
determining a second signal quality metric value corresponding to the second data;
determining that the first signal quality metric value indicates a higher signal quality than the second signal quality metric value; and
sending, by the fourth component to the first buffer component, the first data.

5. The computer-implemented method of claim 1, wherein determining that the wakeword is represented in the first portion of the first data further comprises:
receiving, by the second component, the first data, wherein the first data is associated with a first sampling rate and the second component is a wakeword detector;
determining, by the second component, that the wakeword is not represented in a second portion of the first data, the second component configured to process the first data at a first rate that exceeds the first sampling rate; and
determining, by the second component, that the wakeword is represented in the first portion of the first data.

6. The computer-implemented method of claim 1, further comprising:
storing the first audio data in a third buffer component;
sending, by the first component to the first processor, second data representing an interrupt that causes the first processor to operate in the second mode; and
sending, by the first component to the third buffer component, third data causing the third buffer component to output the first audio data.

7. The computer-implemented method of claim 1, further comprising:
storing, by a third buffer component of the second processor, the first audio data;
receiving, by the third buffer component, second data instructing the third buffer component to output the first audio data;
sending, by the third buffer component, the first audio data to a fourth component of the second processor; and
generating, by the fourth component and using the first audio data, the first data.

8. The computer-implemented method of claim 1, further comprising:
receiving, by a fourth component of the second processor, the first audio data, the first audio data associated with a first sampling rate;
generating, by the fourth component and using the first audio data, the first data, the fourth component configured to process the first audio data at a first rate that exceeds the first sampling rate; and
sending, by the fourth component, the first data to the first buffer component.

9. The computer-implemented method of claim 1, further comprising:
operating the first processor in the second mode;
generating, by a fourth component of the second processor and using second audio data, second data, wherein the fourth component is configured to process the second audio data at a first rate;
operating the first processor in the first mode; and
generating, by the fourth component and using the first audio data, the first data, wherein the fourth component is configured to process the first audio data at a second rate exceeding the first rate.

10. The computer-implemented method of claim 1, further comprising:
receiving, by the second component, second audio data representing second audio captured while the first processor is operating in the second mode;
processing, by the second component, the second audio data at a first rate;
receiving, by the second component, the first data representing the first audio captured while the first processor is operating in the first mode; and
processing, by the second component, the first data at a second rate that exceeds the first rate.

11. A system comprising:
at least one processor; and
memory including instructions operable to be executed by the at least one processor to cause the system to:

operate a first processor in a first mode associated with first power consumption, the first processor included within a first integrated circuit of a central processing unit of a first device;

receive first audio data representing first audio;

store first data representing the first audio in a first buffer component of a second processor, the second processor included within a second integrated circuit of a digital signal processing component of the first device, the second integrated circuit being separate from the first integrated circuit and the central processing unit being separate from the digital signal processing component;

determine, using a first component of the digital signal processing component, that an audible sound is represented in the first audio data;

in response to determining that the audible sound is represented in the first audio data, send a signal to a gate associated with the first buffer component, wherein the signal causes the first buffer component to send the first data to a second buffer component of the first processor;

after sending the signal to the gate associated with the first buffer component, operate the first processor in a second mode, the second mode associated with second power consumption that is higher than the first power consumption;

determine, using a second component of the first processor operating in the second mode, that a wakeword is represented in a first portion of the first data stored in the second buffer component; and cause speech processing to be performed, using a third component of the first processor, on the first portion of the first data.

12. The system of claim 11, wherein the first component is an audio activity detector, and the memory further comprises instructions that, when executed by the at least one processor, further cause the system to:

send, by the first component to a fourth component of the first processor, second data representing an interrupt that causes the first processor to operate in the second mode.

13. The system of claim 11, wherein the first buffer component is a circular buffer, and the memory further comprises instructions that, when executed by the at least one processor, further cause the system to:

receive, by the first buffer component, second data; and send, by the first buffer component to the second component and based on receiving the second data, the first data.

14. The system of claim 11, wherein the memory further comprises instructions that, when executed by the at least one processor, further cause the system to:

receive, by a fourth component of the second processor, the first audio data including a first portion that is associated with a first microphone and a second portion that is associated with a second microphone;

determine, by the fourth component based on at least the first portion and the second portion, a plurality of audio signals comprising:
the first data corresponding to a first direction, and
second data corresponding to a second direction;

determine a first signal quality metric value corresponding to the first data;

determine a second signal quality metric value corresponding to the second data;

determine that the first signal quality metric value indicates a higher signal quality than the second signal quality metric value; and send, by the fourth component to the first buffer component, the first data.

15. The system of claim 11, wherein the memory further comprises instructions that, when executed by the at least one processor, further cause the system to:

receive, by the second component, the first data, wherein the first data is associated with a first sampling rate and the second component is a wakeword detector;

determine, by the second component, that the wakeword is not represented in a second portion of the first data, the second component configured to process the first data at a first rate that exceeds the first sampling rate; and determine, by the second component, that the wakeword is represented in the first portion of the first data.

16. The system of claim 11, wherein the memory further comprises instructions that, when executed by the at least one processor, further cause the system to:

store the first audio data in a third buffer component;

send, by the first component to the first processor, second data representing an interrupt that causes the first processor to operate in the second mode; and send, by the first component to the third buffer component, third data causing the third buffer component to output the first audio data.

17. The system of claim 11, wherein the memory further comprises instructions that, when executed by the at least one processor, further cause the system to:

store, by a third buffer component of the second processor, the first audio data;

receive, by the third buffer component, second data instructing the third buffer component to output the first audio data;

send, by the third buffer component, the first audio data to a fourth component of the second processor; and generate, by the fourth component and using the first audio data, the first data.

18. The system of claim 11, wherein the memory further comprises instructions that, when executed by the at least one processor, further cause the system to:

receive, by a fourth component of the second processor, the first audio data, the first audio data associated with a first sampling rate;

generate, by the fourth component and using the first audio data, the first data, the third component configured to process the first audio data at a first rate that exceeds the first sampling rate; and send, by the fourth component, the first data to the first buffer component.

19. The system of claim 11, wherein the memory further comprises instructions that, when executed by the at least one processor, further cause the system to:

operate the first processor in the second mode;

generate, by a fourth component of the second processor and using second audio data, second data, wherein the fourth component is configured to process the second audio data at a first rate;

operate the first processor in the first mode; and generate, by the fourth component and using the first audio data, the first data, wherein the fourth component is configured to process the first audio data at a second rate exceeding the first rate.

20. The system of claim 11, wherein the memory further comprises instructions that, when executed by the at least one processor, further cause the system to:
- receive, by the second component, second audio data representing second audio captured while the first processor is operating in the second mode;
- process, by the second component, the second audio data at a first rate;
- receive, by the second component, the first data representing the first audio captured while the first processor is operating in the first mode; and
- process, by the second component, the first data at a second rate that exceeds the first rate.

* * * * *